(12) United States Patent
Bell et al.

(10) Patent No.: US 11,279,487 B2
(45) Date of Patent: Mar. 22, 2022

(54) SYSTEMS AND METHODS FOR LOADING AND UNLOADING A CARGO AIRCRAFT

(71) Applicant: ZSM HOLDINGS LLC, Dover, DE (US)

(72) Inventors: Jason C. Bell, Frederick, CO (US); Etan D. Karni, Boulder, CO (US); Scott David Rewerts, Summerfield, NC (US); Ravi Singh, Denver, CO (US)

(73) Assignee: ZSM HOLDINGS LLC, Dover, DE (US)

( * ) Notice: Subject to any disclaimer, the term of this patent is extended or adjusted under 35 U.S.C. 154(b) by 0 days.

(21) Appl. No.: 17/410,629

(22) Filed: Aug. 24, 2021

(65) Prior Publication Data

US 2021/0380247 A1 Dec. 9, 2021

Related U.S. Application Data

(63) Continuation of application No. PCT/US2020/049784, filed on Sep. 8, 2020.

(60) Provisional application No. 62/938,853, filed on Nov. 21, 2019, provisional application No. 62/896,533, filed on Sep. 5, 2019, provisional application No. 62/896,529, filed on Sep. 5, 2019.

(51) Int. Cl.
*B64D 9/00* (2006.01)
*B64C 1/14* (2006.01)
*B64C 1/22* (2006.01)

(52) U.S. Cl.
CPC ............ *B64D 9/003* (2013.01); *B64C 1/1415* (2013.01); *B64C 1/22* (2013.01); *B64D 2009/006* (2013.01)

(58) Field of Classification Search
CPC .... B64D 9/003; B64D 2009/006; B64D 9/00; B64C 1/1415; B64C 1/22
See application file for complete search history.

(56) References Cited

U.S. PATENT DOCUMENTS 2,134,260 A 10/1938 Nickerson
2,998,948 A 9/1961 Sisk
(Continued)

OTHER PUBLICATIONS

Chui, Sam. Flying The World's Biggest Turboprop—Antonov An-22, Youtube. Video. Sep. 26, 2020. url: <https://www.youtube.com/watch?v=A84HkqiBBmY>.
(Continued)

*Primary Examiner* — Justin M Benedik
(74) *Attorney, Agent, or Firm* — Barnes & Thornburg LLP

(57) ABSTRACT

Systems and methods for loading a cargo aircraft are described. The system includes at least one rail disposed in an interior cargo bay of a cargo aircraft that extends at an angle relative to an interior bottom contact surface of a forward portion of the interior cargo bay, through a kinked portion and an aft portion of the interior cargo bay. Payload-receiving fixtures are described that can be used in conjunction with the rail system, allowing for large cargo, such as wind turbine blades, to be transported by aircraft. Methods of loading a cargo aircraft can include advancing the large payload into the interior cargo bay of the aircraft such that at least one of the payload-receiving fixtures rises relative to a plane defined by the interior bottom contact surface of the forward portion of the interior cargo bay. Various systems, methods, components, and related tooling are also provided.

30 Claims, 31 Drawing Sheets

(56) References Cited

U.S. PATENT DOCUMENTS

| | | | |
|---|---|---|---|
| 3,374,972 | A | 3/1968 | Webb, Sr. |
| 8,121,786 | B2 | 2/2012 | Morbey et al. |
| 8,398,022 | B2 * | 3/2013 | Cazals .................. B64D 27/20 244/119 |
| 11,148,780 | B2 * | 10/2021 | Oonnoonny ......... D07B 1/0673 |
| 2004/0200930 | A1 | 10/2004 | Bays-Muchmore et al. |
| 2009/0173824 | A1 | 7/2009 | Perez-Sanchez |
| 2010/0252682 | A1 * | 10/2010 | Pahl ......................... B64C 1/22 244/129.5 |
| 2015/0183519 | A1 | 7/2015 | Llamas Sandin |
| 2015/0225082 | A1 * | 8/2015 | Levron ................... B64D 9/00 244/137.1 |
| 2016/0311512 | A1 | 10/2016 | Sankrithi |
| 2017/0349263 | A1 * | 12/2017 | Lopez ...................... B64C 1/22 |
| 2018/0273176 | A1 * | 9/2018 | Paunicka .............. B64C 39/024 |
| 2020/0207475 | A1 | 7/2020 | Dobberfuhl et al. |

OTHER PUBLICATIONS

Chui, Sam. Incredible Flight on Antonov AN-124 Cargo Transporter, Youtube. Video. Feb. 15, 2020. url: <https://www.youtube.com/watch?v=5FSyTuY1rGg>.

Chui, Sam. Inside the Boeign 747 Dreamlifter, Youtube. Video. Oct. 26, 2019. url: <https://www.youtube.com/watch?v=b6WGIXENX8g>.

International Search Report and Written Opinion for Application No. PCT/US20/49787, dated Nov. 30, 2020 (20 pages).

International Search Report and Written Opinion for Application No. PCT/US2021/021792, dated May 20, 2021 (12 Pages).

International Search Report and Written Opinion for PCT/US2020/049784, dated Jan. 26, 2021 (13 pages).

No Author Listed, "747-400/-400ER Freighters" StartupBeoing. May 2010.

"No. Author Listed, Antonov Airlines Brochure. Jul. 2019 [online] retrieved from <URL: https://www.antonov-airlines.com/wp-content/uploads/2019/07 /Antonov-Airlines- brochure.pdf>".

WELT Documentary Antonov An-225—The World's Largest Aircraft | Full Documentary, Youtube. Video. Feb. 9, 2020. url: <https://www.youtube.com/watch?v=6sggQqdvqHs>.

No Author Listed. Antonov Airlines No Other Name Carries More Weight Brochure. 2018.

No Author Listed. C-130J Super Hercules Brochure, Lockheed Martin.

No Author Listed. Designed for the Future: Sizing up Airbus' New Beluga XL Transporter, Commercial Aircraft, Airbus. Jul. 19, 2016. url: <https://www.airbus.com/newsroom/news/en/2016/07/designed-for-the-future-sizing-up-airbus-new-beluga-xl-transporter.html>.

No Author Listed. DHC-4 A Caribou Brochure, The De Havilland Canada. Nov. 1962.

No Author Listed. Piasecki H-21 Helicopter, Wikipedia. Webstie. Accessed Oct. 29, 2021. url: <https://en.wikipedia.org/wiki/Piasecki_H-21 >.

* cited by examiner

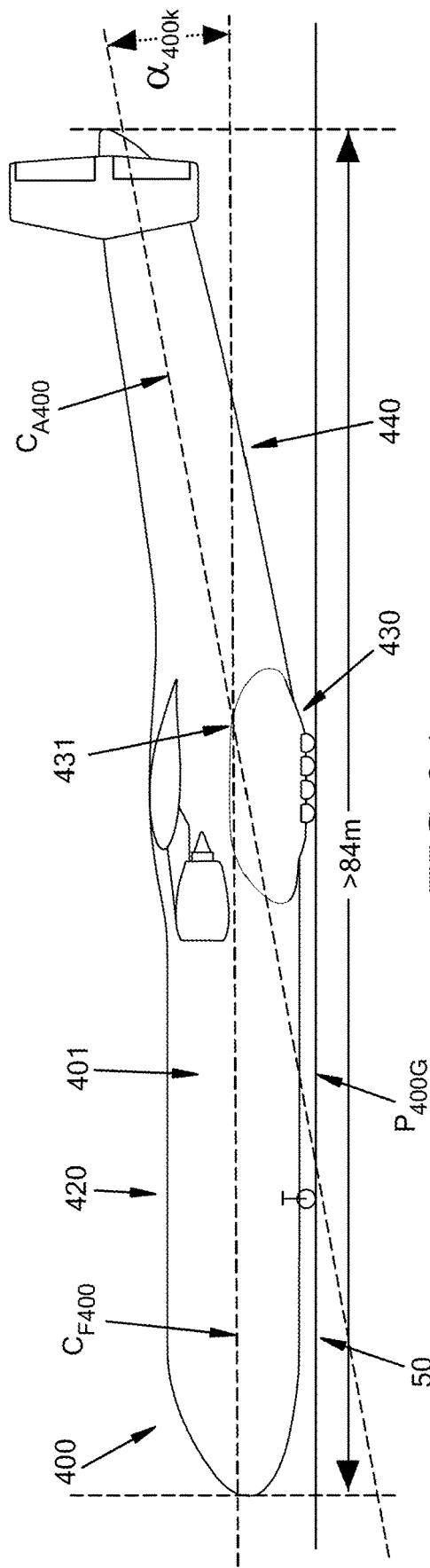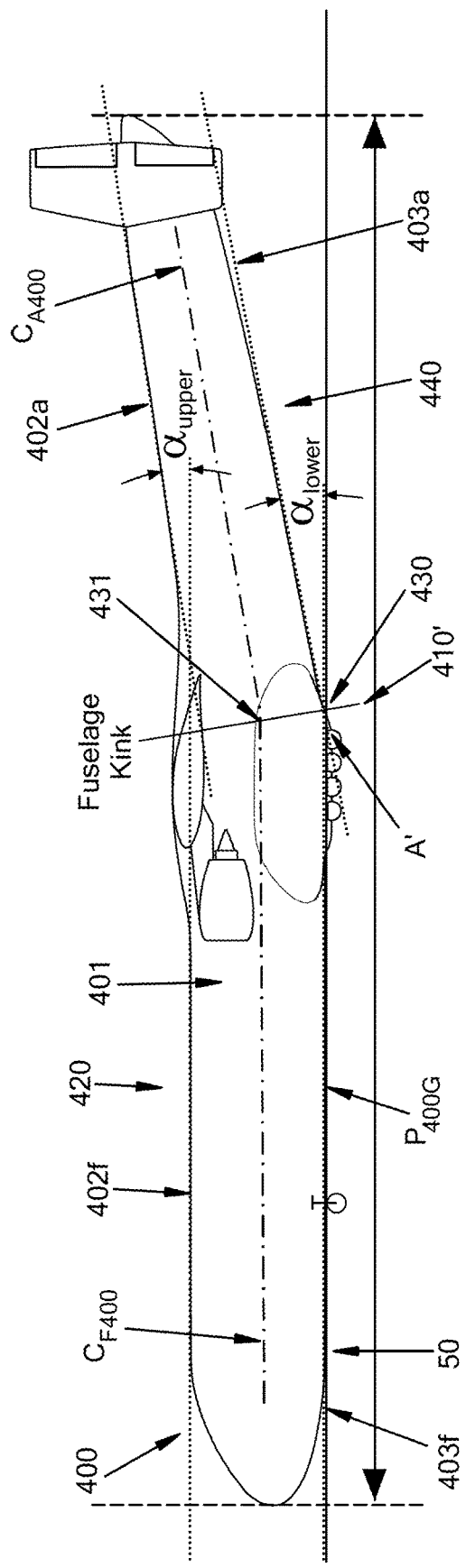

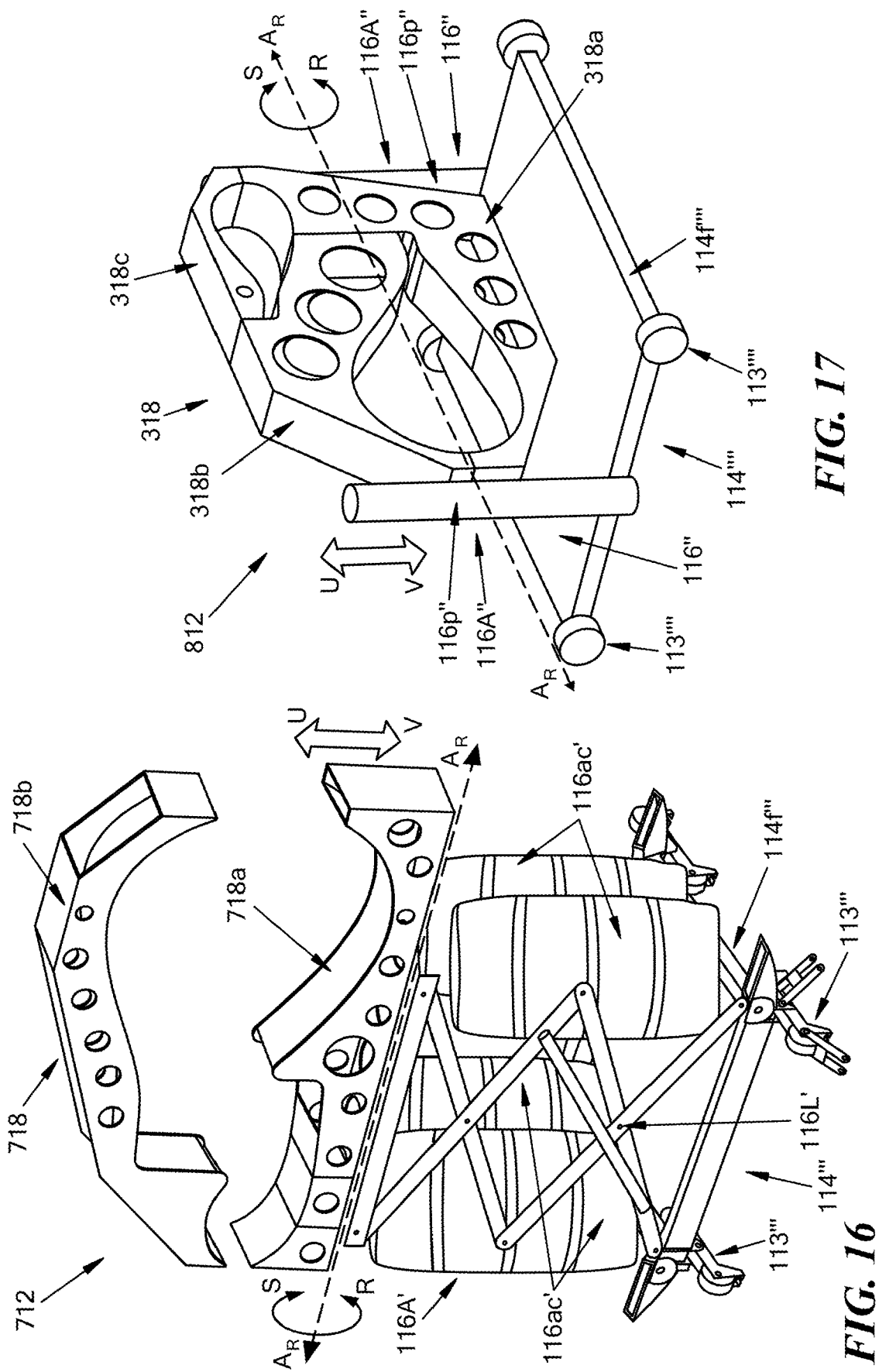

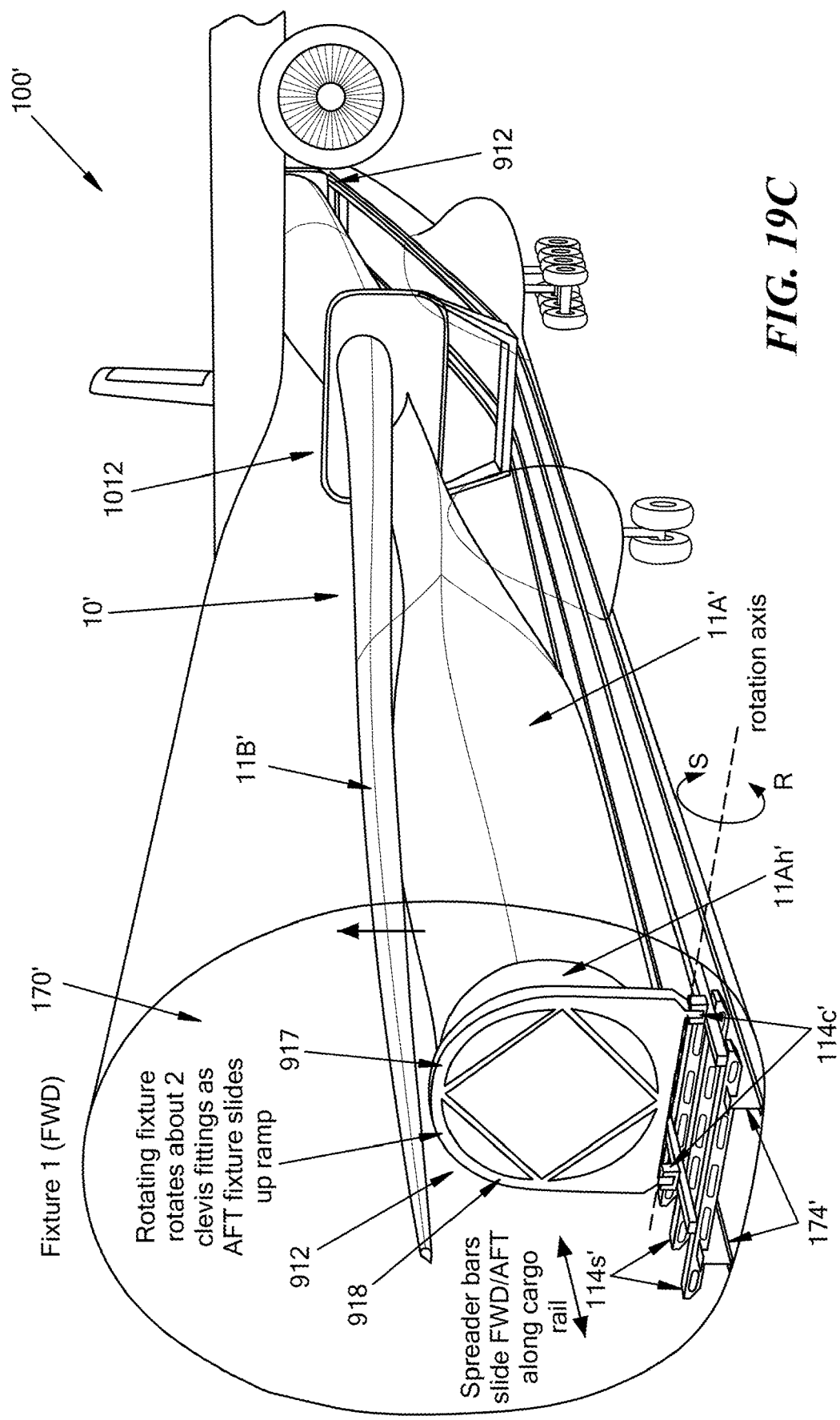

SYSTEMS AND METHODS FOR LOADING AND UNLOADING A CARGO AIRCRAFT

CROSS REFERENCE TO RELATED APPLICATIONS

This application is a U.S. national stage filing from International Application Number PCT/US2020/049784, filed Sep. 8, 2020, and entitled "SYSTEMS AND METHODS FOR LOADING AND UNLOADING A CARGO AIRCRAFT," which claims priority to and the benefit of each of U.S. Provisional Patent Application No. 62/896,529, entitled "CARGO AIRCRAFT TOOL TO PERMIT WIND TURBINE BLADE PAYLOAD ARTICULATION DURING LOADING/UNLOADING," and filed Sep. 5, 2019, U.S. Provisional Patent Application No. 62/896,533, entitled "METHODS FOR PACKAGING AND PLACING ELONGATED CARGOS WITHIN A VEHICLE," and filed Sep. 5, 2019, and U.S. Provisional Patent Application No. 62/938,853, entitled "KINKED LONG AIRCRAFT FUSELAGE CONFIGURATION FOR AVOIDING TAIL STRIKE WHILE ALLOWING LONG PAYLOADS," and filed Nov. 21, 2019, the contents of each which is incorporated by reference herein in its entirety.

FIELD

The present disclosure relates to systems and methods for loading and unloading large cargo onto or from a cargo aircraft, and more particularly provides for a rail system, and related components, that can be used to easily stow large cargo onto the aircraft in a fast and efficient manner, placing the cargo in a location where it can be safely secured and transported by way of flying the aircraft. One non-limiting use discussed herein is transporting components of wind turbines, such as one or more wind turbine blades.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Another challenge presented by transporting large cargo, such as wind turbine blades, or other sizes and types of cargos as well, is the often unique tooling that is required to load and unload the cargo. Neither the aircraft itself, nor the tooling associated with any of packaging the large cargo, moving the large cargo onto the aircraft, and/or securing the large cargo within the plane provides a ready-made, consistent solution so that the large cargo, sometimes referred to as a large payload, can be easily placed on and taken off the plane in an "assembly line-like" manner Instead, large cargo is typically weighed and measured each time it is placed on a cargo aircraft, making sure the right requirements are met in terms of placing a center of gravity of the payload at a safe location with respect to a center of gravity of the aircraft. This becomes a time-intensive and labor-intensive process that severely limits how quickly large cargo can be transported. This can make air transport of large cargo undesirable, with others opting to move the large cargo by rail or truck. Even to the extent there may be some tooling for individual types of large cargo, there is not currently any such tooling for transporting wind turbine blades and other components of a wind turbine.

Accordingly, there is a need for tooling systems, related components, and methods that can be implemented to allow for the consistent loading and unloading of cargo from a large aircraft, forming an "assembly line-like" process whereby cargo can be continuously loaded and unloaded without having to make measurements, such as measurements of the cargo center of gravity, after each time cargo is loaded and flown.

SUMMARY

The present application is directed to a cargo loading and unloading system that is implemented in a cargo aircraft. The system includes various tooling and fixtures that are specifically designed to enable easy loading of large cargo items into a large cargo aircraft. For example, one or more rails (often two, although the present disclosure is by no means limited to two rails) can be disposed in the cargo bay, for instance along an interior bottom contact surface (i.e., a floor), and can extend most of the length of the interior cargo bay. This can include into a kinked portion and an aft portion, which the entire fuselage, and thus the rail, are disposed at an angle with respect to a plane defined by the portion of the interior bottom contact surface in the forward portion of the interior cargo bay. The payload can be slid up the rail and into the aft end of the cargo aircraft, thus allowing for payloads having a very long length to be stowed in the interior cargo bay. The tooling and fixtures can also include payload-receiving fixtures, which work in conjunction with the rail(s) by securing the payload within the fixtures and sliding along the rails to move the payload into and out of the aircraft.

One exemplary method of loading a payload onto a cargo aircraft is performed in conjunction with a cargo aircraft that includes an interior cargo bay having a forward bay portion located in the forward end of the cargo aircraft, an aft bay portion located in the aft end of the cargo aircraft, and a kinked bay portion disposed between the forward bay portion and the aft bay portion. The kinked bay portion defines a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft. The method includes advancing a payload into the forward end of the cargo aircraft and towards the aft end of the cargo aircraft. The payload includes a plurality of payload-receiving fixtures holding one or more structures of the payload in a set position with respect to at least some portion of the payload-receiving fixtures. Advancing the payload causes at least a distal-most payload-receiving fixture of the plurality of payload-receiving fixtures to rise relative to a plane defined by an interior bottom contact surface of the forward bay portion as the distal-most payload-receiving fixture advances through the kinked bay portion and into the aft bay portion of the interior cargo bay. The method further includes securing the payload within the interior cargo bay such that the distal-most payload-receiving fixture is secured in the aft bay portion of the interior cargo bay and a proximal-most payload-receiving fixture of the plurality of payload-receiving fixtures is secured in the forward bay portion of the interior cargo bay.

The action of advancing the payload into the forward end of the cargo aircraft can include passing the payload through an opening formed by opening a nose cargo door located in the forward end of the cargo aircraft. In some embodiments, advancing the payload into the forward end of the cargo aircraft can include coupling a carriage of at least one payload-receiving fixture of the plurality of payload-receiving fixtures to one or more rails of the interior cargo bay. The rail(s) can extend from the forward bay portion, through the kinked bay portion, and into the aft bay portion. Accordingly, advancing the payload towards the aft end of the cargo aircraft can include advancing the carriage along the rail(s). The rail(s) can include a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion. The kinked portion of the rail(s) can be disposed in the aft bay portion such that a majority of the kinked portion forms an angle with a portion of the at least one rail disposed in the forward bay portion. A terminal end of the kinked portion of the rail(s) can be disposed in the aft bay portion, located above a plane extending through a top surface of a fuselage of the cargo plane in which the interior cargo bay is disposed. In some embodiments, the rail(s) can extend continuously along an interior bottom contact surface of the cargo bay from the forward bay portion to the aft bay portion. In some embodiments, the rail(s) can serve as a primary structural beam(s) of the cargo aircraft. Coupling the carriage to the rail(s) can include engaging a plurality of wheels of the carriage with the rail(s) and advancing the carriage along the rail(s) can include rolling the wheels along the rail(s).

The method can further include coupling a first terminal end of a first structure of the one or more structures to the proximal-most payload-receiving fixture, and coupling a second, opposite terminal end of the first structure to the distal-most payload-receiving fixture. In some such embodiments, the method can further include coupling a first terminal end of a second structure of the one or more structures to the distal-most payload-receiving fixture and coupling a second, opposite terminal end of the second structure to the proximal-most payload-receiving fixture. The first and second structures can be similar structures such that the respective first terminal ends and respective second terminal ends are substantial equivalents of each other.

The method can further include placing a first structure of the one or more structures on a first receiving surface of a first piece of a payload-receiving fixture of the plurality of payload receiving fixtures and coupling a second piece of the payload-receiving fixture to the first piece to secure a location of the first structure with respect to the first receiving surface. In some such embodiments, the method can further include placing a second structure of the one or more structures on at least one of a second receiving surface of the first piece or a first receiving surface of the second piece and coupling at least one of the second piece to the first piece or a third piece of the payload-receiving fixture to one or both of the first piece and the second piece to secure a location of the second structure with respect to the at least one of the second receiving surface of the first piece or the first receiving surface of the second piece.

The first structure can be a first wind turbine blade and, when a second structure is included, the second structure can be a second wind turbine blade. In such embodiments, when the first terminal ends of the first and second turbine blades are coupled to the respective proximal-most or distal-most payload-receiving fixture, the first terminal ends are respective hubs of the first and second wind turbine blades, and when the second terminal ends of the first and second turbine blades are coupled to the respective proximal-most or distal-most payload-receiving fixture, the second terminal ends are respective tips of the first and second wind turbine blades.

The method can further include operating one or more actuators coupled to one or more of the plurality of payload-receiving fixtures to adjust a position of the payload relative to the cargo aircraft. This can include, for example, operating the actuator(s) to adjust the position of the payload relative to the cargo aircraft in conjunction with setting a position of the payload within the cargo bay for flight.

Alternatively, or additionally, this can include operating the actuator(s) to adjust the position of the payload relative to the cargo aircraft occurs while advancing the payload towards the aft end of the cargo aircraft.

In some embodiments, the method can further include causing at least one payload-receiving fixture of the plurality of payload-receiving fixtures to both advance towards the aft end of the cargo aircraft and rotate about a pivot axis of the at least one payload-receiving fixture while advancing the payload towards the aft end. In some embodiments, the method can include causing at least one payload-receiving fixture of the plurality of payload-receiving fixtures to each of advance towards the aft end of the cargo aircraft, rotate about a pivot axis of the at least one payload-receiving fixture, and translate vertically relative to an interior bottom contact surface of the cargo bay while advancing the payload towards the aft end. In some such embodiments, either or both of the causing actions can occur passively. Alternatively, or additionally, either or both of the causing actions can occur actively.

The payload can have a length of at least about 57 meters, or at least about 65 meters, or at least about 75 meters, or at least about 85 meters, or at least about 100 meters, or at least about 120 meters, among other lengths.

One exemplary method of unloading a payload onto a cargo aircraft is performed in conjunction with a cargo aircraft that includes an interior cargo bay having a forward bay portion located in the forward end of the cargo aircraft, an aft bay portion located in the aft end of the cargo aircraft, and a kinked bay portion disposed between the forward bay portion and the aft bay portion. The kinked bay portion defines a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft. The method includes advancing a payload towards and out of a forward end of a cargo aircraft. The payload includes a plurality of payload-receiving fixtures holding one or more structures of the payload in a set position with respect to at least some portion of the payload-receiving fixtures. Advancing the payload causes at least a distal-most payload-receiving fixture of the plurality of payload-receiving fixtures to approach a plane defined by an interior bottom contact surface of the forward bay portion as the distal-most payload-receiving fixture advances from the aft bay portion, through the kinked bay portion, and into the forward bay portion of the interior cargo bay.

Advancing the payload towards and out of the forward end of the cargo aircraft can include passing the payload through an opening formed by opening a nose cargo door located in the forward end of the cargo aircraft. In some embodiments advancing the payload towards and out of the forward end of the cargo aircraft can include advancing a carriage of at least one payload-receiving fixture of the plurality of payload-receiving fixtures along one or more rails of the interior cargo bay. The rail(s) can extend from the forward bay portion, through the kinked bay portion, and into the aft bay portion. The rail(s) can include a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion. The kinked portion of the rail(s) can be disposed in the aft bay portion such that a majority of the kinked portion forms an angle with a portion of the at least one rail disposed in the forward bay portion that is substantially parallel to the longitudinal-lateral plane of the cargo aircraft. A terminal end of the kinked portion of the rail(s) can be disposed in the aft bay portion located above a plane extending through a top surface of a fuselage of the cargo plane in which the interior cargo bay is disposed. The rail(s) can extend continuously along an interior bottom contact surface of the cargo bay from the forward bay portion to the aft bay portion. In some embodiments, the rail(s) can serve as a primary structural beam(s) of the cargo aircraft.

The method can further include operating one or more actuators coupled to one or more of the plurality of payload-receiving fixtures to adjust a position of the payload relative to the cargo aircraft. This can include, for example, operating the actuator(s) to adjust the position of the payload relative to the cargo aircraft while advancing the payload towards the forward end of the cargo aircraft. In some embodiments, the method can further include causing at least one payload-receiving fixture of the plurality of payload-receiving fixtures to both advance towards the forward end of the cargo aircraft and rotate about a pivot axis of the at least one payload-receiving fixture while advancing the payload towards the forward end. In some embodiments, the method can include causing at least one payload-receiving fixture of the plurality of payload-receiving fixtures to each of advance towards the forward end of the cargo aircraft, rotate about a pivot axis of the at least one payload-receiving fixture, and translate vertically relative to an interior bottom contact surface of the cargo bay while advancing the payload towards the forward end. In some such embodiments, either or both of the causing actions can occur passively. Alternatively, or additionally, either or both of the causing actions can occur actively.

The payload can have a length of at least about 57 meters, or at least about 65 meters, or at least about 75 meters, or at least about 85 meters, or at least about 100 meters, or at least about 120 meters, among other lengths. The payload can include one or more components of a wind turbine.

One exemplary embodiment of a system for at least one of loading a payload onto a cargo aircraft or unloading a payload from a cargo aircraft includes at least one rail disposed in an interior cargo bay of a cargo aircraft. The interior cargo bay has a forward bay portion located in a forward end of the cargo aircraft, an aft bay portion located in an aft end of the cargo aircraft, and a kinked bay portion disposed between the forward bay portion and the aft bay portion. The kinked bay portion defines a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft. The at least one rail extends from the forward bay portion, through the kinked bay portion, and into the aft bay portion.

The rail(s) can include a kinked portion such that a vertical distance between at least a portion of the at least one rail aft of the kinked portion and the plane defined by an interior bottom contact surface of the forward bay portion is greater than a vertical distance between at least a portion of the at least one rail forward of the kinked portion and the plane defined by the interior bottom contact surface of the forward bay portion. The kinked portion of the rail(s) can be disposed in the aft bay portion such that a majority of the kinked portion forms an angle with a portion of the rail(s) disposed in the forward bay portion that is substantially parallel to the longitudinal-lateral plane of the cargo aircraft. A terminal end of the kinked portion of the rail(s) can be disposed in the aft bay portion located above a plane extending through a top surface of a fuselage of the cargo plane in which the interior cargo bay is disposed. The rail(s) can extend continuously along an interior bottom contact surface of the cargo bay from the forward bay portion to the aft bay portion. In some embodiments, the rail(s) can serve as a primary structural beam(s) of the cargo aircraft. In embodiments in which the at least one rail includes at least two rails, the two rails can be disposed approximately parallel to each other. In other embodiments that include at least two rails, they may not be parallel to each other.

The system can include a cargo nose door that is configured to open a portion of the forward end of the cargo aircraft such that a terminal end of the rail(s) disposed in the forward bay portion is accessible from an outside environment when the cargo nose door is open.

The first structure can be a first wind turbine blade and, when a second structure is included, the second structure can be a second wind turbine blade. In such embodiments, the terminal end of the first wind turbine blade can be a hub of the first wind turbine blade and the terminal end of the second wind turbine blade can be a tip of the second wind turbine blade.

In some embodiments, the system can include a plurality of payload-receiving fixtures. The payload-receiving fixtures can be configured to couple to the rail(s) such that the payload-receiving fixtures can translate along a length of the rail(s). At least one payload-receiving fixture of the plurality of payload-receiving fixtures can include an opening that is configured to receive a terminal end of a first structure. The fixture(s) can also include a second opening configured to receive a terminal end of a second structure. In at least some embodiments the fixture(s) can include a pivot axis. The pivot axis can be configured to allow the payload-receiving fixture(s) to rotate about it.

The payload-receiving fixtures can include a variety of different configurations, and the configurations can be the same or different across the plurality. For example, at least one payload-receiving fixture can include a crossbar that extends between opposed sides of a carriage of the at least one payload-receiving fixture. The crossbar can be configured to receive a first terminal end of a wind turbine blade. By way of further example, at least one payload-receiving fixture can include a first piece and a second piece. The first piece can have at least a first receiving surface formed in it. The second piece can be configured to couple to the first piece. The second piece can have at least a second receiving surface formed in it. The second receiving surface can be complementary to the first receiving surface such that the first and second receiving surfaces can be configured to secure a portion of a first structure within the payload-receiving fixture when the second piece is coupled to the first piece. In some such embodiments, the payload-receiving fixture can include a third piece. The third piece can be configured to couple to the first piece and/or the second piece. The third piece can have at least a third receiving surface formed in it, the third receiving surface being complementary to at least one of a fourth receiving surface formed in the first piece or a fifth receiving surface formed in the second piece such that the third receiving surface and at least one of the fourth and fifth receiving surfaces are configured to secure a portion of a second structure within the payload-receiving fixture when the third piece is coupled to at least one of the first and second pieces.

By way of yet another example, at least one payload-receiving fixture can include a frame and an extension. The frame can include a first receiving surface formed in it that is configured to receive a first structure and secure a portion of the first structure between the first receiving surface and a second receiving surface. The extension can be coupled to the frame and can have a third receiving surface formed in it that is configured to receive a second structure and secure a portion of the second structure between the third receiving surface and a fourth receiving surface. The second receiving surface can be either part of the frame or part of the extension. The fourth receiving surface can be part of the frame. For each of these non-limiting examples of payload-receiving fixtures, in some instances the first structure can be a wind turbine blade and, when a second structure is included, the second structure can be a second wind turbine blade.

In some embodiments, a payload-receiving fixture of the plurality of payload-receiving fixtures can include a carriage. The carriage can include a frame and a plurality of wheels associated with the frame. The wheels can be configured to engage the rail(s) disposed in the interior cargo bay of the cargo aircraft. The carriage can further include one or more whiffle trees having at least some wheels of the plurality of wheels associated with it. The whiffle tree(s) can be configured to substantially uniformly distribute vertical forces from a payload to the at least some wheels forming the whiffle tree(s). The plurality of wheels can include, for example, at least four sets of wheels, each set disposed at respective opposed corners of the frame. Each set of wheels can include a whiffle tree of the one or more whiffle trees associated with the set. In some embodiments, the plurality of wheels can include both a first set of wheels and a second set of wheels. The first set of wheels can be disposed linearly and can have a whiffle tree of the one or more whiffle trees associated with the set. The second set of wheels can also be disposed linearly and can also have a whiffle tree of the one or more whiffle trees associated with the set. The first set of wheels can be disposed on an opposite side of the frame as the second set of wheels. The carriage can include a vertically-disposed frame, relative to the plurality of wheels such that vertically-disposed frame extends vertically away from the wheels. The vertically-disposed frame can be configured to hold one of the various payload-receiving fixtures provided for in the present disclosure, including but not limited to the ones discussed above.

The system can also include one or more actuators. The actuator(s) can be coupled to one or more payload-receiving fixtures of the plurality of payload-receiving fixtures to adjust a position of a payload received by the plurality of payload-receiving fixtures relative to the cargo aircraft. The actuator(s) can be configured to adjust a height of the payload-receiving fixture(s) relative to the cargo aircraft. Alternatively, or additionally, the actuator(s) can be configured to rotate the payload-receiving fixture(s) about a rotation axis extending substantially perpendicular to a longitudinal axis of the payload. By way of non-limiting example, the actuator(s) can include one or more hydraulic pistons. The pistons can be configured to operate to adjust the position of the payload-receiving fixture(s) relative to the cargo aircraft. By way of further non-limiting example, the actuator(s) can include a plurality of pulleys and one or more cables. The cables can be disposed between the pulleys and can be configured to move with respect to the plurality of pulleys to adjust the position of the payload-receiving fixture(s) relative to the cargo aircraft. By way of yet another non-limiting example, the actuator(s) can include one or more air chambers configured to at least one of inflate or deflate to adjust the position of the payload-receiving fixture(s) relative to the cargo aircraft.

In some embodiments, the payload-receiving fixture(s) can be configured to rotate about a pivot axis of the fixture. Alternatively, or additionally, the at least one payload-receiving fixture can be further configured to translate vertically relative to the interior bottom contact surface of the cargo bay. The payload-receiving fixture(s) can be configured to rotate about a pivot axis of the at least one payload-receiving fixture passively and/or actively.

The system can further include a plurality of hardpoint fittings coupled to the rail(s). The hardpoint fittings can be configured to receive at least one of a payload or a payload-receiving fixture that receives a payload. Such embodiments can further include a locking pin that can be configured to engage a hardpoint fitting of the plurality of hardpoint fittings to couple the payload and/or the payload-receiving fixture that receives a payload to the rail(s).

The system can also include a loading system that is configured to pull a payload into the cargo aircraft and along the rail(s). Such a system can include, by way of non-limiting example one or more pulleys and at least one cable coupled to the one or more pulleys. The cable can be configured to move relative to the pulleys to advance the payload into the cargo aircraft and along the rail(s). By way of further non-limiting example, in lieu of or in addition to the one or more pulleys and the cable(s), the system can also include one or more winches to advance the payload into the cargo aircraft and along the rail(s). By way of still further non-limiting example, in lieu of or in addition to the one or more pulleys, the cable(s), and the one or more winches, the system can also include one or more power drive units to advance the payload into the cargo aircraft and along the rail(s).

The system can be configured to be used with a payload having a length of at least about 57 meters, or at least about 65 meters, or at least about 75 meters, or at least about 85 meters, or at least about 100 meters, or at least about 120 meters, among other lengths. The system can be configured to be used with a payload that includes one or more components of a wind turbine.

BRIEF DESCRIPTION OF DRAWINGS

This disclosure will be more fully understood from the following detailed description taken in conjunction with the accompanying drawings, in which:

FIG. 3A is a side view of an alternative exemplary embodiment of an aircraft;

FIG. 3B is a side transparent view of the aircraft of FIG. 3A;

FIG. 16 is a schematic isometric view of another exemplary embodiment of a payload-receiving fixture;

FIG. 17 is a schematic isometric view of yet another exemplary embodiment of a payload-receiving fixture;

FIG. 19C is a front isometric view of the aircraft, rails, payload-receiving fixtures, and two wind turbine blades of FIG. 19A, illustrating the aircraft being loaded with the two wind turbine blades.

DETAILED DESCRIPTION

Figure 1A:
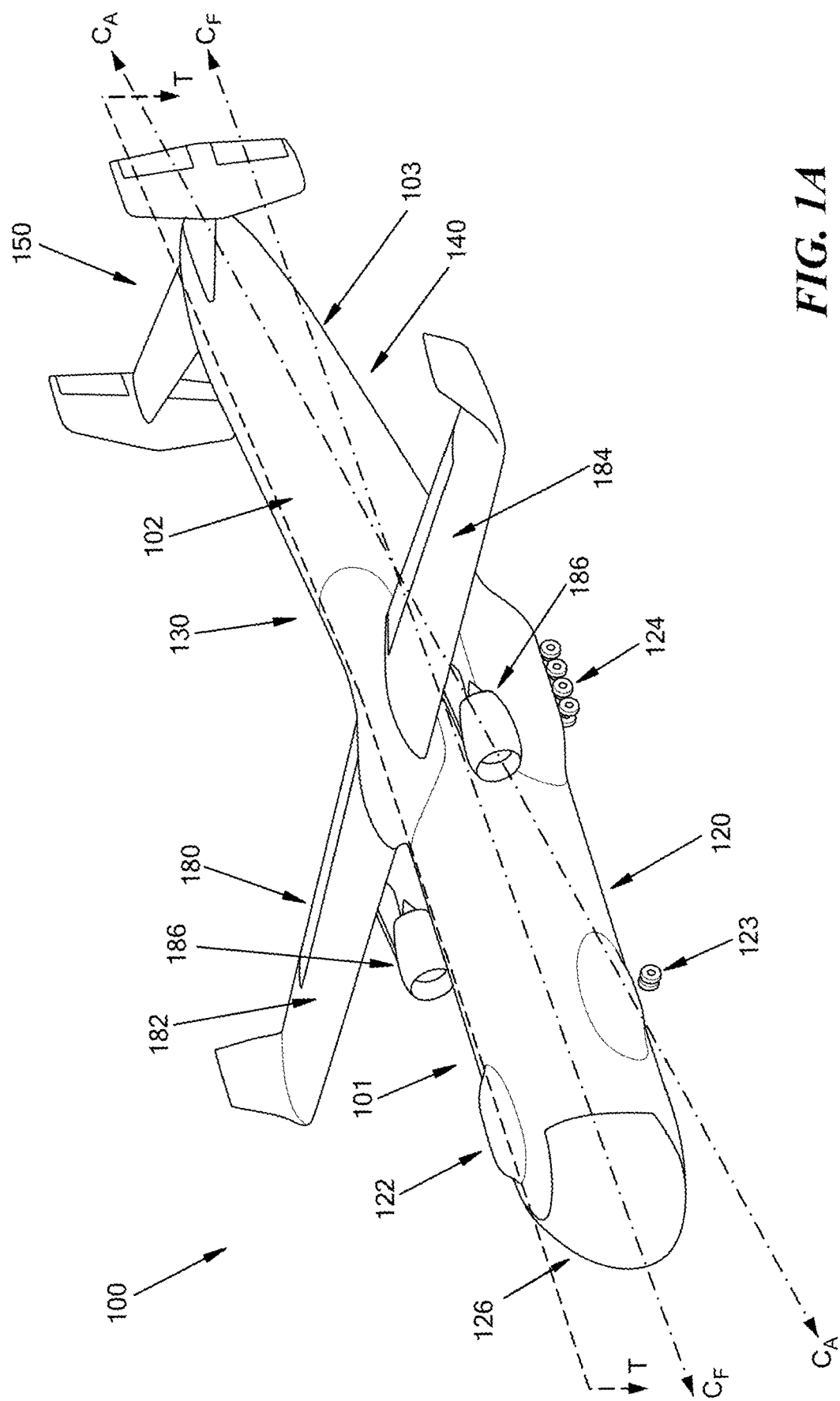
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not to be scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present application is directed to systems and methods for loading and unloading an aircraft in a quick, efficient, safe, and damage-free manner. The system includes a rail system formed in the cargo aircraft, and various components and tooling that can be used in conjunction with the same. The tooling includes payload-receiving fixtures configured to translate along the rails to move the large, heavy, and/or irregular payloads to desired locations in the interior cargo bay for transport of the same by air. Before describing these systems and methods, the configuration of the aircraft itself should be discussed.

Aircraft

Figure 1B:
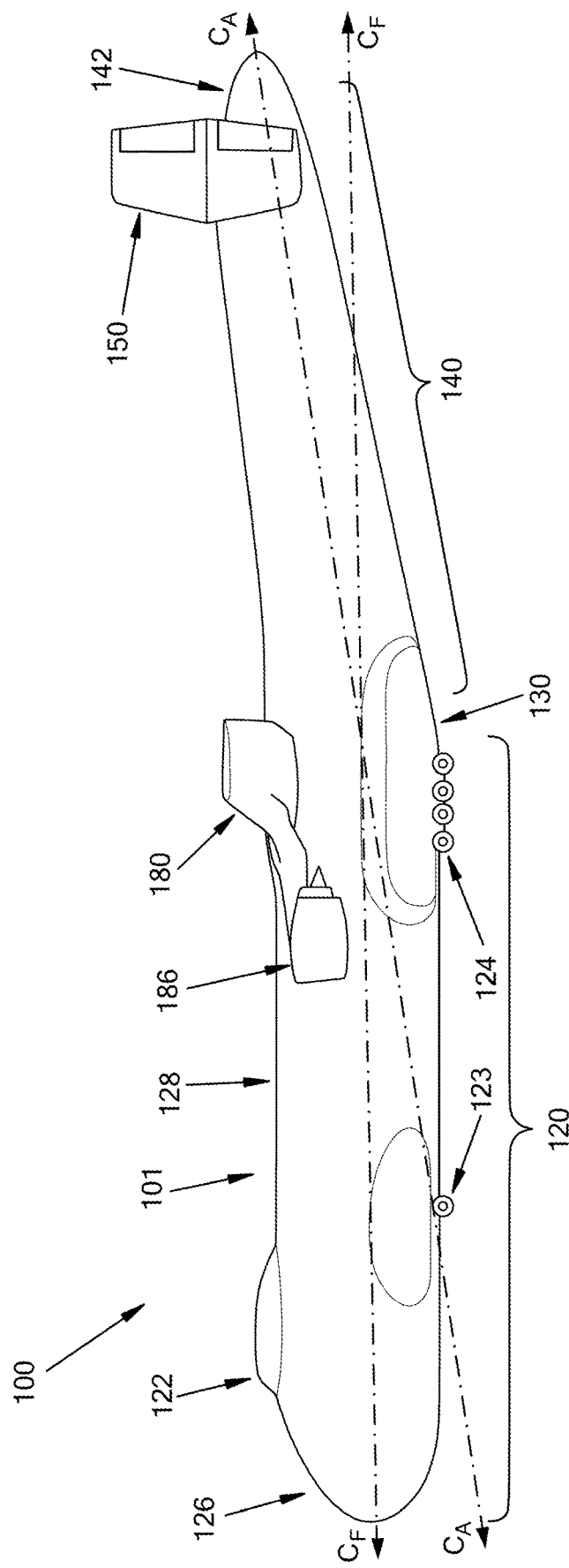
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D and 5B-6A. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 6A-7.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
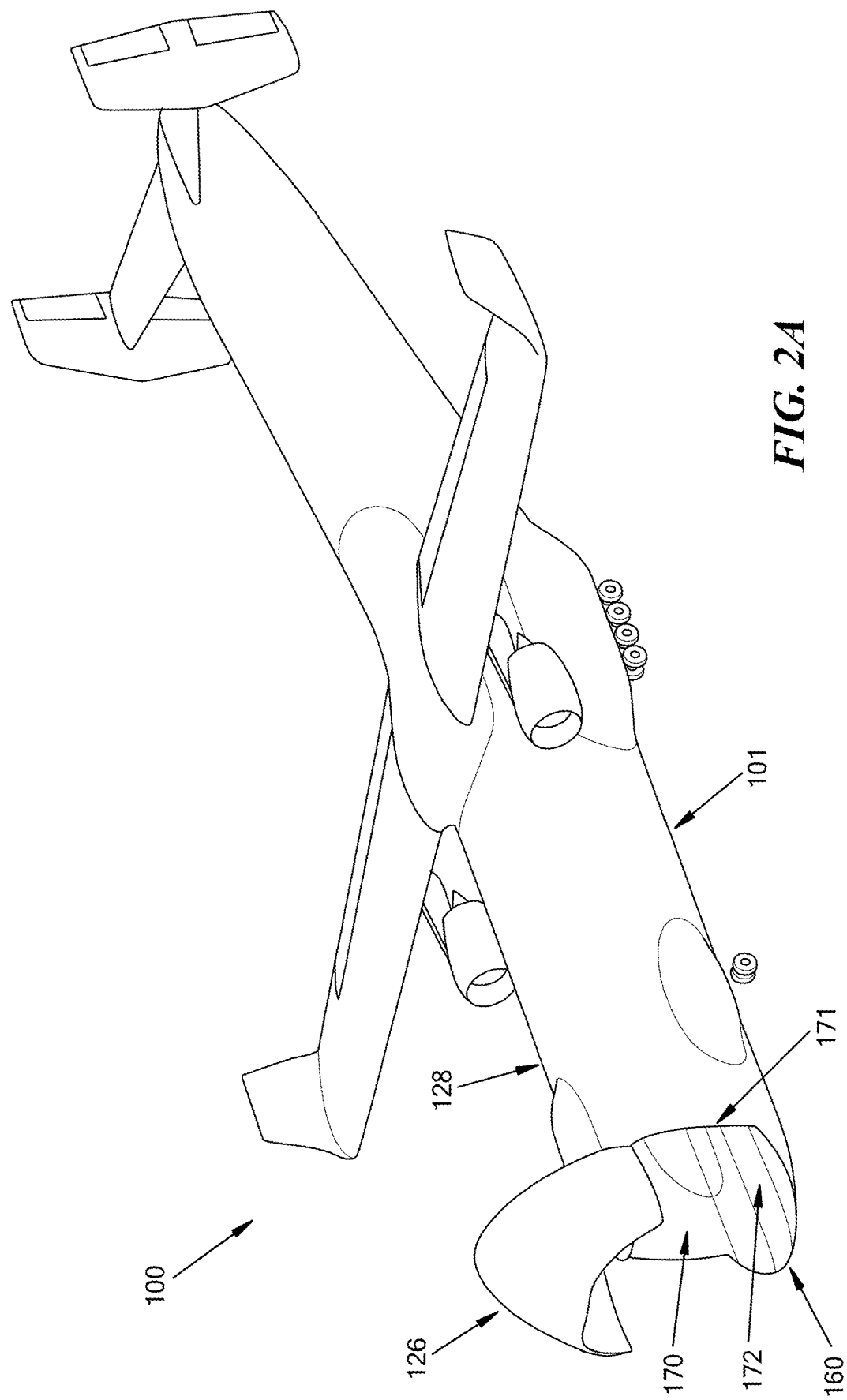
FIG. 2A is an isometric view of the aircraft of FIG. 1A with a nose cone door in an open position to provide access to an interior cargo bay of the aircraft.
Figure 2B:
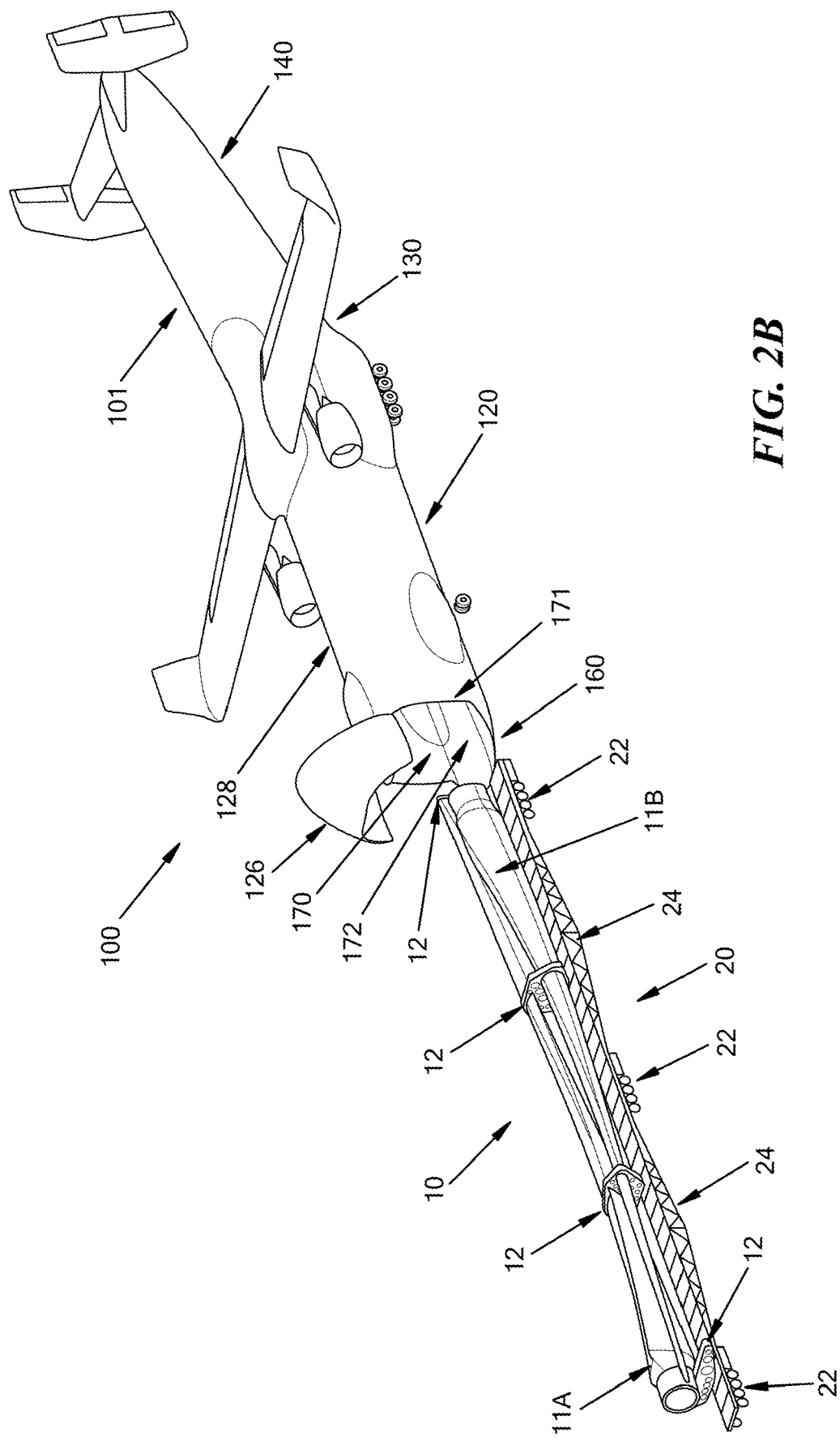
FIG. 2B is an isometric view of the aircraft of FIG. 2A with a payload being disposed proximate to the aircraft for loading into the interior cargo bay.
Figure 2C:
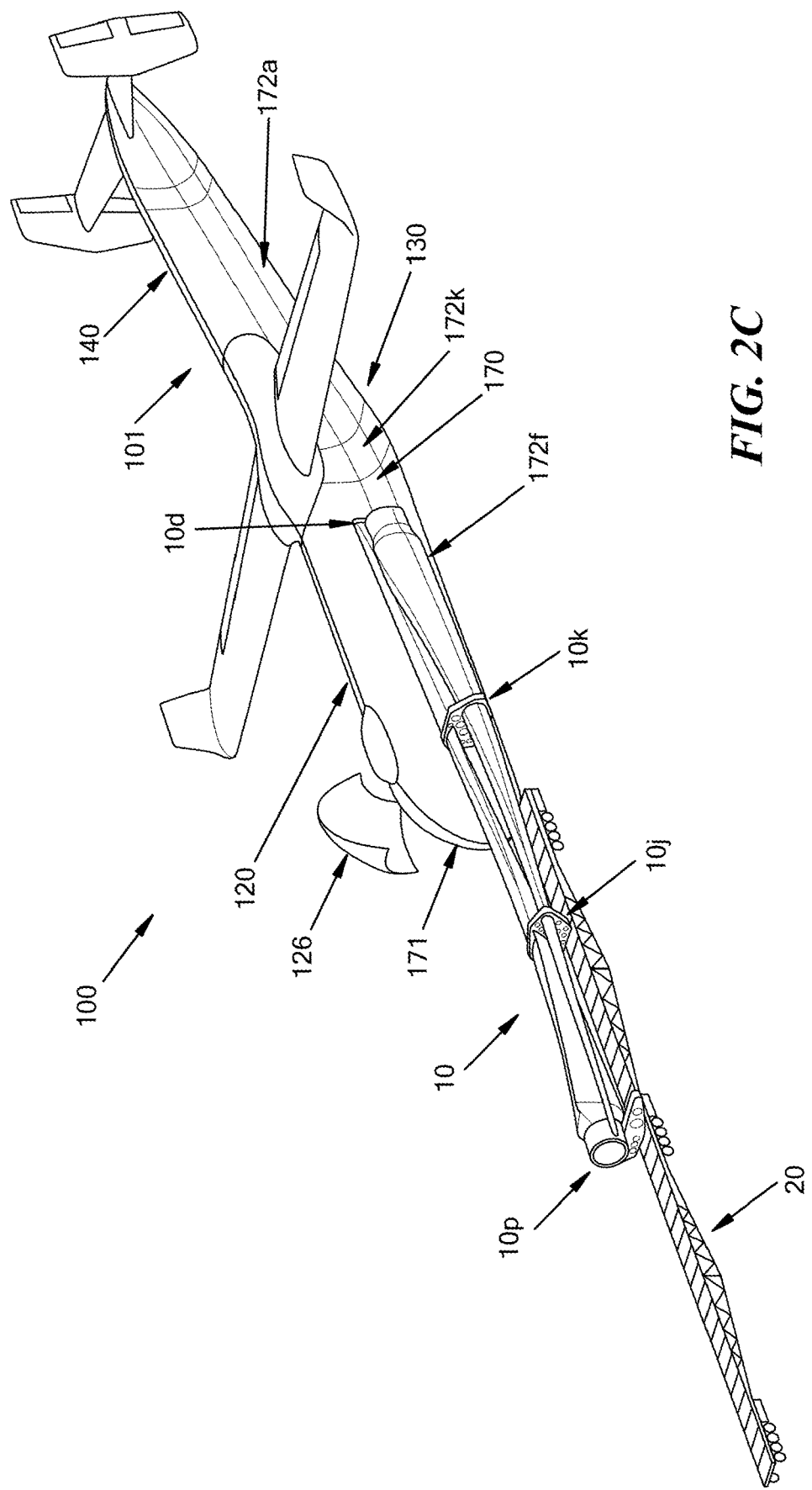
FIG. 2C is an isometric, partial cross-sectional view of the aircraft of FIG. 2B with the payload being partially loaded into the interior cargo bay.
Figure 2D:
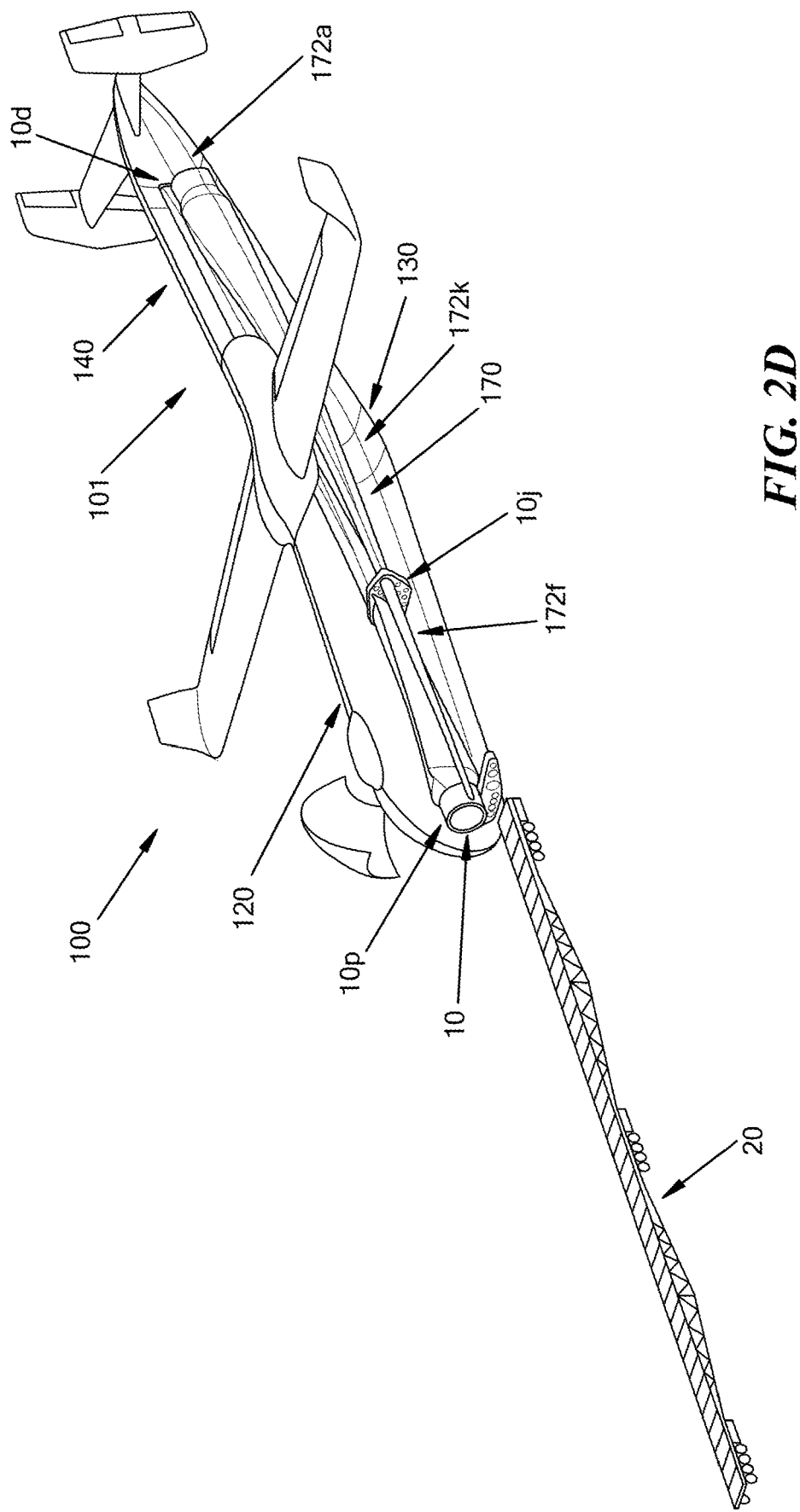
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10$d$ of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10$d$ of the payload 10$d$ is disposed in the interior cargo bay 170 at the aft end 140, a proximal end 10$p$ of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10$p$, 10$d$ extends from the forward end 120, through the kinked portion 130, and into the aft end 140. As shown, the only contact points with a floor of the interior cargo bay 170 (which for these purposes includes the tongue 160) are at the proximal and distal ends 10$p$, 10$d$ of the payload 10 and at two intermediate points 10$j$, 10$k$ between the proximal and distal ends 10$p$, 10$d$, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in counterpart applications, or otherwise known to those skilled in the art.

Kinked Fuselage

FIG. 3A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle $\alpha_{400k}$ of the aft fuselage 440. The kink location 431 is contained in the kinked portion 430 disposed between and connecting the forward and aft ends 420, 440. FIG. 3B shows the forward centerline $C_{F400}$ as being an approximate midpoint between a top-most outer or upper surface 402$f$ and a bottom-most outer or lower surface 403$f$ of the fuselage 401 forward of a lateral axis of rotation A', with the aft centerline $C_{A400}$ being an approximate midpoint between an upper surface 402$a$ and a lower surface 403$a$ of the fuselage 401 aft of the lateral axis of rotation. FIG. 3B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402$a$, 403$a$ extending aft from the kink 431, such that the fuselage 401 aft of the kink 431 has a substantial portion of an approximately constant height or cross-sectional area. This represents only one example, and in other instances the upper surface 402$a$ does not necessarily extend approximately parallel to the lower surface 402$b$ at all even if the aft fuselage still defines a kink 431 in the centerline.

In FIG. 3B, the angle of the aft centerline $C_{A400}$ with respect to the forward centerline $C_{F400}$ defines a kink or bend angle (illustrated as $\alpha_{400K}$ in FIG. 3A), which can be approximately equal to average of an angle $\alpha_{upper}$ of the after upper surface e 402$a$ and an angle $\alpha_{lower}$ of the lower surface 403$a$ with respect to the forward centerline $C_{F400}$ and forward upper and lower surfaces 402$f$, 403$f$ for the case of a constant cross-section forward fuselage 401, as shown in FIG. 3B (hence, FIG. 3B indicating the upper and lower surfaces 402$a$, 403$a$ defining the respective upper and lower angles $\alpha_{upper}$, $\alpha_{lower}$). In some instances, the angles $\alpha_{upper}$, $\alpha_{lower}$ of the aft upper and lower surfaces 402$a$, 403$a$ vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle $\alpha_{lower}$, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal—lateral plane of the cargo aircraft 100, i.e., a plane in which the forward centerline $C_{F400}$ is disposed, the plane extend substantially parallel to the ground or a ground plane $P_{400G}$. Further, the kink angle $\alpha_{400K}$ can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 3C:
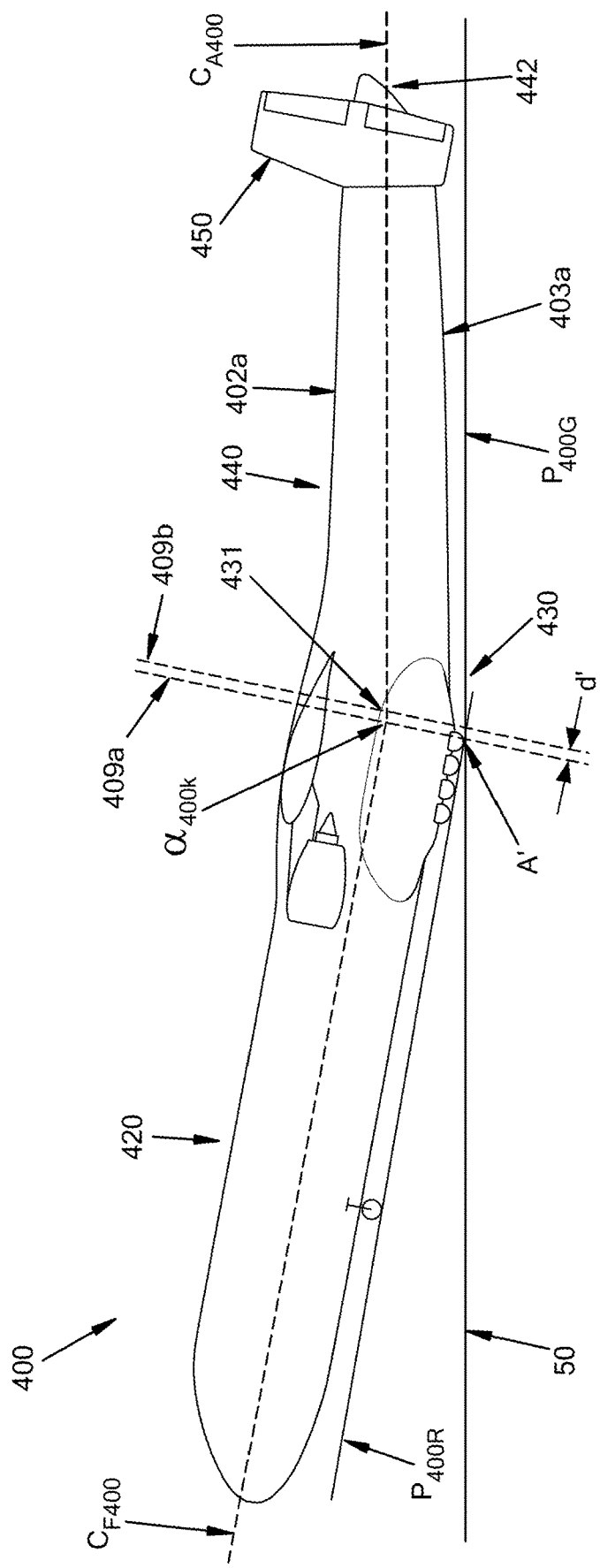
FIG. 3C is a side view of the aircraft of FIG. 3B in a take-off position.
Figure 4:
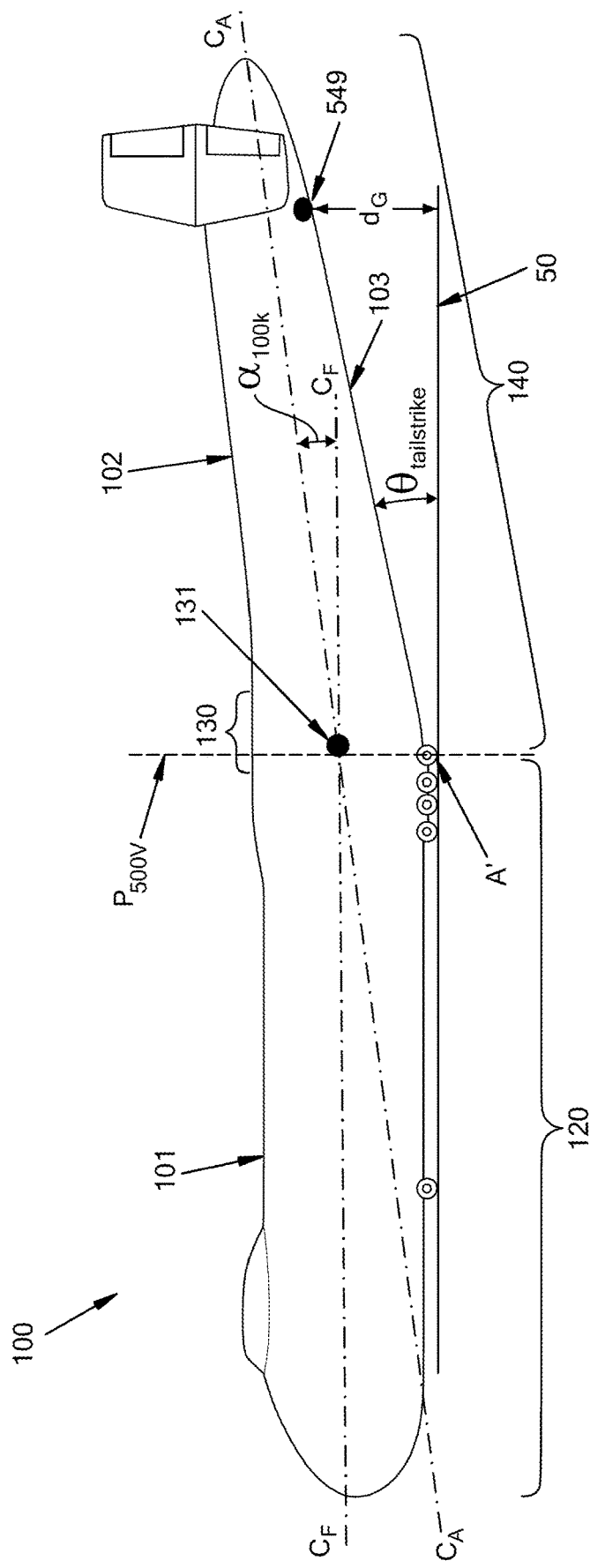
FIG. 4 is the side view of the aircraft of FIG. 1A with some additional details removed for clarity.

In FIG. 3C, the cargo aircraft 400 is shown on the ground 50 and rotated about the lateral axis of rotation to illustrate, for example, a takeoff pitch-up maneuver. In FIG. 3C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 3C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 4 shows this in further detail for the cargo aircraft 100 of FIG. 1A.

In FIG. 4, the aft centerline $C_A$ and forward centerline $C_F$ of the fuselage 101 are shown intersecting at a kink location 131 just aft of the vertical plane $P_{500v}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha_{100K}$ defined by the upslope of the aft centerline $C_A$ with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

Figure 5A:
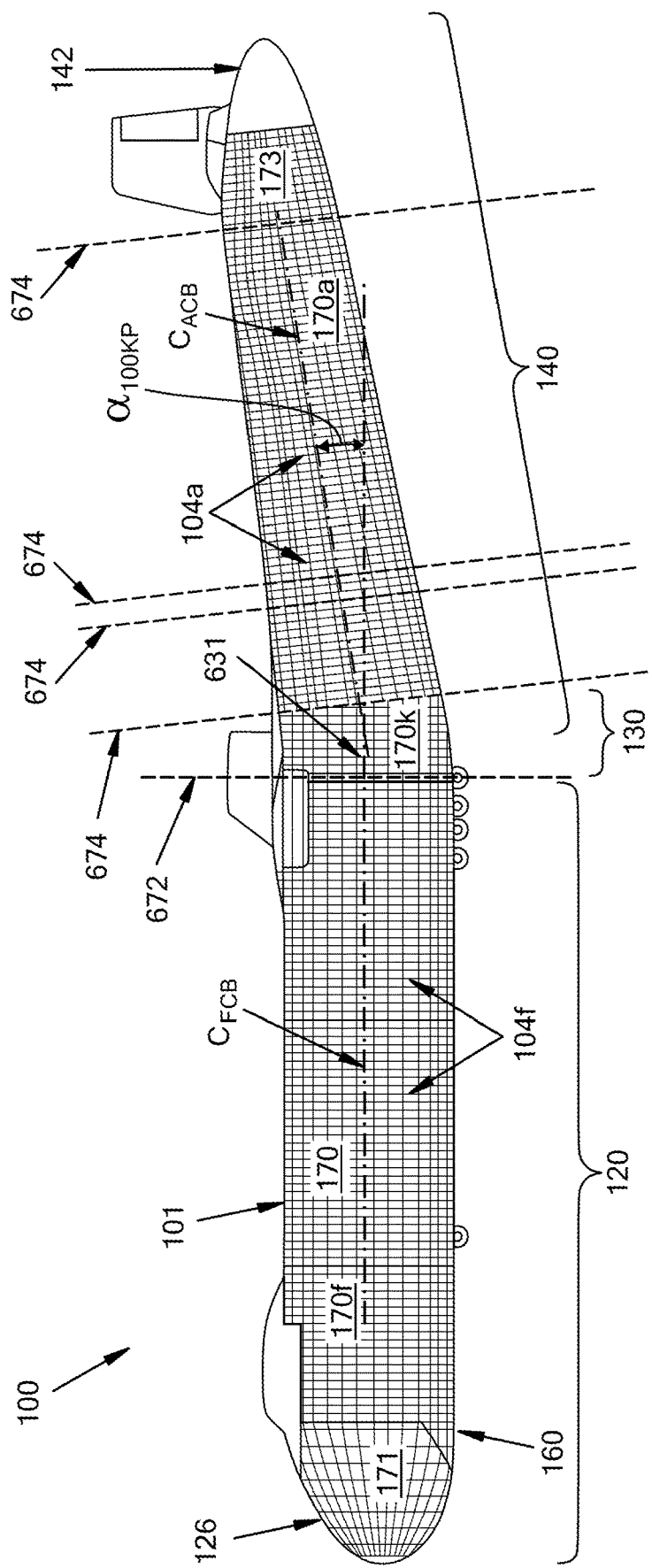
FIG. 5A is a side cross-sectional view of the aircraft of FIG. 4, including an interior cargo bay of the aircraft.

FIG. 5A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 4) and the aft region 170a can generally define an aft cargo centerline $C_{ACB}$ that can be substantially colinear or parallel to the aft fuselage centerline $C_A$ (shown in FIG. 4). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

Figure 5B:
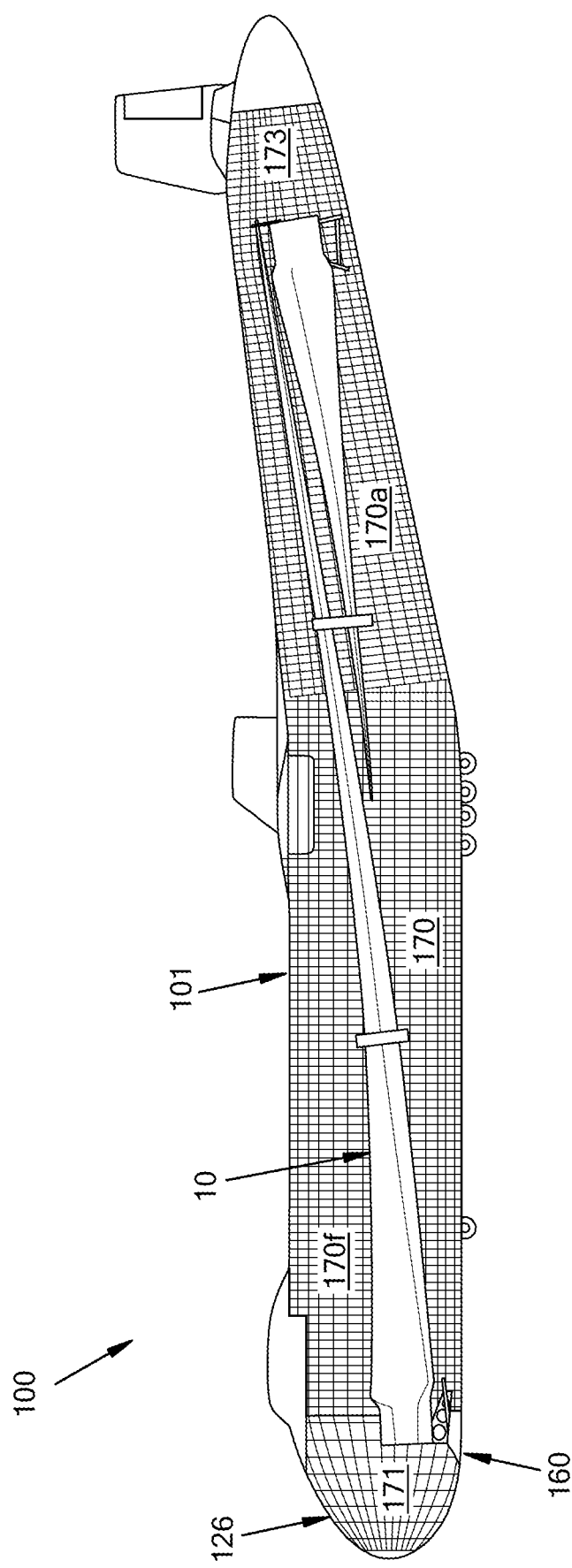
FIG. 5B is the side cross-sectional view of the aircraft of FIG. 5A with an exemplary payload disposed in the interior cargo bay.
Figure 5C:
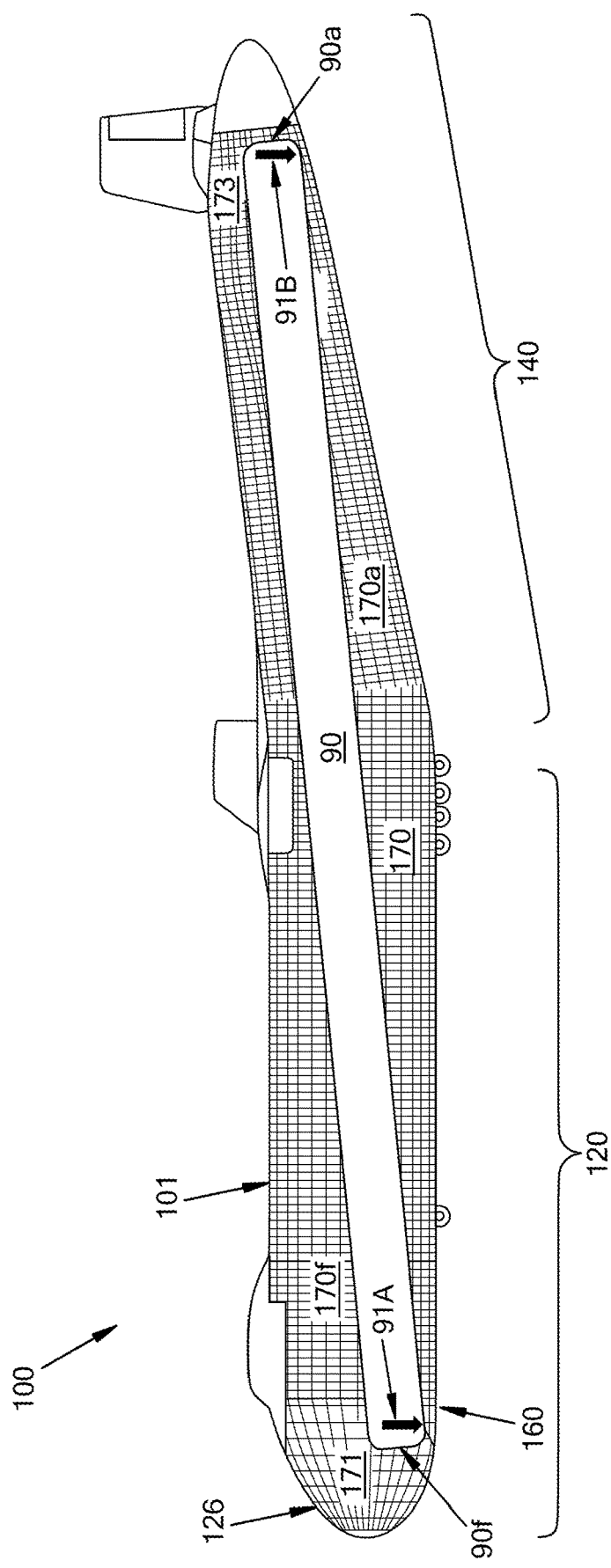
FIG. 5C is the side cross-sectional view of the aircraft of FIG. 5A with a schematic of an exemplary maximum-length payload disposed in the interior cargo bay.

FIG. 5A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 5A) is forward or aft of the fuselage kink 131 (FIG. 4) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIGS. 5B and 5C FIG. 5B shows a side cross-sectional view of the fuselage 101 of the cargo aircraft 100 of FIG. 5A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

FIG. 5C is the same cross-sectional view of the fuselage 101 of the cargo aircraft 100 of FIG. 5B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Figure 5D:
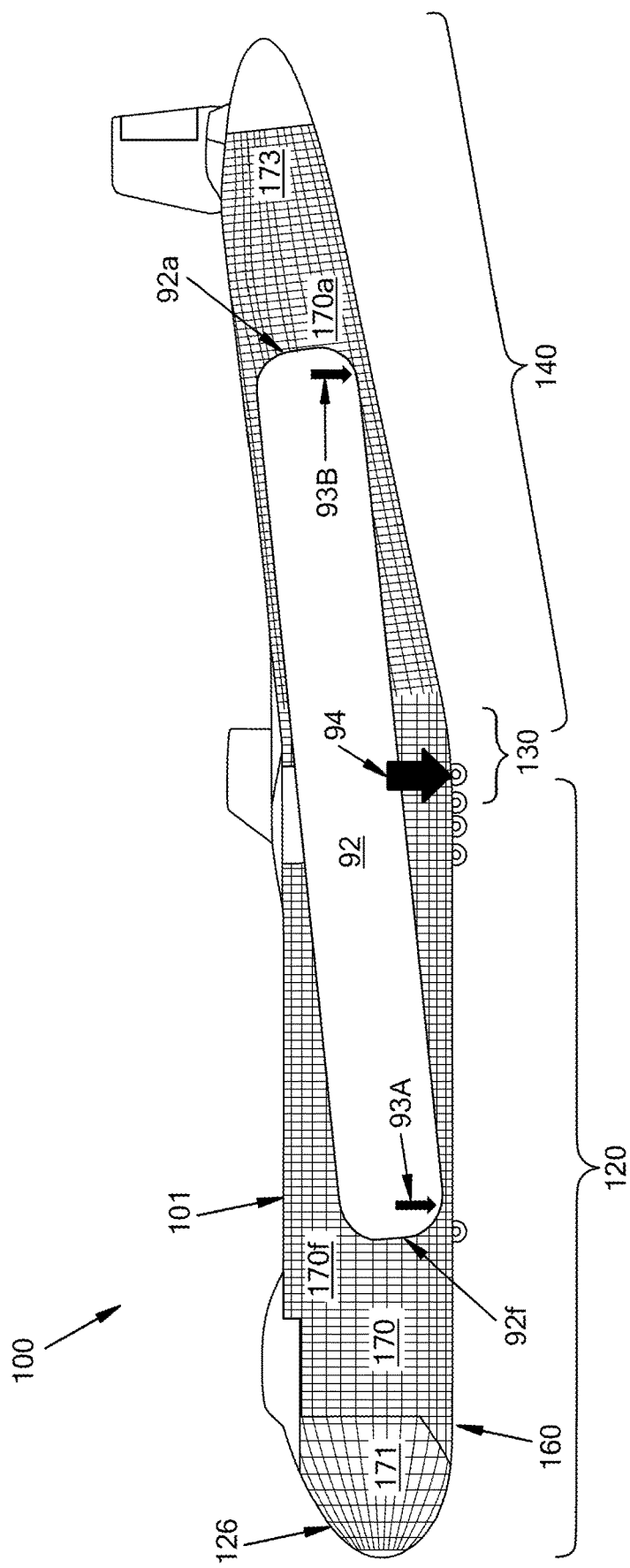
FIG. 5D is the side cross-sectional view of the aircraft of FIG. 5A with a schematic of an exemplary maximum-weight payload disposed in the interior cargo bay of the aircraft.

FIG. 5D is the same cross-sectional view of the fuselage 101 of the cargo aircraft 100 of FIG. 5A with a maximum weight payload 92 secured in the cargo bay 170. A forward end 92f of the maximum weight payload 92 can be secured in the forward region 170f of the interior cargo bay 170 with a first portion of the weight of the payload 92 (shown as vector 93A) being carried by the forward fuselage 120 and an aft end 92a of the maximum weight payload 92 can be secured in the aft region 170a of the interior cargo bay 170 with a second portion of the weight of the payload 92 (shown as vector 93B) being carried by the aft fuselage 140. Advantageously, the substantial length of the cargo bay 170 forward and aft of the a center-of-gravity of the aircraft 100 (e.g., approximately aligned with the kinked region 130) enables positioning of the maximum weight payload 92 such that the payload center-of-gravity (shown as vector 94) substantially close (i.e., within about 30% of wing Mean Aerodynamic Cord (MAC) or about 4% of total aircraft length) to or aligned with the center-of-gravity of the aircraft 100. In some examples, at least about 10% of the weight of maximum weight payload 92 is carried in the aft region 170a. In some examples of carrying a maximum weight payload, especially payloads approaching a maximum length, about 40% to about 50% could be carried in the aft region 170a in order to center the payload's center of gravity at a nominal location in the cargo bay 170.

Additional details about a kinked fuselage configuration are provided in a counterpart patent application entitled "AIRCRAFT FUSELAGE CONFIGURATIONS FOR AVOIDING TAIL STRIKE WHILE ALLOWING LONG PAYLOADS," filed concurrently herewith, the content of which is incorporated by reference herein in its entirety.

Rails and Payload-Receiving Fixtures

Figure 6A:
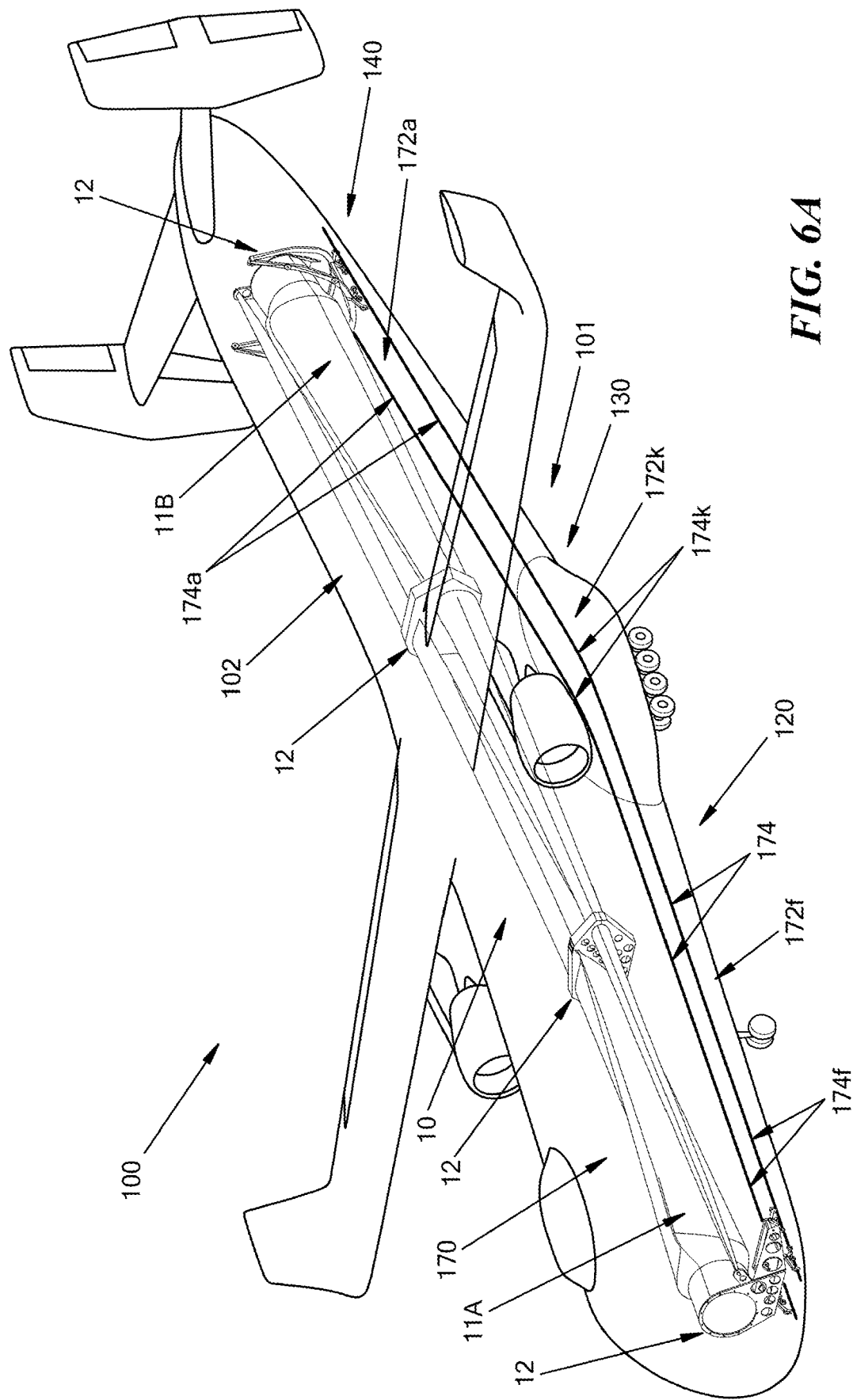
FIG. 6A is an isometric, transparent view of the aircraft of FIG. 1B having the payload disposed therein.
Figure 6B:
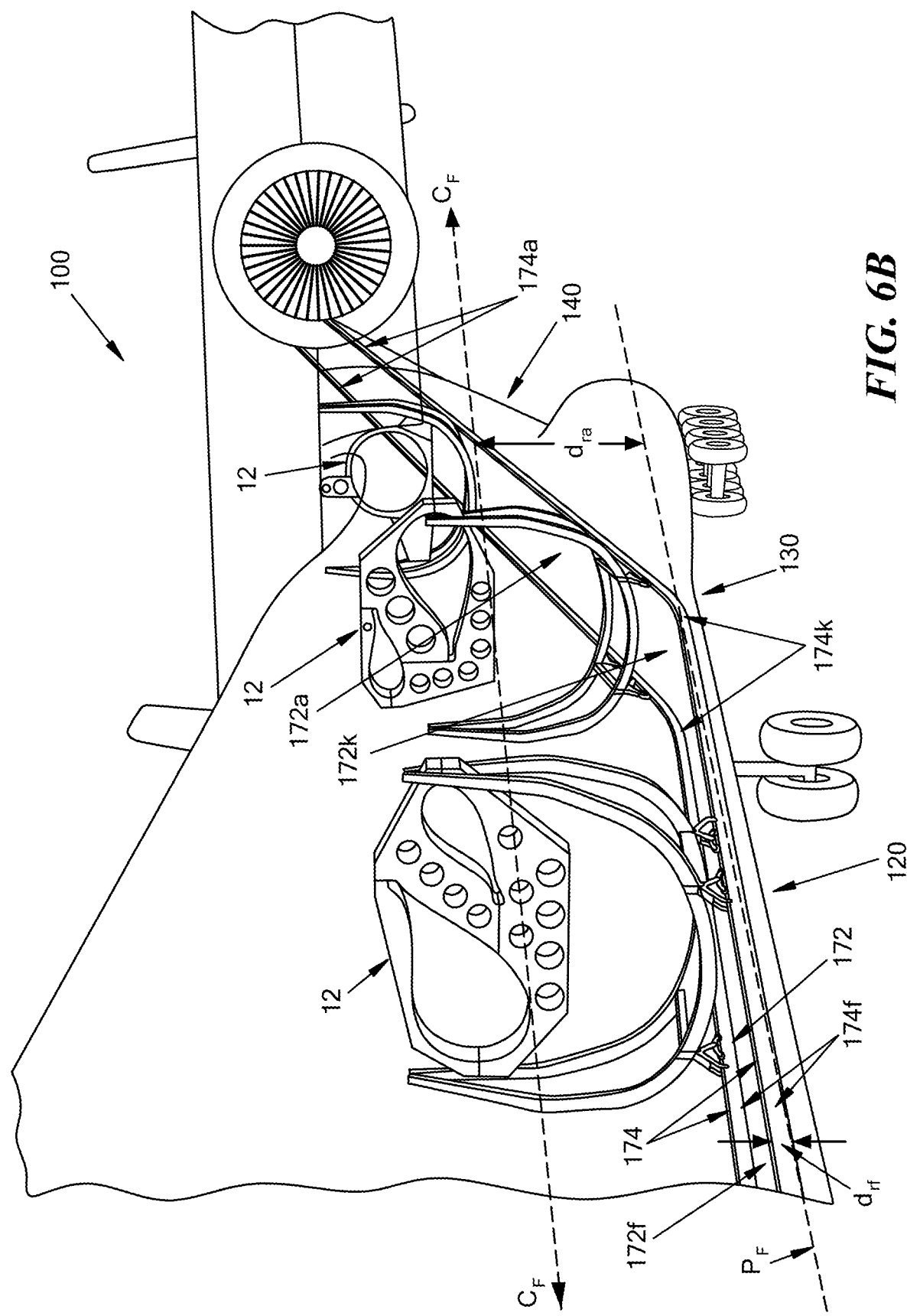
FIG. 6B is a detailed, front-side isometric, transparent view of the aircraft of FIG. 6A with wind turbine blades of the payload hidden from view to better illustrate a pair of rails disposed in the interior cargo bay and exemplary payload-receiving fixtures for holding the wind turbine blades coupled to the rails.
Figure 6C:
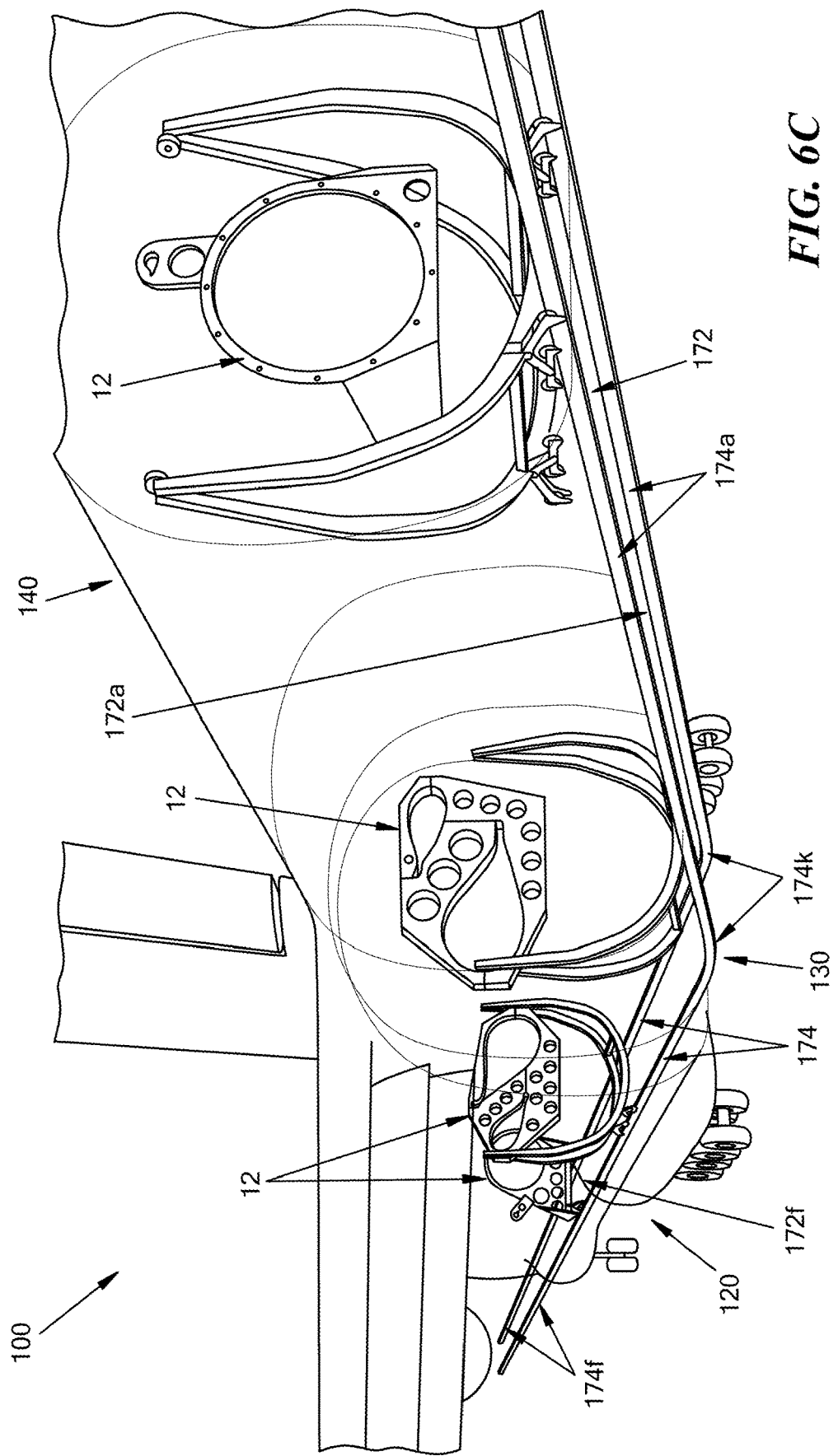
FIG. 6C is a detailed, back-side isometric, transparent view of the aircraft of FIG. 6B.

Hidden from view in the previous figures of the aircraft 100, but illustrated in FIGS. 6A-6C are a pair of rails 174 coupled to, extending from, or otherwise associated with the floor 172 of the cargo bay 170. Some of the illustrations may look incomplete or incompatible with other figures, such as having rails extending beyond what looks like the terminal end of a fixed portion of the fuselage (see, e.g., FIG. 6C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Much like the bay 170 and the floor 172, the rails 174 can extend in a continuous manner from the forward end 120, through the kinked portion 130, and into the aft end 140. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 120 of the aircraft 100, i.e., the plane $P_F$ extending longitudinally and laterally through the forward end 172f of the floor 172 and that is substantially parallel to the forward centerline $C_F$, is greater than a vertical distance $d_{rf}$ between at least a portion of the forward end 174f and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the fuselage tail cone 142, a portion of at least one of the rails 174, as shown both rails 174, disposed in the aft bay portion 172a can also be located above the plane extending substantially through an entirety of the top surface 102 of the forward end 120 of the fuselage 101. The angle at which the rails 174 are disposed in the aft bay portion 170a can be akin to the kink angle $\alpha_K$. More generally, the rails 174 can extend in a manner such that a majority of it disposed in the aft bay portion 170a is disposed at the kink angle $\alpha_K$. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 6A-7. As shown best in FIG. 7, the fixtures 12 can have a variety of configurations that are configured to both receive a payload, such as wind turbine blades 11A, 11B (of fewer or more blades as desired) and translate along the rails 174 to place the payload at the desired location(s).

The payload-receiving fixtures 12, as shown fixtures 112, 212', 312, 412, can generally include a carriage 114, 114', a frame 116, and a receiver 118, 218, 318, 418. In at least some of the illustrated embodiments, a single type of carriage and a single type of frame are provided, while four different receivers are illustrated. A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, like the receivers 118, 218, 318, 418, and thus such usage of the term "payload-receiving fixture" herein, including in the claims, can be directed to just a receiver as provided for herein. Generally that term in any claim should be read in that manner, unless such interpretation would be incompatible with the remaining portion of the claim, for example, if the claim separately recites a receiver.

Some of the illustrations may look incomplete or incompatible with other figures, such as looking like a receiver is not quite properly coupled to a frame (see, e.g., FIGS. 6B, 6C, and 7 as filed) or the fixture 12 not being in contact with the rails 174 (see, e.g., FIG. 7), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Figure 7:
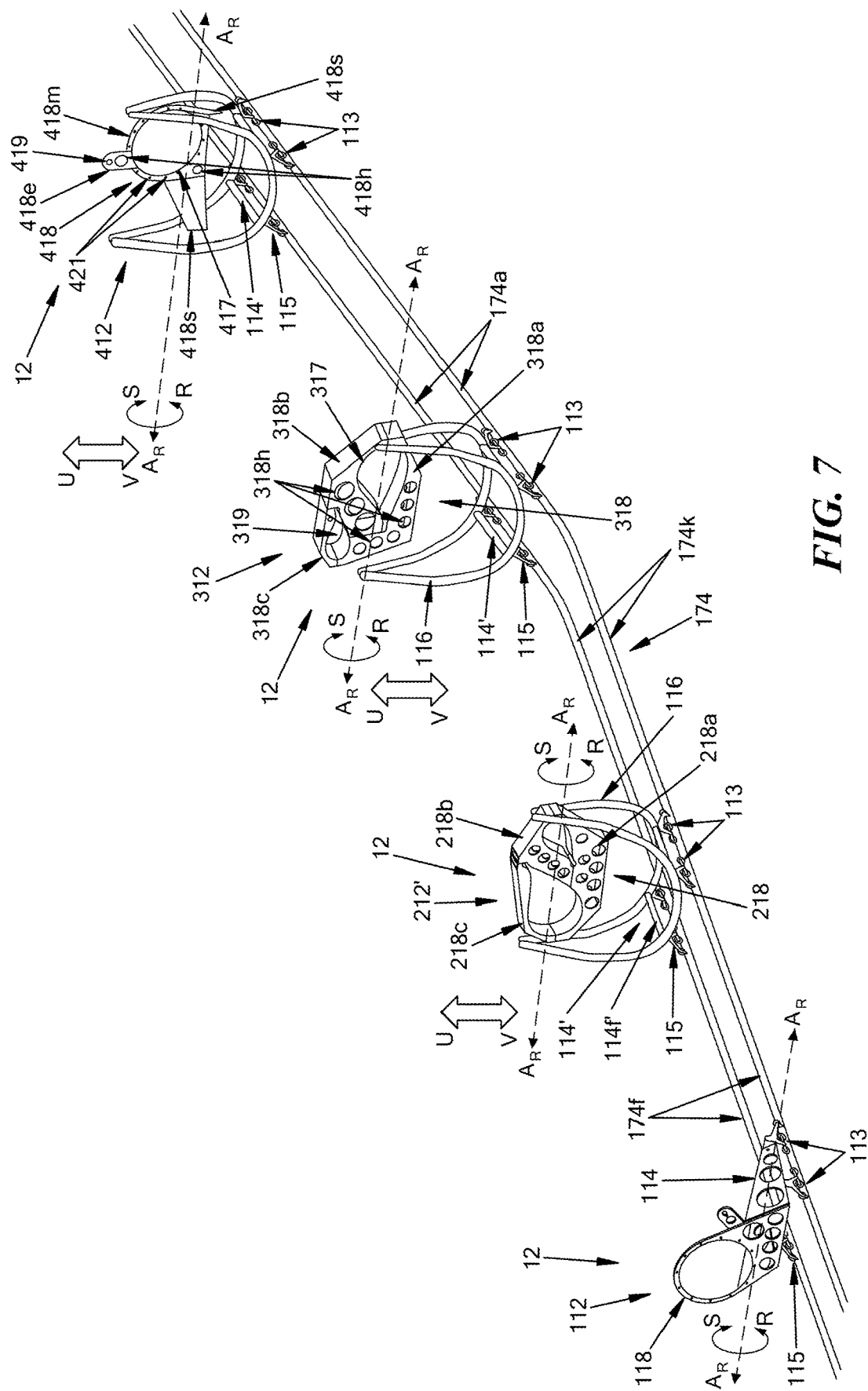
FIG. 7 is an isometric view of the rails and payload-receiving fixtures of FIG. 6B.
Figure 8A:
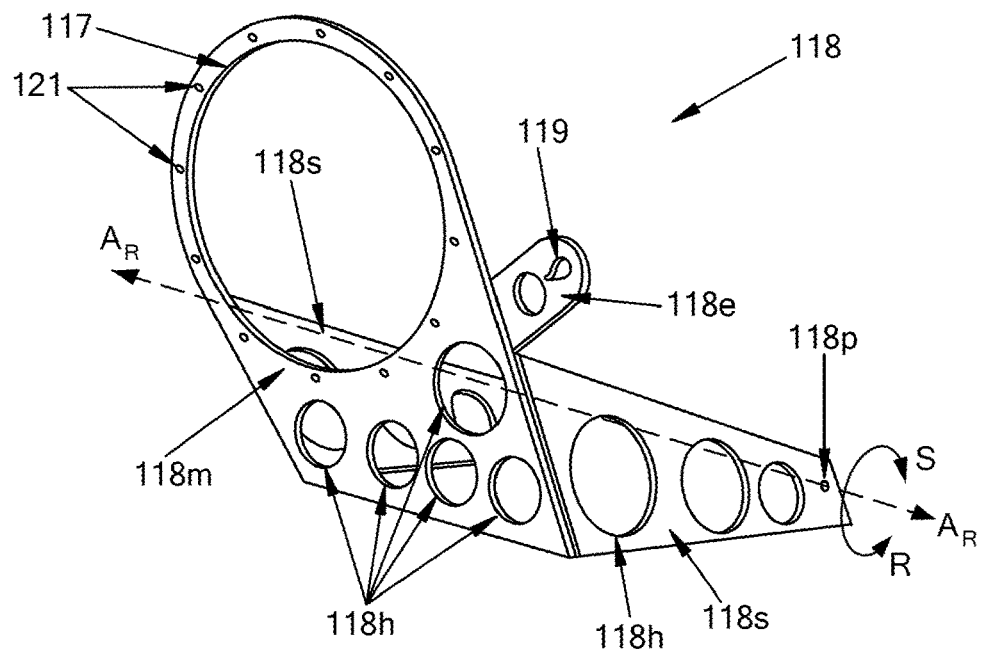
FIG. 8A is an isometric view of one receiver of a payload-receiving fixture of the payload-receiving fixtures of FIG. 7.
Figure 8B:
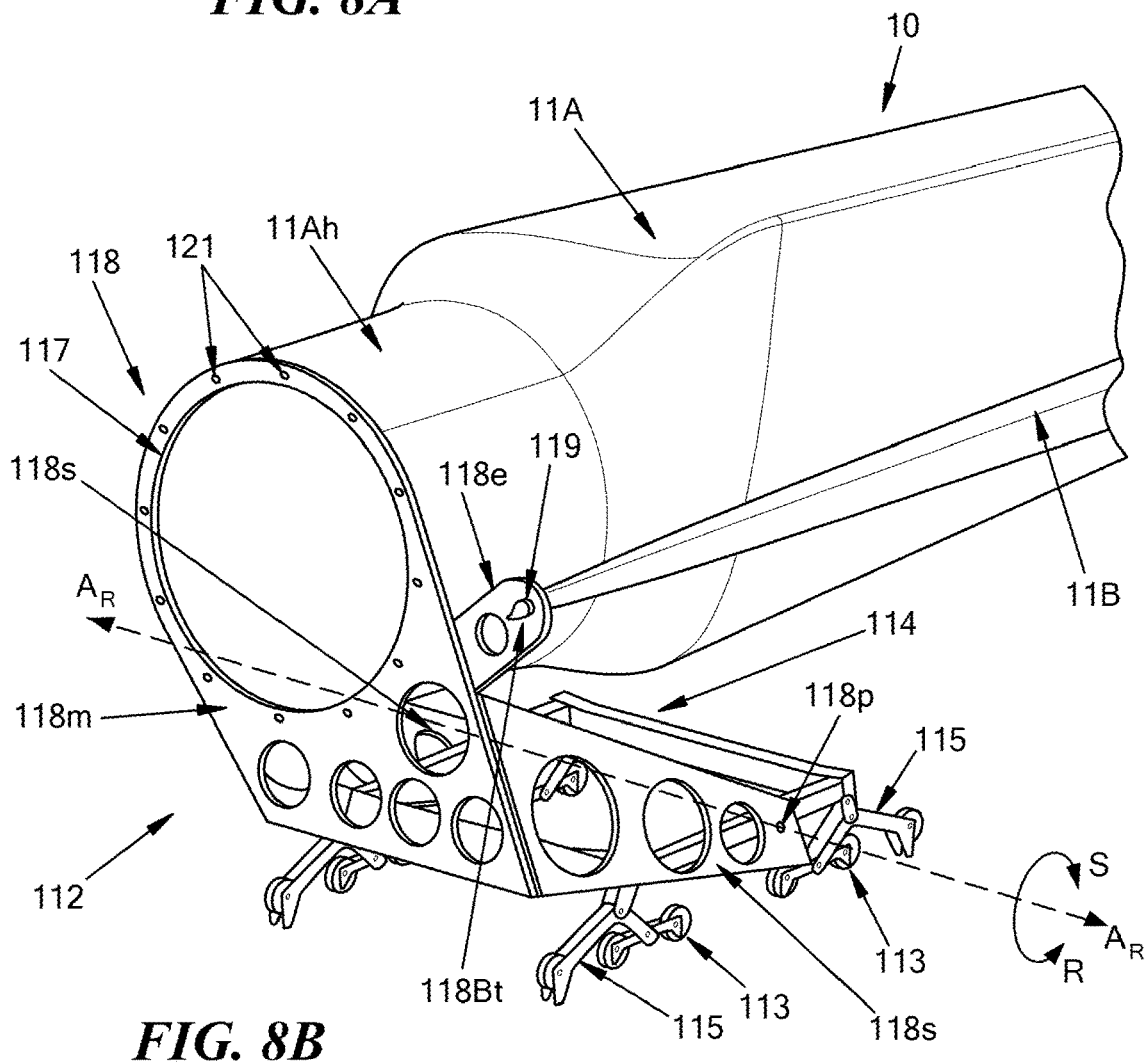
FIG. 8B is an isometric view of the receiver of FIG. 8A receiving two wind turbine blades, the receiver being part of a payload-receiving fixture of the payload-receiving fixtures of FIG. 7.

As shown in FIGS. 7-8B, a first payload-receiving fixture 112 includes a carriage 114 and a receiver 118, the receiver 118 being shown separately in FIG. 8A. While further details of the carriage 114 are described below with respect to FIG. 12, the carriage can generally be configured to have any of the receivers provided for herein, including the receiver 118 as illustrated, coupled to it. Alternatively, the carriage 114 can be configured to have a frame mounted to it, as shown at least in FIG. 7 with respect to the frame 116. Any known techniques for mounting the receiver 118 to the carriage 114 can be employed, whether provided for herein or otherwise known to those skilled in the art. In the illustrated embodiment, pins can be disposed through pin-receiving openings 118p to couple the receiver 118 to the carriage, also allowing for rotation about a pivot axis $A_R$, as described further below. Additional coupling locations between the receiver 118 and the carriage 114 can also be provided to provide sufficient support of the payload held by the receiver 118. For example, the receiver 118 may be rigidly connected to the carriage 114 via a welded joint along the top frame member of the carriage 114 or by way of an elastic flexure element. The carriage 114 can include wheel sets 113 and whiffle trees 115 that aid in both moving the receiver 118, and thus a payload 10 received by the receiver 118, and can also help spread the weight of the payload 10 more evenly through the first payload-receiving fixture 112.

The receiver 118 is illustrated as a three-sided structure comprising a main receiving panel 118m and two side panels 118s extending substantially perpendicular to the main receiving panel 118. The two side panels 118s in the illustrated embodiment are substantially alike, although they do not have to be configured in that manner. An extension 118e can also extend from the main receiving panel 118m, and in the illustrated embodiment the extension 118e is substantially planar with the main receiving panel 118m. The location of the extension 118e, like the location of all of the features of the receiver 118 and/or the payload-receiving fixture 112 more generally (and any receivers and payload-receiving fixtures provided for herein or otherwise derivable from the present disclosures), can be a function of the determined preferred orientation of the structures being held as part of the payload (e.g., the blades 11A, 11B), with factors impacting the same including reducing or eliminating excessive motion of the payload, minimizing an amount of space consumed by the payload, maintaining a desired center of gravity of the payload when it is loaded onto the aircraft, and/or preventing any contact or other potential damage to any or all portions of the payload. The main receiving panel 118 is configured to be a terminal end payload-receiving fixture, meaning it is designed to receive terminal ends of the payload 10. In the illustrated embodiment the payload 10 includes two wind turbine blades 11A, 11B, and the receiver 118 receives a terminal end of each of the two blades 11A, 11B. As shown, the main receiving panel 118 includes a large receiving opening 117 more generally configured to receive a portion of a large structure, for example a terminal end of the wind turbine blade 11A that is its root or hub 11Ah. The portion of the large structure can be secured with respect to the receiver 118 using any techniques known to those skilled in the art. In the illustrated embodiment, fasteners (e.g., screws) are passed into and through pre-formed holes 121 disposed around a circumference of the opening 117 in the main receiving panel 118m, into the hub 11Ah of the wind turbine blade 11A, to couple the wind turbine blade 11A to the receiver 118. The extension further includes a small receiving opening 119 configured to receive a portion of a large structure, for example a terminal end of a second wind turbine blade 11B that is its tip 11Bt, again as shown in FIG. 8B. The portion of the large structure can also be secured with respect to the receiver 118 using any techniques known to those skilled in the art. In the illustrated embodiment, the opening 119 is sized and shaped (as shown, a tear-drop shape) in a manner that allows the tip11Bt to be secured into or otherwise held within the opening 119 without causing any damage to the blade tip 11Bt that would detrimentally impact its performance. A person skilled in the art will recognize other ways by which a blade(s) can be coupled to any of the receivers provided for herein.

One or more additional holes or openings 118h (not all are labeled, and the terms holes and openings may be used interchangeably herein) can be formed in the receiver 118. In the illustrated embodiment there are five small to medium-sized openings in the main panel 118m, three small to medium-sized openings in each of the side panels 118s, and one small-sized opening in the extension 118e, although any other number of configurations, sizes, shapes, amounts, etc. are possible. The openings 118h can serve a variety of purposes, including but not limited to reducing the weight of the fixture 112 and/or providing possible locations where the fixture 112 can be secured within a cargo bay of an aircraft, such as by tying a rope or chain or the like through one or more of the openings and tightening accordingly to secure the location of the fixture 112, and thus the payload 10 secured by the fixture 112, within a cargo bay. Securing the payload can include securing it to the rail 174 and/or securing it to one or more other locations disposed in the interior cargo bay 170. A pin-receiving hole 118p is disposed in each of the side panels 118s (only one is visible; the other is similar located on the other panel 118s), the pin-receiving holes defining a pivot axis $A_R$ about which the receiver 118 can rotate, in directions R and S. Rotation of the receiver 118 about the pivot axis $A_R$ can allow for flexibility as the payload is moved along a surface, such as the rails 174, preventing the fixture 112 from getting undesirably jammed or stuck at certain portions along the length of the rails 174 during translation of the payload 10 along the rails. Such rotation can also allow for the blades 11A, 11B to flex and/or rotate, for example, when the blades 11A, 11B are being moved at an angle, such as when moving through the kinked and aft portions 170k, 170a of the interior cargo bay 170. The flexing and/or rotating can be due, for example, to the payload-receiving fixtures being moved at an angle and/or due to other payload-receiving fixtures with which the fixture is being used being moved at an angle.

Figure 9A:
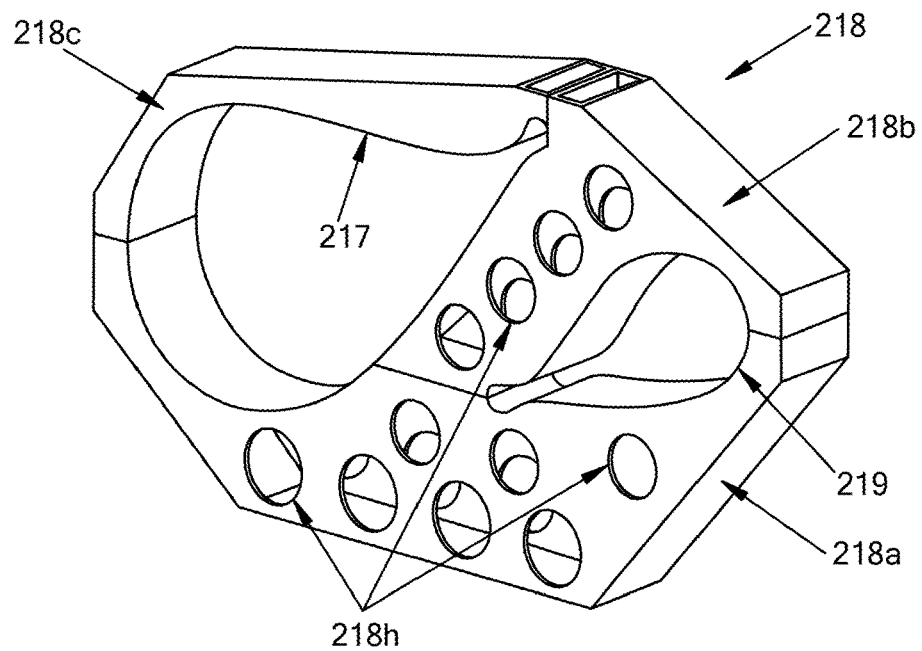
FIG. 9A is an isometric view of another receiver of another payload-receiving fixture of the payload-receiving fixtures of FIG. 7.
Figure 9B:
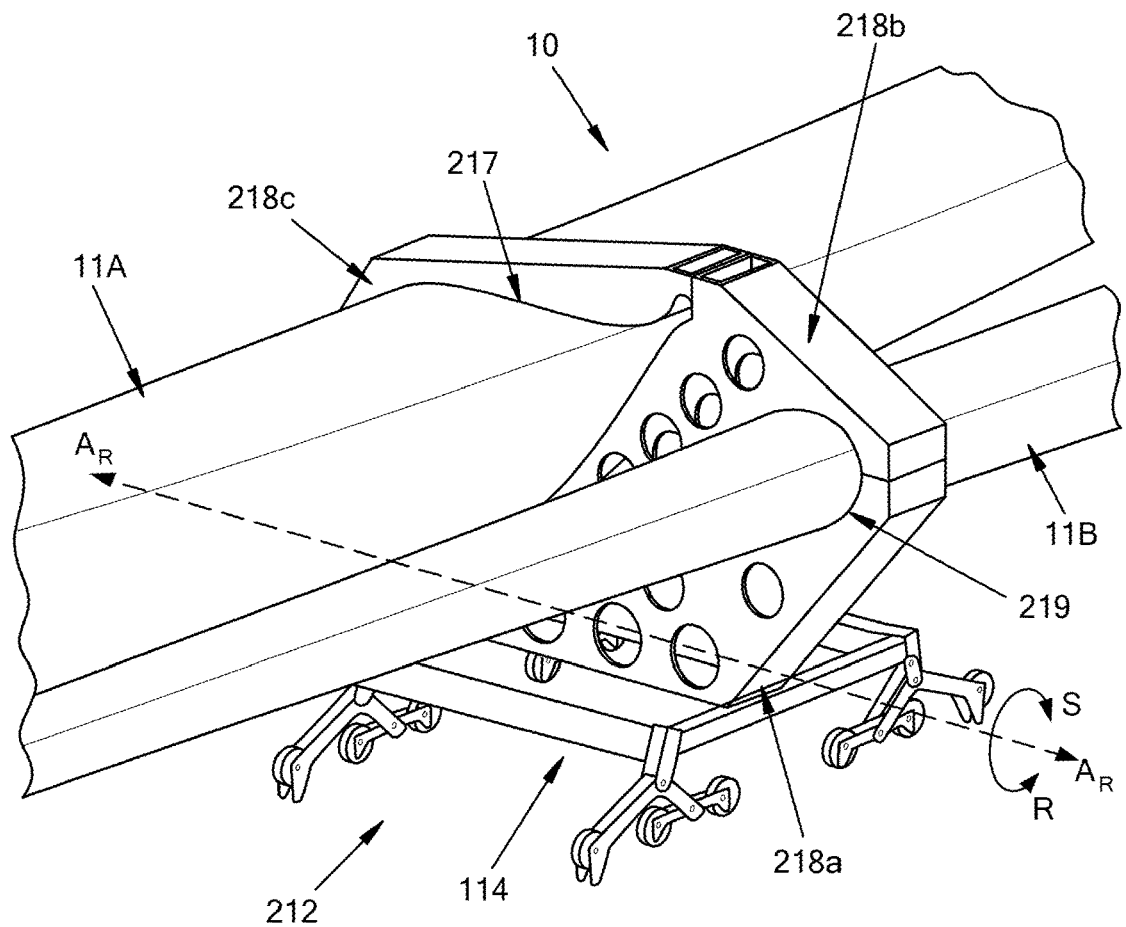
FIG. 9B is an isometric view of the receiver of FIG. 9A receiving two wind turbine blades, the receiver being part of another payload-receiving fixture of the payload-receiving fixtures of FIG. 7.

A second payload-receiving fixture 212', 212 is provided for in FIGS. 7 and 9A-9B, respectively. The carriage 114', 114, wheel sets 113, and whiffle trees 115 are the same as discussed above with respect to the first payload-receiving fixture 112 (except as noted with respect to the carriage 114', 114), and thus can aid in both moving the receiver 218, and thus a payload 10 received by the receiver 218, and also help spread the weight of the payload 10 more evenly through the second payload-receiving fixture 212, 212'. Both the fixture 212' and the fixture 212 also include the same receiver 218. The primary difference between the two fixtures 212', 212 is that the fixture 212' includes a frame 116 that is incorporated into the carriage 114', supporting the receiver 218, while the fixture 212 is mounted directly to the carriage 114. Any known techniques for mounting or otherwise integrating the frame 116 or the receiver 218 to the carriage 114', 114 can be employed, whether provided for herein or otherwise known to those skilled in the art. In the embodiment illustrated in FIG. 7, the frame 116 replaces two bars of the frame 114f of the carriage 114', while in FIG. 9B, although no components are illustrated, a component like a clevis fitting and pins (see FIG. 19A) or other flexible coupling mechanism can be used to couple the receiver 218 to the carriage 114. Use of a flexible coupling mechanism can allow for rotation of the receiver 218 of the second payload-receiving fixture 212 about the pivot axis $A_R$, in directions R and S, providing similar rotational flexibility and benefits as described with respect to other embodiments. Such rotational flexibility, and related benefit, can also be provided with respect the receiver 218 of the second payload-receiving fixture 212', for instance by using pins or the like to mount the receiver 218 to the frame 116—similar to the way a receiver 1018 is mounted to a frame 1016 as discussed below with respect to FIG. 19B. In some embodiments, like that of FIG. 7, the mounting of the receiver 218 to the frame 116 can also allow for vertical translation in directions U and V, one such exemplary embodiment also being illustrated with respect to the receiver 1018 and frame 1016 illustrated in FIG. 19B. A person skilled in the art will recognize various mounting configurations that can be used to allow for both the illustrated rotational and translational movement of the receiver 218 with respect to the frame 116, and thus the fixture 212' with respect to the rails 174, including but not limited to the mounting illustrated with respect to the receiver 1018 and frame 1016 of FIG. 19B, hydraulics, and/or linear actuators. The vertical translation, like the rotation about the pivot axis $A_R$, can also allow for the blades 11A, 11B to flex, for example, when the blades 11A, 11B are being moved at an angle, such as when moving through kinked and aft portions of an interior cargo bay (e.g., the kinked and aft portions 170k, 170a of the interior cargo bay 170). The flexing and/or rotating can be due, for example, to the payload-receiving fixtures being moved at an angle and/or due to other payload-receiving fixtures with which the fixture is being used being moved at an angle. As described further below, such rotational and/or translational movements can be passive or active, and such movements can occur while the payload is being translated, or while it is stationary.

The receiver 218 is illustrated as a three-piece structure comprising a first piece 218a, also referred to as a base piece, a second piece 218b, also referred to as a main securing piece, and a third piece 218c, also referred to as a secondary securing piece. The pieces 218a, 218b, 218c can be coupled together using any techniques known to those skilled in the art (e.g., having threaded configurations, male-female adapters, etc.), but in the illustrated embodiment they can be fit together and affixed to form a secure connection therebetween. The receiver 218 is designed to be part of an intermediate payload-receiving fixture to receive an intermediate portion(s) of the payload 10. In the illustrated embodiment the payload 10 includes two wind turbine blades 11A, 11B, and the receiver 218 receives an intermediate portion of each of the two blades 11A, 11B. As shown, each of the first piece 218a, the second piece 218b, and the third piece 218c can be complementary to each other such that first, second, and third receiving surfaces, respectively, thereof can define a large receiving opening 217 configured to more generally receive a portion of a large structure, for example an intermediate portion of the wind turbine blade 11A. Further, the first piece 218a and the second piece 218b can be complementary to each other such that a fourth and fifth receiving surface, respectively, thereof can define a smaller receiving opening 219 also configured to more generally receive a portion of a large structure, for example an intermediate portion of the wind turbine blade 11B. Each portion of the large structure can be secured with respect to the receiver 218 using any techniques known to those skilled in the art. In the illustrated embodiment, the openings 217, 219 are sized and shaped (as shown, each has a tear-drop shape) in a manner that allows the intermediate portion of the blades 11A, 11B to be held secure enough with respect to the receiver 218 so they do not fall out of the openings 217, 219 while not sustaining any damage that would determinately impact their performance. Given the length of the blades 11A, 11B, there is little to no risk they will fall out of the openings 217, 219.

Similar to the receiver 118, the receiver 218 can include one or more additional holes or openings 218h (not all are labeled) formed therein. In the illustrated embodiment there are seven holes in the first piece 218a and four in the second piece 218b, although any other number of configurations, sizes, shapes, amounts, etc. are possible. The holes 218h can serve similar purposes and uses as described with respect to the holes 118h above.

In one exemplary technique for securing the wind turbine blades 11A, 11B with respect to the receiver 218, the base piece 218a can first receive one or both turbine blades 11A, 11B before receiving either of the securing pieces 218b, 218c. A surface area defined by the portion of the base piece 218a that defines the openings 217, 219 can be such that it adequately supports to blades 11A, 11B without having them easily fall off the receiver 218. Then the main receiving piece 218b can be coupled to the base piece 218a to both secure the location of the blade 11B with respect to the receiver 218 by causing it to become encircled by the portion of the receiver 218 that defines the opening 219, as shown fourth and fifth receiving surfaces of the first and second pieces 218a, 218b, respectively, and to provide a further support surface for the blade 11A. Subsequently the secondary securing piece 218c can be coupled to each of the base and main securing pieces 218a, 218b to secure the location of the blade 11A with respect to the receiver 218, encircling it with the portion of the receiver 218 that defines the opening 217, as shown first, second, and third receiving surfaces of the first, second, and third pieces 218a, 218b, 218c, respectively. Alternatively, the main and secondary securing pieces 218b, 218c can be coupled together first before both are coupled at about the same time to the first piece 218a. In some embodiments, the main and secondary securing pieces can be an integrally formed as a singular securing piece. In still other embodiments, one or both openings 217, 219 can be fully defined by the pieces 218a, 218b, 218c prior to receiving the blades 11A, 11B, and thus the blades 11A, 11B can be slid into place within the respective openings 217, 219. A person skilled in the art, in view of the present disclosures will understand many other configurations the receiver 218 can have, including fewer or more pieces, differently shaped and configured pieces, and/or fewer or more openings for receiving large structures of a payload.

To that end, and by way of non-limiting alternative example, a third payload-receiving fixture 312 provided for in FIG. 7 is mainly akin to the second fixture 212', including the carriage 114', wheel sets 113, whiffle trees 115, and frame 116, but a differently configured receiver 318 is provided. The receiver 318 is also a three-piece structure comprising a first or base piece 318a, a second or main securing piece 318b, and a third or secondary securing piece 318c. The pieces 318a, 318b, 318c can be coupled together using any techniques known to those skilled in the art, but in the illustrated embodiment they can be fit together and affixed to form a secure connection therebetween. Like the receiver 218, the receiver 318 is designed to be part of an intermediate payload-receiving fixture to receive an intermediate portion(s) of the payload 10, e.g., intermediate portions of the two wind turbine blades 11A, 11B (not shown in FIG. 7). A bit different than the receiver 218, in this embodiment first and second receiving surfaces of the first and second pieces 318a, 318b, respectively, define a large receiving opening 317 while each of third, fourth, and fifth receiving surfaces of the first, second, and third pieces 318a, 318b, 318c, respectively, define a smaller receiving opening 319. The openings 317, 319 are configured and operate in a similar manner as the openings 217, 219 described above. Further, similar to both receivers 118 and 218, the receiver 318 can include one or more additional holes or openings 318h (not all are labeled) formed therein. In the illustrated embodiment there are six holes in the first piece 318a and three in the second piece 318b, although any other number of configurations, sizes, shapes, amounts, etc. are possible. The holes 218h can serve similar purposes and uses as described with respect to the holes 118h above. The fixture 318 can be mounted to the frame 116 in a manner akin to the fixture 218 and frame 116, thus allowing for both rotational movement about the pivot axis $A_R$ in the directions R and S, and translational movement in the directions U and V, for similar purposes and benefits as described herein.

In one exemplary technique for securing the wind turbine blades 11A, 11B (not shown in FIG. 7) with respect to the receiver 318, the base piece 318a can first receive the wind turbine blade 11B and then the main securing piece 318b can be coupled to the base piece to both secure the location of the blade 11B with respect to the receiver 318 by causing it to become encircled by the portion of the receiver 318 that defines the opening 317, as shown first and second receiving surfaces of the first and second pieces 318a, 318b, respectively, and to provide a further support surface for the blade 11A. Subsequently the secondary securing piece 318c can be coupled to each of the base and main securing pieces 318a, 318b to secure the location of the blade 11A with respect to the receiver 318, encircling it with the portion of the receiver 318 that defines the opening 319, as shown third, fourth, and fifth receiving surfaces of the first, second, and third pieces 318a, 318b, 318c, respectively. As described above, other configurations of receivers having multiple pieces are possible, and thus the embodiments illustrated with respect to the receivers 218 and 318 are just two, non-limiting embodiments.

A fourth payload-receiving fixture 412 is provided for in FIG. 7. The fixture 412 includes the carriage 114', the frame 116, and a receiver 418. The carriage 114', and associated wheel sets 113 and whiffle trees 115, are akin to those described herein, as is the frame 116 that is integrated with the carriage 114'. The fixture 412, like the fixture 112, is designed to be a terminal end receiving fixture, and thus it is more akin to the receiver 118. For example, the receiver 418 is a three-sided structure that comprises a main receiving panel 418m, two side panels 418s, and an extension 418e. In the illustrated embodiment, the two side panels 418s extend non-orthogonally from the main panel 418m and the extension 418e is substantially planar with the main receiving panel 418e. Like the receiver 118, the main panel 418m includes a large receiving opening 417 more generally configured to receive a portion of a large structure, for example a terminal end of the wind turbine blade 11B that is its root or hub (not shown). The portion of the large structure can be secured with respect to the receiver 418 using any techniques known to those skilled in the art. In the illustrated embodiment, fasteners (e.g., screws) are passed into and through pre-formed holes 421 disposed around a circumference of the opening 417 in the main receiving panel 418m, into the hub of the wind turbine blade, to couple the wind turbine blade to the receiver 418. The extension further includes a small receiving opening 419 configured to receive a portion of a large structure, for example a terminal end of the wind turbine blade 11A that is its tip (not shown). The portion of the large structure can also be secured with respect to the receiver 418 using any techniques known to those skilled in the art, similar to the opening 119 of the fixture 118. Further, similar to the receivers 118, 218, and 318, the receiver 418 can include one or more additional holes or openings 418h (not all are labeled or visible; a second one on the main panel 418m can be present as a mirror image of the one that is labeled) formed therein. In the illustrated embodiment there are two holes in the main panel 418m and one hole in the extension 418e, although any other number of configurations, sizes, shapes, amounts, etc. are possible. The holes 418h can serve similar purposes and uses as described with respect to the holes 118h above. The fixture 418 can be mounted to the frame 116 using several techniques known to those skilled in the art, including those described below with respect to FIGS. 15A and 15B. In at least some embodiments, the connection between the fixture 418 and the frame 116 can be such that it allows for both rotational movement about the pivot axis $A_R$ in the directions R and S, and translational movement in the directions U and V, for similar purposes and benefits as described herein.

Figure 10A:
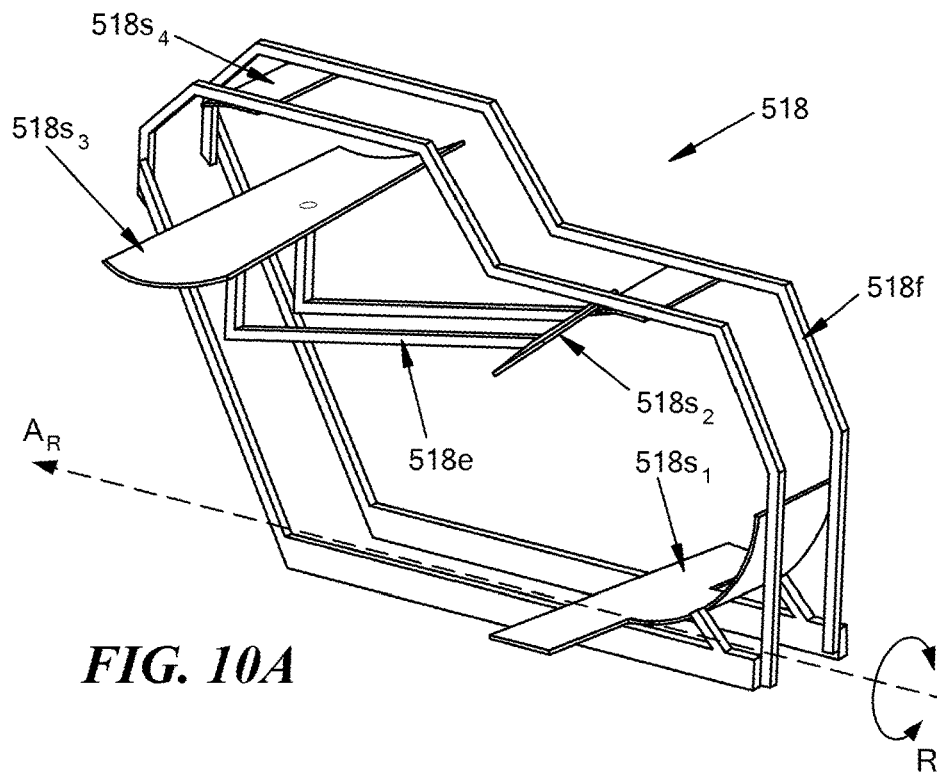
FIG. 10A is an isometric view of another exemplary embodiment of a receiver of a payload-receiving fixture.
Figure 10B:
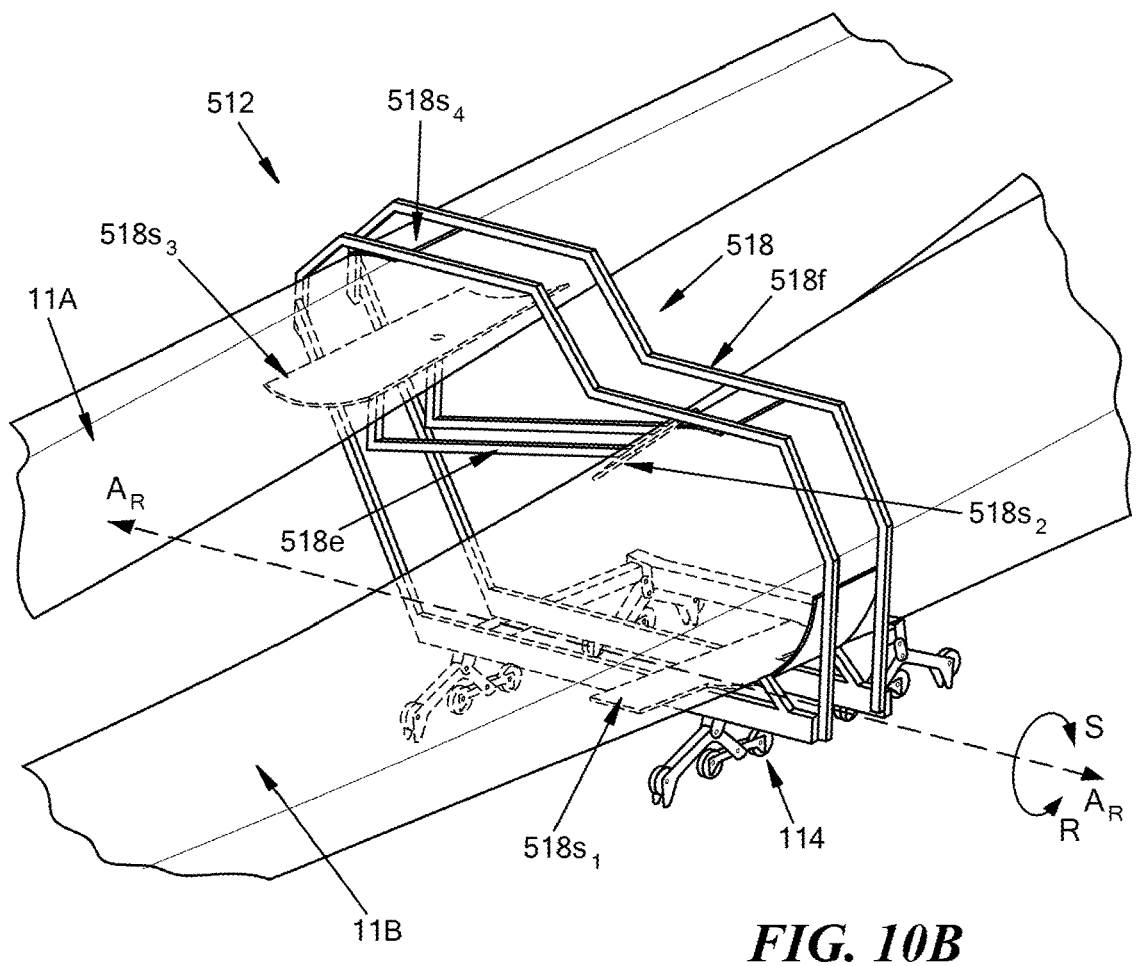
FIG. 10B is an isometric view of the receiver of FIG. 10A receiving two wind turbine blades, the receiver being part of a payload-receiving fixture.

FIGS. 10A and 10B illustrate an alternative embodiment of a receiver 518, and that receiver 518 being coupled to the carriage 114 to form a payload-receiving fixture 512 configured to receive two wind turbine blades 11A, 11B. The receiver 518 can include a frame 518f having a first receiving surface $518s_1$ and a second receiving surface $518s_2$ associated therewith, and an extension 518e coupled to the second receiving surface $518s_2$. The extension 518e can include a third receiving surface $518s_3$, and a fourth receiving surface $518s_4$ can be associated with the frame 518f. As shown in FIG. 10B, the first and second receiving surfaces $518s_1$, $518s_2$ can be configured to receive a second wind turbine blade 11B and the third and fourth receiving surfaces 518$s_3$, 518$s_4$ can be configured to receive a first wind turbine blade 11A. One or both of the first and second surfaces 518$s_1$, 518$s_2$ can be spring-loaded and/or bias inwards (i.e., towards the opening in which the blade can be secured) to help secure a location the wind turbine blade 11B with respect to the receiver 518. Likewise, one or both of the third and fourth surfaces 518$s_3$, 518$s_4$ can be spring-loaded and/or bias inwards (i.e., towards the opening in which the blade can be secured) to help secure a location of the wind turbine blade 11A with respect to the receiver 518. In the illustrated embodiment the extension 518$e$ is bias towards the fourth receiving surface 518$s_4$ by the way it is coupled to the opposed side of the portion of the frame 518$f$ that provides the second receiving surface 518$s_2$. Similar to other receivers of the present disclosure, the receiver 518 can be coupled to the frame 114 using any number of techniques known to those skilled in the art. In at least some embodiments, the connection therebetween can allow for rotation about the pivot axis $A_R$ in the R and S directions. Further, the flexibility associated with the various receiving surfaces 518$s_1$, 518$s_2$, 518$s_3$, 518$s_4$ can also enable beneficial movement like the movement in the R and S directions as described within the present disclosures. A person skilled in the art will recognize other configurations in which the various receiving surfaces can selectively be associated with the frame 518$f$ and/or one or more extensions like the extension 518$e$.

Figure 11A:
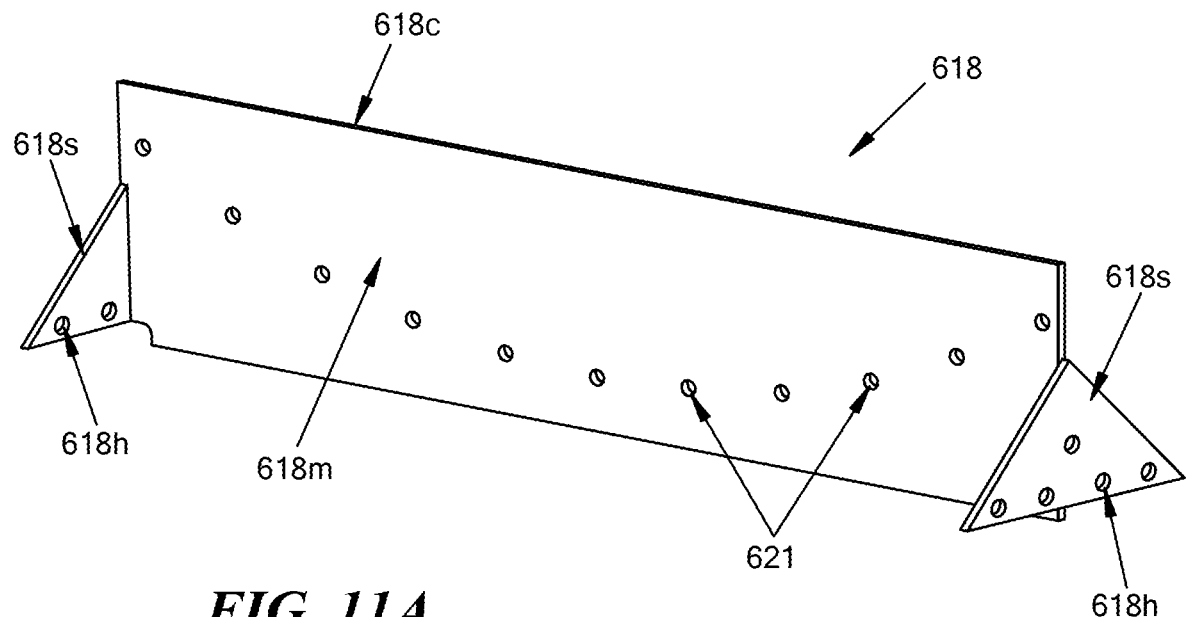
FIG. 11A is an isometric view of yet another exemplary embodiment of a receiver of a payload-receiving fixture.

Another alternative embodiment of a receiver 618 is illustrated with respect to FIG. 11A, with the receiver 618 being associated with an alternative carriage 114" embodiment to form a payload-receiving fixture 612. Alternatively, the receiver 618 can be used with, or incorporated directly into, the carriage 114 or other carriage configurations. The carriage 114" is described further below with respect to FIG. 13A. This payload-receiving fixture 612, like the payload-receiving fixtures 112, 412, is configured to be a terminal end receiving fixture. As shown the receiver 618 of the fixture includes a crossbar 618$c$ that is configured to extend between opposed side of the carriage 114" and to receive a terminal end of a large structure, like a terminal end of the wind turbine blade 11A that is its root or hub 11A$h$. A plurality of pre-formed holes 621 can be formed through opposed main surfaces 618$m$ of the crossbar 618$c$. The holes 621 can be complementary to pre-formed holes 11A$h$ formed in a terminal facial surface 11A$s$ of the hub 11A$h$ such that fasteners (e.g., screws) can be used to mate the hub 11A$h$ to the main surface 618$m$ of the crossbar 618$c$. The receiver 618 can be mated to the carriage 114" in a variety of ways, but in the illustrated embodiment the receiver 618 includes connecting surfaces 618$s$ that are disposed on opposite sides of the crossbar 618$c$, substantially perpendicular to the crossbar 618$c$. One or more mating holes 618$h$ can be formed therein for mating to the carriage 114", such as by using fasteners to connect the connecting surfaces 618$s$ to the carriage 114".

A person skilled in the art will recognize that the various payload-receiving fixtures (e.g., 112, 212, 212', 312, 412, 512, 612) disclosed herein are a small subset of the possible fixtures that can be designed or developed in view of the present disclosures, and thus the present application is by no means limited to use with only the fixtures disclosed herein. Payload-receiving fixtures, in view of the present disclosures, can come in many other sizes, shapes, and configurations, and can be adapted for receiving any type of structure, including large structures. The transportation of wind turbine blades represents merely one exemplary use of such fixtures.

Carriages and Securing Features

Figure 12:
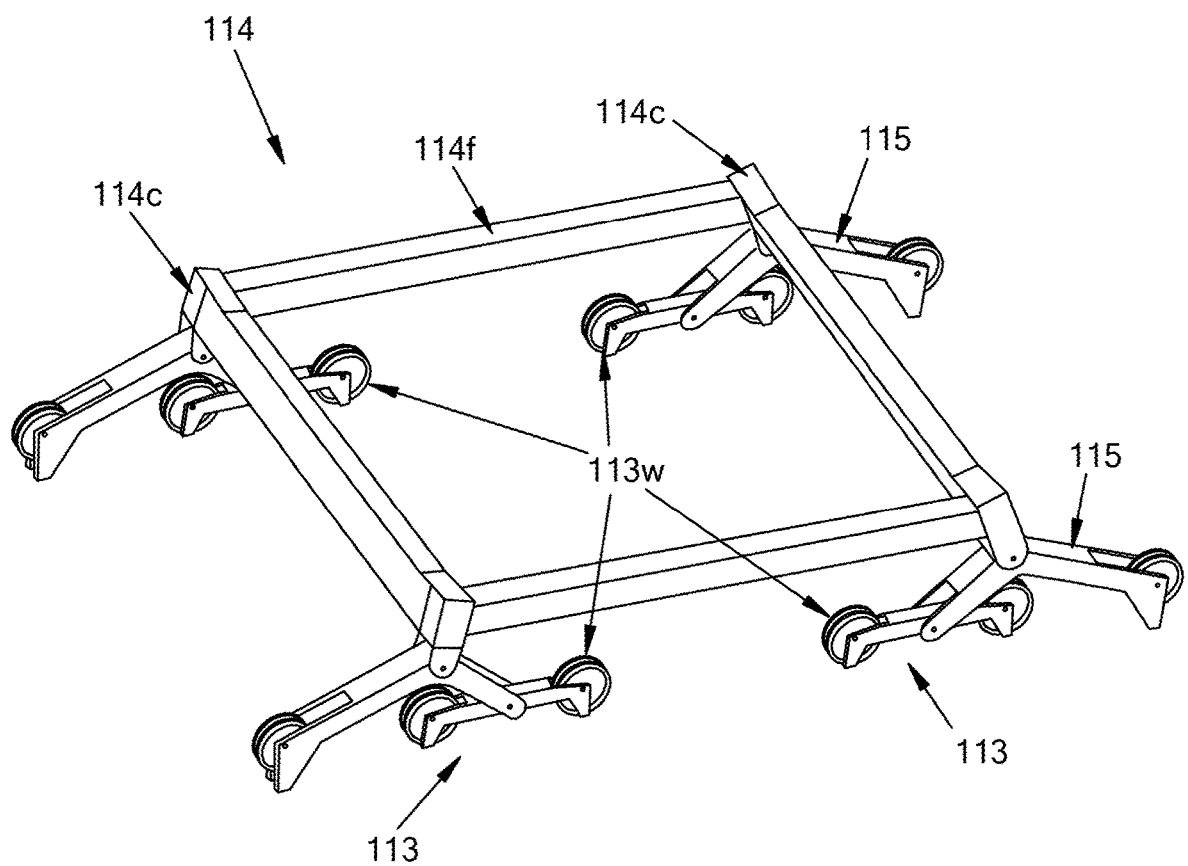
FIG. 12 is an isometric top view of a carriage of the payload-receiving fixture of FIG. 8B.

The carriage 114 is illustrated in FIG. 12. The carriage can include a rectangular frame 114$f$ that can bear weight of payload distributed thereto and spread the weight throughout the frame 114$f$. A person skilled in the art will recognize other shapes and configurations of the frame that can be used without departing from the spirit of the present disclosure. A wheel set 113 can be flexibly coupled to each corner of the frame 114$f$ by way of a flexible coupling 114$c$. In the illustrated embodiment, each wheel set 113 includes three wheels 113$w$, the wheels 113$w$ being linearly disposed with respect to each other in each set 113. Fewer or more wheels can be provided per wheel set, the number of wheels pre wheel set do not have to be the same, and the wheels or wheel sets can be disposed at other locations along the frame 114$f$. The wheels 113$w$ generally are configured to engage with a surface, such as the rails 174, to translate along the surface. The flexible coupling 114$c$ between the frame 114 and each wheel set 113 can allow for flexibility as the payload is moved along a surface, such as the rails 174, preventing the fixture with which the frame 114 is associated from getting undesirably jammed or stuck at certain portions along the length of the rails 174 during translation of the payload 10 along the rails.

As shown, each wheel set 113 includes a whiffle tree 115 that extends from the carriage 114 to couple the wheels 113$w$ to the carriage 114, both keeping some wheels as part of a wheel set, and further assisting in distributing load from the payload more evenly across the payload-receiving fixture (e.g., 112, 212, 212', 312, 412, 512, 612) with which the carriage 114 is used. The whiffle trees 115 substantially uniformly distribute vertical forces from a large payload to the wheels 113$w$. Although the illustrated embodiment shows wheels as the means for translating the frame, and thus the payload-receiving fixture associated therewith, across rails, like the rails 174, a person skilled in the art will recognize that other means for translation can be used in lieu of or in addition to wheels and wheel sets in any of these embodiments, including but not limited to skis, skids, linked tracks (e.g., tractor tracks, military tank tracks), articulated legs, air cushions in the manner of a hovercraft, or other structures that allow for translation between two structures. Generally, any of the fixtures provided for in the present disclosure can translate along the rail(s) 174, with rolling and sliding being interchangeably used and more generally being considered translation or advancement of the fixture.

Figure 11B:
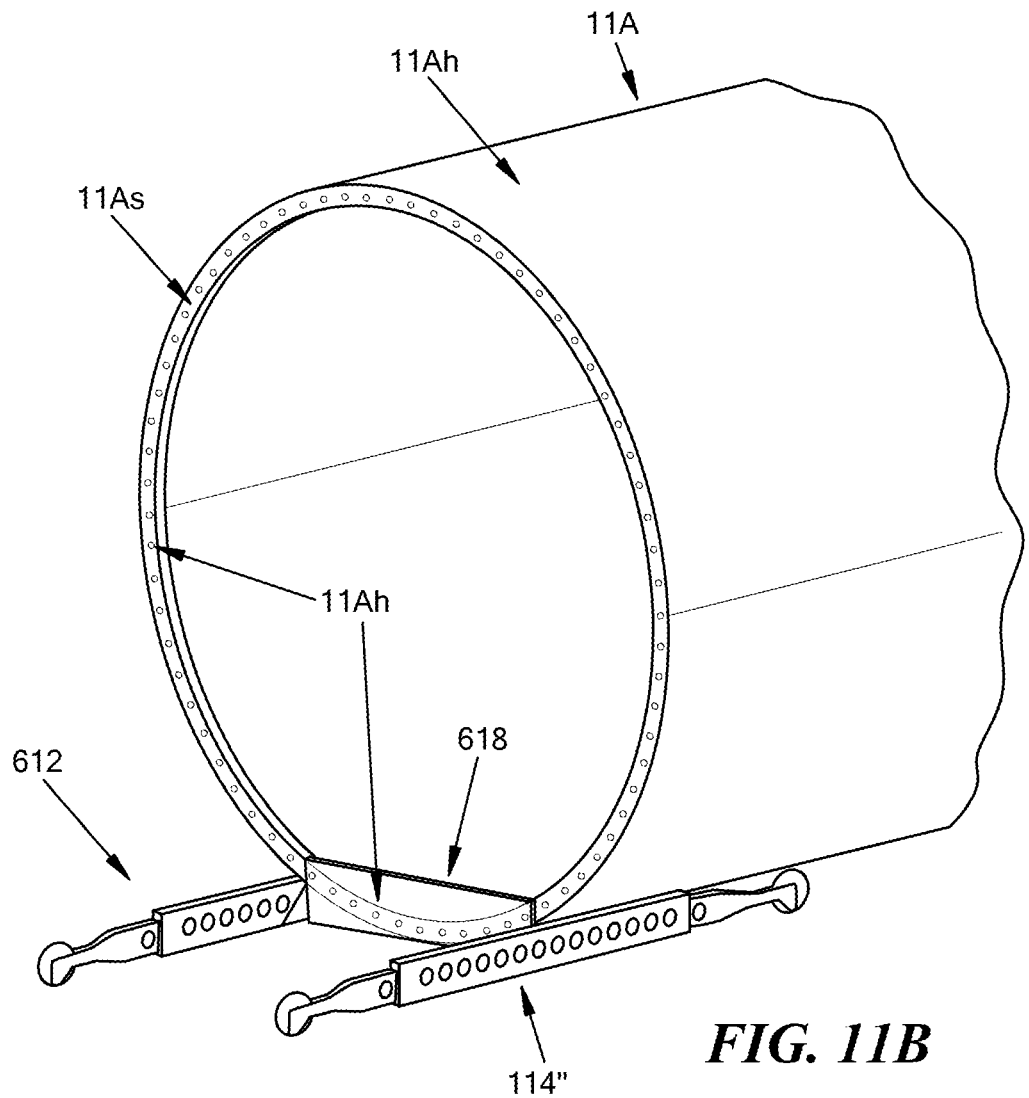
FIG. 11B is an isometric view of the receiver of FIG. 11A receiving a root of a wind turbine blade, the receiver being part of a payload-receiving fixture.
Figure 13A:
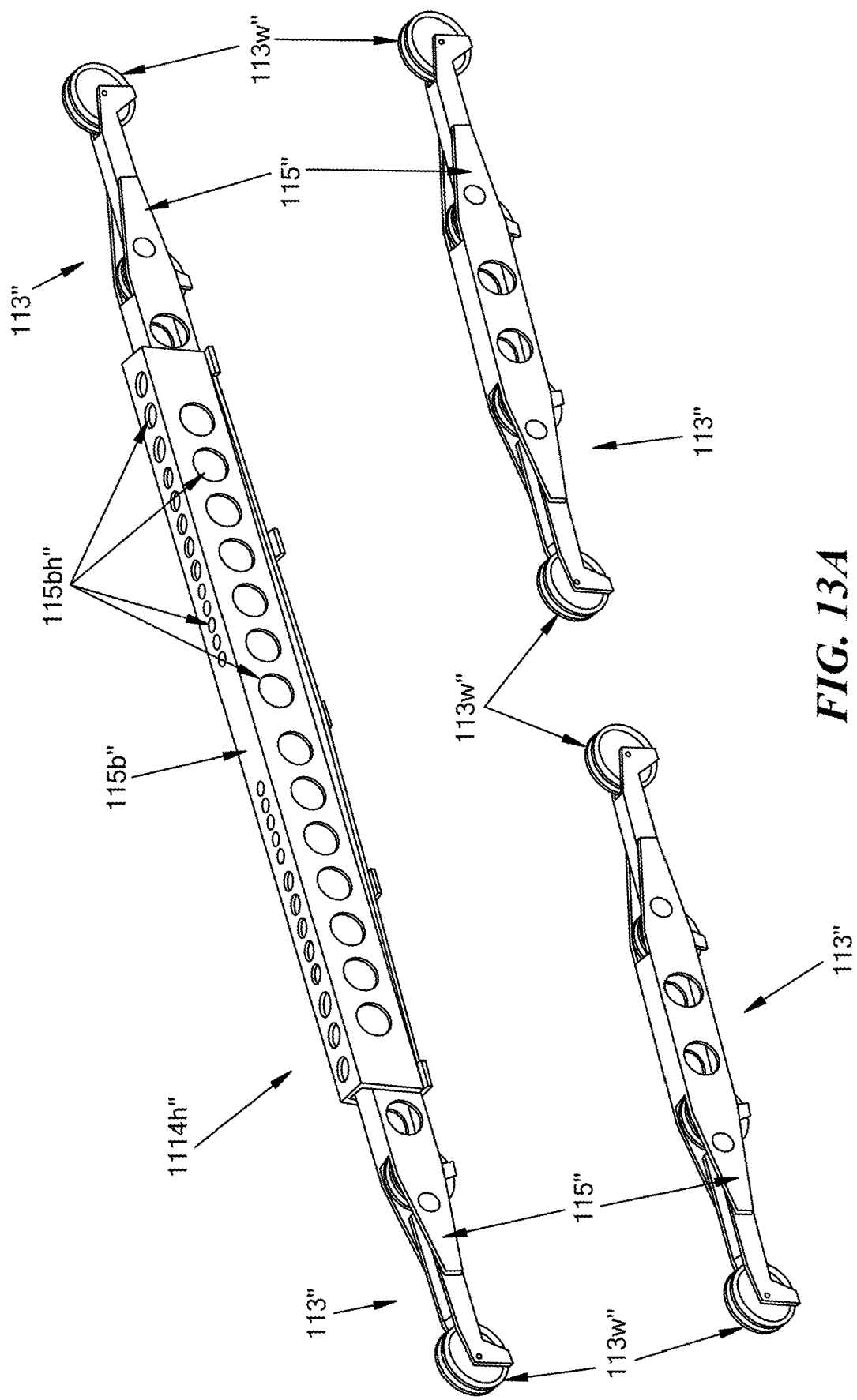
FIG. 13A is an isometric view of part of a carriage of the payload-receiving fixture of FIG. 11B, illustrating the part of the carriage with and without a brace disposed between two sets of wheels.

FIG. 13A illustrates one half of another embodiment of a carriage, the carriage 114". Similar to the carriage 114, the half 114$h$" of the carriage 114" illustrated includes a plurality of wheel sets 113', with wheels 113$w$' of the wheel sets 113' being coupled together by a whiffle tree 115" in a linear configuration. The wheel sets 113" and whiffle trees 115" provide similar benefits as discussed above. As shown, two whiffle trees 115", and thus two wheel sets 113", can be coupled together by a rectangular brace 115$b$". The rectangular brace 115$b$" can itself act as a whiffle tree, and thus provide similar benefits as a whiffle tree. A plurality of holes or openings 115$bh$" are provided in the various surfaces of the brace 115$b$' as illustrated, as are a plurality of holes or openings 115$h$" in the whiffle trees 115". The holes 115$bh$", 115$h$". The can serve similar purposes and uses as described with respect to the holes 118$h$ above. As shown in FIG. 11B, two of the carriage halves 114$h$" can be used in conjunction with each other to form the carriage 114", the two halves 114$h$" being linked by the crossbar 618 or other known structures for coupling two separate whiffle tree configurations.

Figure 13B:
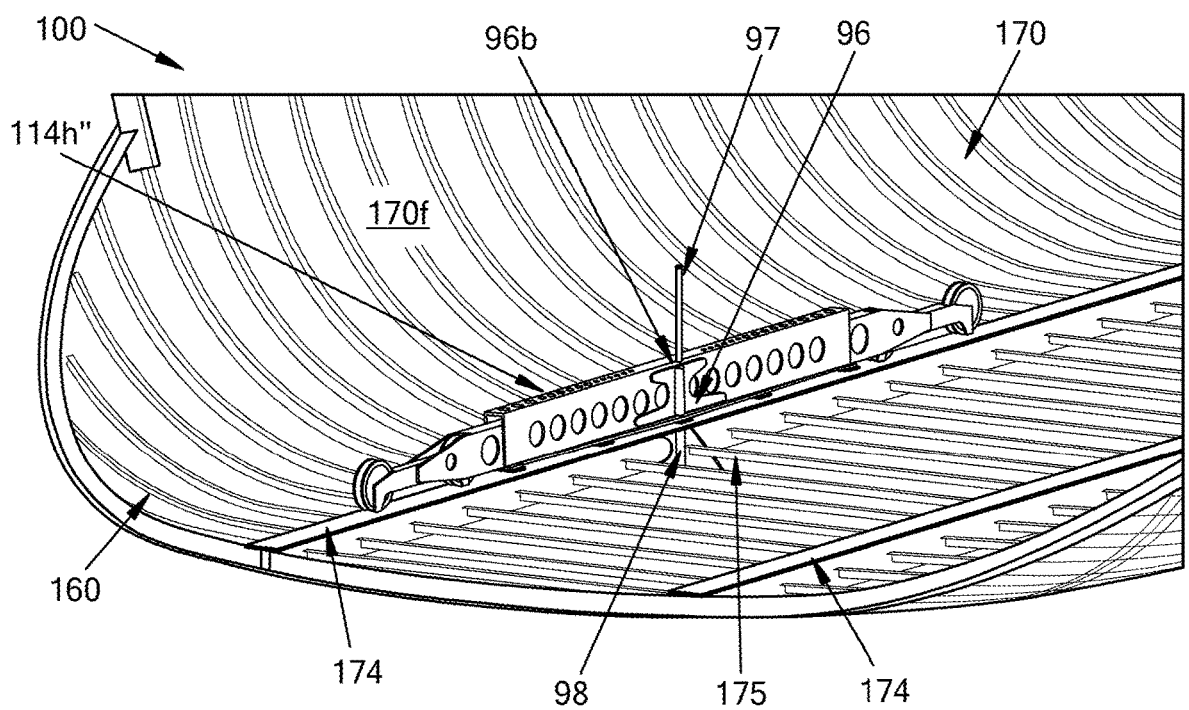
FIG. 13B is an isometric view of one exemplary embodiment of the part of the carriage of FIG. 13A being disposed in an interior cargo bay and in an unattached position.
Figure 13C:
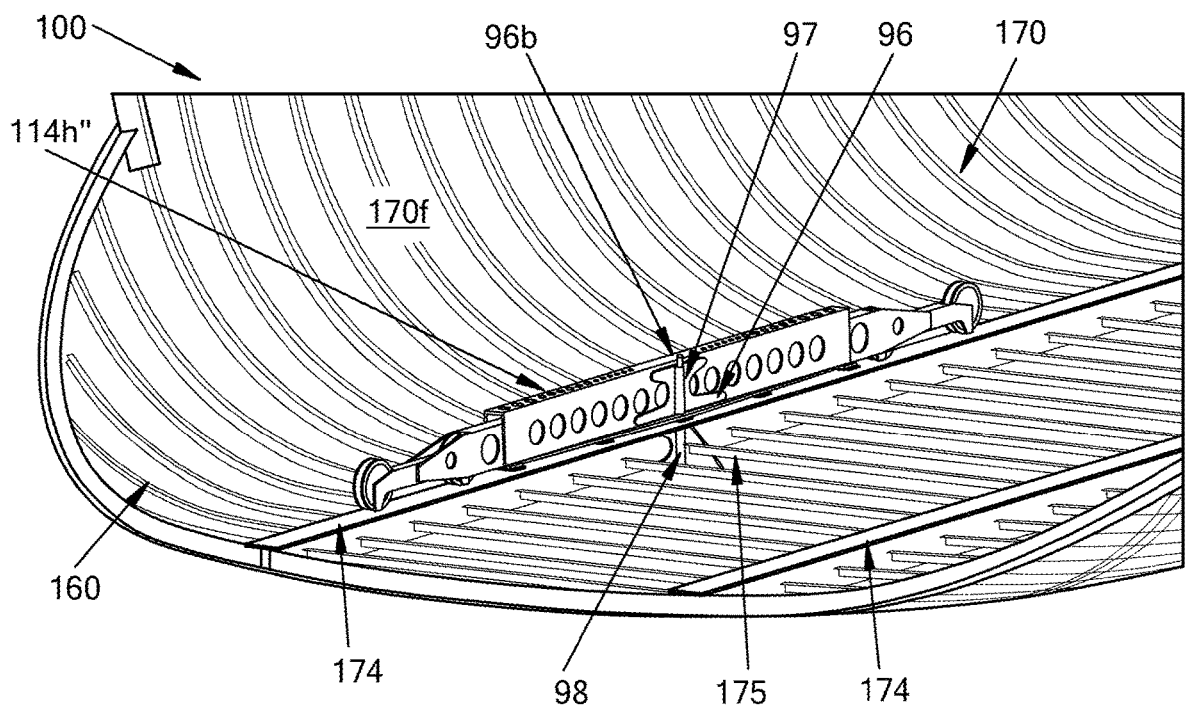
FIG. 13C is an isometric view of the part of the carriage of FIG. 13B disposed in the interior cargo bay and in a mounted position.

FIGS. 13B and 13C illustrate one exemplary way by which the carriage half 114h'', and thus the carriage 114'', can be secured inside a cargo bay of an aircraft. As shown, the carriage half 114h'' is disposed along the rail 174 of the cargo bay 170 of the aircraft 100. The carriage half 114h'' can translate along the rail 174 as described herein. When it reaches a desired location, as shown here, in the forward end 170f of the cargo bay 170 with a portion of the carriage 114h'' disposed on the cantilevered tongue 160, it can be secured by way of a mounting plate 96 coupled to the carriage half 114h'' and a locking pin 97. More particularly, as shown, the mounting plate 96 can be disposed on one of two opposed main surfaces 115m' of the rectangular brace. The mounting plate 96 includes a bore 96b extending longitudinally therethrough. The bore 96b can be aligned with a bore 98b (FIG. 14) of a hardpoint fitting 98 coupled to the rail 174 or otherwise disposed in the cargo bay. The locking pin 97 can be driven into both bores 96b, 98b to secure the location of the carriage half 114h'' with respect to the rail 174. When further transportation of the carriage half 114h'' is desired, such as when unloading the cargo from the aircraft 100, the locking pin 97 can be removed from the hardpoint fitting 98 and/or the carriage half 114h'', thereby permitting movement of the carriage half 114h'' with respect to the rail 174. Notably, although the carriage half 114h'' is described in this context as half of a carriage, in other embodiments it can be a standalone carriage that is configured, perhaps in conjunction with other carriage halves disposed linearly along a length of a payload to be transported, to translate a payload through at least a portion of a cargo bay of an aircraft.

Figure 14:
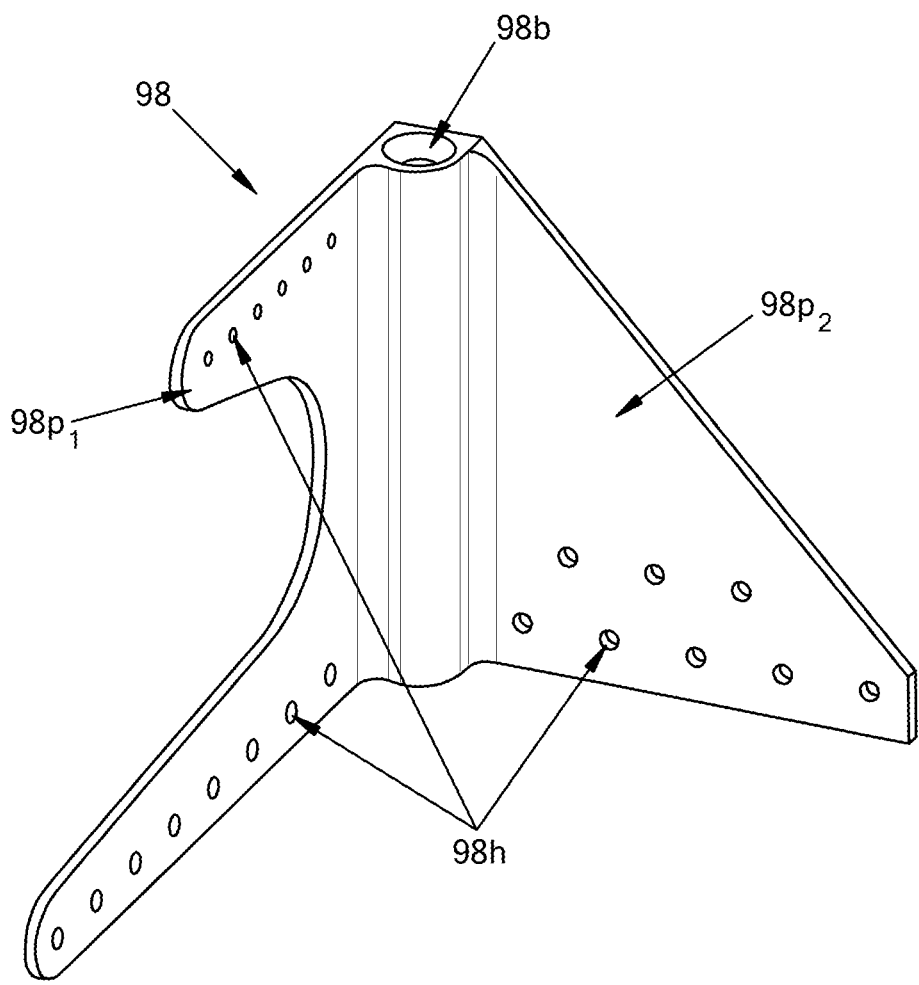
FIG. 14 is an isometric view of one exemplary embodiment of a hardpoint fitting for securing at least one of a payload or a payload-receiving fixture to an interior cargo bay.

A non-limiting exemplary embodiment of the hardpoint fitting 98 is illustrated in FIG. 14. The bore 98b for receiving the locking pin 97 extends throughout a length of hardpoint fitting 98. Plates $98p_1$, $98p_2$ extend substantially perpendicular to each other from the portion of the fitting 98 that forms the bore 98b, allowing the hardpoint fitting 98 to be mounted to substantially perpendicular structures within the interior cargo bay 170—as shown in FIGS. 13B and 13C, the rail 174 and a cross beam 175. The plates $98p_1$, $98p_2$ can have a variety of configurations, and can be adapted for the surface(s) to which they will be connected. For example, the plate $98p_1$, which includes a more curved profile, is configured to attach to the rail face, with two lines of bolts (via bores 98b) being used to react the load and a moment about the vehicle pitch axis, while the plate $98p_2$, which has a more triangular-shaped profile, is configured to attach to a fuselage transverse plane, which may be less tall than the rail. Various bores 98b (not all labeled) can be formed therein to assist in mounting the hardpoint fitting 98 within the cargo bay 170. Any number of hardpoint fittings 98 (or other configurations of hardpoint fittings) can be provided throughout the entirety of the interior cargo bay 170, and they can be placed in desirable locations for securing cargo within the bay 170. Different hardpoint fittings can be designated for use with different types and sizes of cargos. The illustrated hardpoint fitting 98 is but one example. In some embodiments, there can be approximately in the range of about 20 hardpoint fittings to about 40 hardpoint fittings within the interior cargo bay 170, although more or less is possible as well. In alternative embodiments, some portion of the payload can be directly coupled to the hardpoint fittings 98, rather than via payload-receiving fixtures. A person skilled in the art, in view of the present disclosures, will understand other ways by which a payload can be secured within the interior cargo bay 170, including by various attachment mechanisms known to those skilled in the art that can be used or otherwise adapted for use with the rail 174 and/or one or more attachment mechanisms known to those skilled in the art that can be placed in the interior cargo bay and used to secure the location of the payload with respect to the rail 174 and/or the interior cargo bay 170 more generally.

Additional Payload-Receiving Fixtures, Frames, and Actuators

Figure 15A:
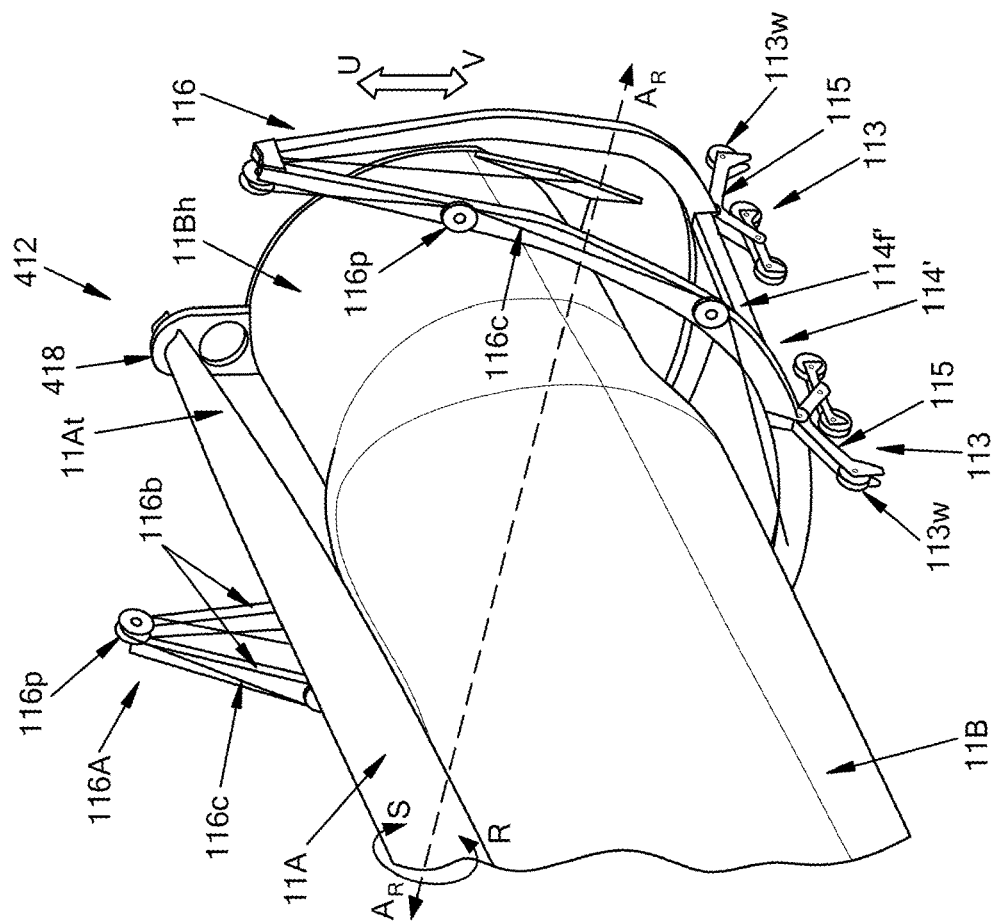
FIG. 15A is an isometric view of a payload-receiving fixture of the payload-receiving fixtures of FIG. 7, the payload-receiving fixture further including an actuator that couples a receiver with a frame.
Figure 15B:
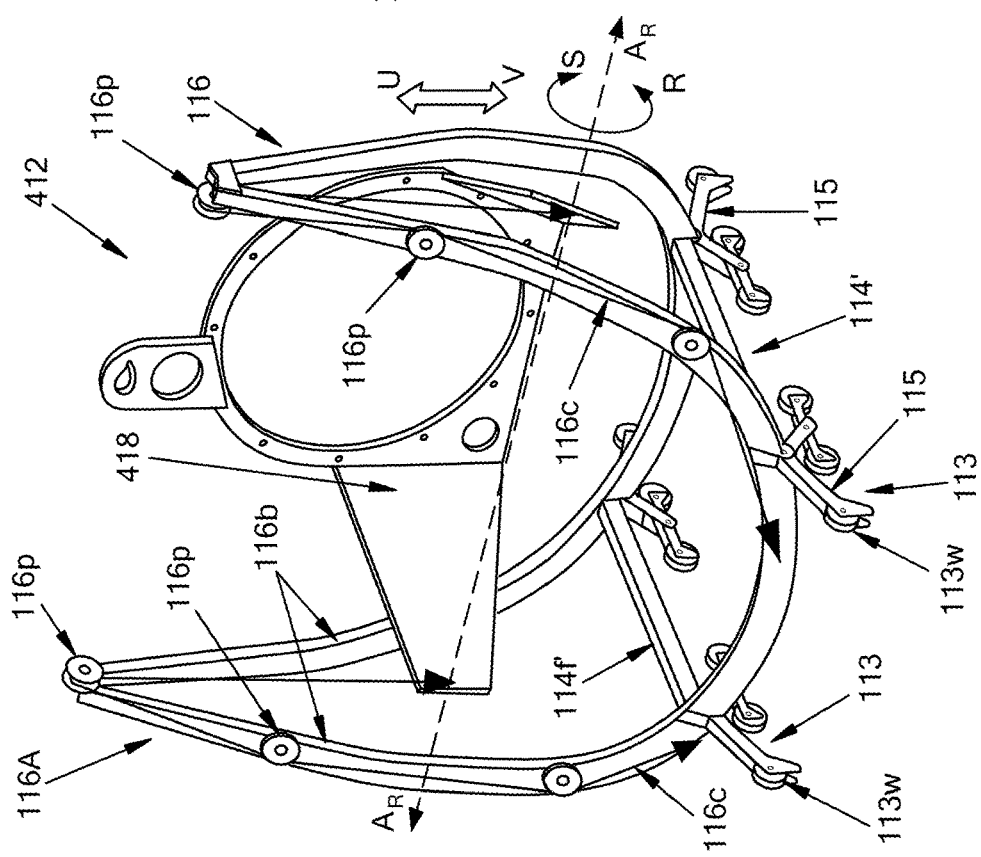
FIG. 15B is an isometric view of the payload-receiving fixture of FIG. 15A receiving two wind turbine blades.

FIGS. 15A and 15B illustrate the frame 116 having the receiver 418 associated therewith to form the payload-receiving fixture 412. As shown, the frame 116 comprises two vertically-disposed, U-shaped bars 116b proximate to each other at a top portion, and separating themselves laterally as the extend downwards. The bars 116b extend vertically away from wheels 113w of the wheel sets 113 and the whiffle trees 115 and towards each other, where they can meet at their terminal ends. An opening extending laterally, lateral being defined in the same direction that the illustrated pivot axis $A_R$ extends, can be the area in which the receiver 418, and thus the area in which terminal ends of large cargo can be disposed—as illustrated a distal tip 11At of the wind turbine blade 11A and a root or hub 11Bh of the wind turbine blade 11B. Coupled to the frame 116 can be an actuator 116A, the actuator including a plurality of pulleys 116p and two cables 116c, the cables 116c mounting the receiver 418 with respect to the frame 116. Alternatively, a single cable, or more than two cables, can be used. The pulley-and-cable configuration can provide movement of the receiver 418 to adjust the position of the payload-receiving fixture with which the receiver 418 is included. More particularly, it can allow the receiver 418 to translate vertically in the directions U and V and rotationally about the pivot axis $A_R$ in the directions R and S, similar to other configurations described above. The benefits of such movement are similar as well. Other mechanisms and configurations for creating such rotational and/or translational movement can be used in alternative embodiments. The frame 116 can be coupled to a carriage, such as the carriage 114, using a variety of techniques, but in the illustrated embodiment it is integrated directly with the carriage 114' such that the frame 116 replaces two beams of the frame 114f' of the carriage 114'.

FIGS. 16 and 17 provide alternative, non-limiting embodiments of actuators to be used in lieu of, or in addition to, the actuator 116A for purposes of allowing passive or active movement of the payload-receiving fixtures (e.g., 12, 112, 212, 212', 312, 412, 512, 612), and thus the payload (e.g., wind turbine blades 11A, 11B) secured by the fixtures. A payload-receiving fixture 712 having a carriage 114''' similarly constructed as the carriage 114, a frame 116', a plurality of actuators 116A', and a receiver 718 comprising a plurality of parts is one such embodiment, illustrated in FIG. 16. The carriage 114''' can have a rectangular frame 114f''' and can have a frame 116' coupled thereto. The carriage 114''' can have transportation means, as shown wheel sets 113''', although other means provided for herein or otherwise derivable from the present disclosures, coupled to or associated with the carriage 114'''. The frame 116' can include opposed linkage systems 116L' that couple the receiver 718 to the carriage 114'''. The illustrated embodiment only shows a single linkage system 116L', but a second one can be disposed on the opposite arm of the frame 114f''' of the carriage 114'''. The receiver 718 can be similar in nature to the receivers 218 and 318, although in this embodiment only two pieces—a first or base piece 718a and a second or receiving piece 718b—are provided. The features and operation of the receiver 718 are clear in view of the earlier described embodiments involving receivers with pieces. The actuators 116A' include four air chambers 116ac' configured to inflate and/or deflate to adjust a position of the receiver 718, and thus the payload (e.g., wind turbine blades) secured thereto. As the air chambers 116ac' fill with or release air, the receiver 718 can be move vertically in the directions U and V. Likewise, by operating some air chambers 116ac' while not operating others, or by inflating some while deflating others, the receiver 718 can be rotated about the pivot axis $A_R$ in the directions R and S. The vertical and translational movements can also allow for the payload (e.g., the blades 11A, 11B) to flex and/or rotate, including, for example, when the payload is being moved at an angle, such as when moving through kinked and aft portions of an interior cargo bay (e.g., the kinked and aft portions 170k, 170a of the interior cargo bay 170). The flexing and/or rotating can be due, for example, to the payload-receiving fixtures being moved at an angle and/or due to other payload-receiving fixtures with which the fixture is being used being moved at an angle. In the illustrated embodiment, there are four air chambers, but any number of chambers, and size of chambers, can be used without departing from the spirit of the present disclosure. Further, the air chambers can more generally be fluid chambers, capable of adjusting their size and orientation by having any type of fluid (gas or liquid) selectively disposed in or released from the chambers. Even a solid (e.g., sand) could be used in lieu of a fluid if desirable.

FIG. 17 provides for a further payload-receiving fixture 812 having a carriage 114'''', a frame 116'', a plurality of actuators 116A'' as part of the frame 116'', and the receiver 318, which thus has the plurality of parts 318a, 318b, 318c. The carriage 114'''' can have a rectangular frame 114f'''', which in this is solid as opposed to havng an opening in the middle like in other embodiments. As shown, a wheel 113'''' can be disposed at each corner of the frame 114f''''. The wheels 113'''' can operate similar to other wheels provided for herein, or alternatively, the present carriage can be a vehicle itself, capable of being operated to move the receiver 318, and thus any payload disposed therein. For example, the carriage 114'''' can be, or be part of, the wheeled mobile transporters 22 described above with respect to FIG. 2D, although a person skilled in the art will recognize the carriage 114'''' would need to be modified to increase its load capacity as it is only a schematic illustration. Operation of the carriage 114'''' in this fashion can be remote, automatic, or manual. The actuators 116A'' include two hydraulic pistons 116p'' serving as part of, or otherwise incorporated with or coupled to, the frame 116'' to adjust a position of the receiver 318, and thus the payload (e.g., wind turbine blades) secured thereto. The pistons 116p'' can provide vertical movement in the directions U and V. The receiver 318 can be coupled to the frame 116'' and/or the hydraulic pistons in a manner described above with respect to the frame 116 and the receivers 218, 318 to provide rotational movement about the pivot axis $A_R$ in the directions R and S. The vertical and translational movements can also allow for the payload (e.g., the blades 11A, 11B) to flex and/or rotate, including, for example, when the payload is being moved at an angle, such as when moving through kinked and aft portions of an interior cargo bay (e.g., the kinked and aft portions 170k, 170a of the interior cargo bay 170). The flexing and/or rotating can be due, for example, to the payload-receiving fixtures being moved at an angle and/or due to other payload-receiving fixtures with which the fixture is being used being moved at an angle.

The actuators 116A, 116A', 116A'' provide some non-limiting embodiments of ways by which the payload-receiving fixtures can be positioned to desirably position the payload associated with payload-receiving fixtures. Other movements can be achieved using known techniques for causing rotational and translational actuation can be used, including ball screws, hydraulic/pneumatic pistons, pulleys, gears or rack-and-pinions, thermal or magnetic actuators such as shape-memory alloys, and/or electromechanical actuators. Further, such movements can be selectively active or passive. For example, with respect to an active movement, one or more of the payload-receiving fixtures and/or the payload (it is noted that the payload can be interpreted to include or not include the fixtures as appropriate) can be monitored, for instance by a location and/or pressure sensor, and in response to one or more designated parameters or other cues (e.g., visual, tactile), action can be taken to rotate or vertically translate the payload-receiving fixture(s) as desired. The input to take the action can be manual, e.g., by a person locally or monitoring remotely, or automated, by a program that acts in response to the designated parameter(s). Alternatively, or additionally, with respect to passive movement, one or more of the payload-receiving fixtures can be designed to automatically mechanically rotate or vertically translate as a result of a change in conditions, such as translating the payload-receiving fixture(s) and payload along the rails 174. In this type of instance, certain movements, such as part of the payload rising up as it becomes disposed in the aft bay portion 170a, may cause one or more fixtures to rotate and/or vertically translate.

Payload

Figure 18:
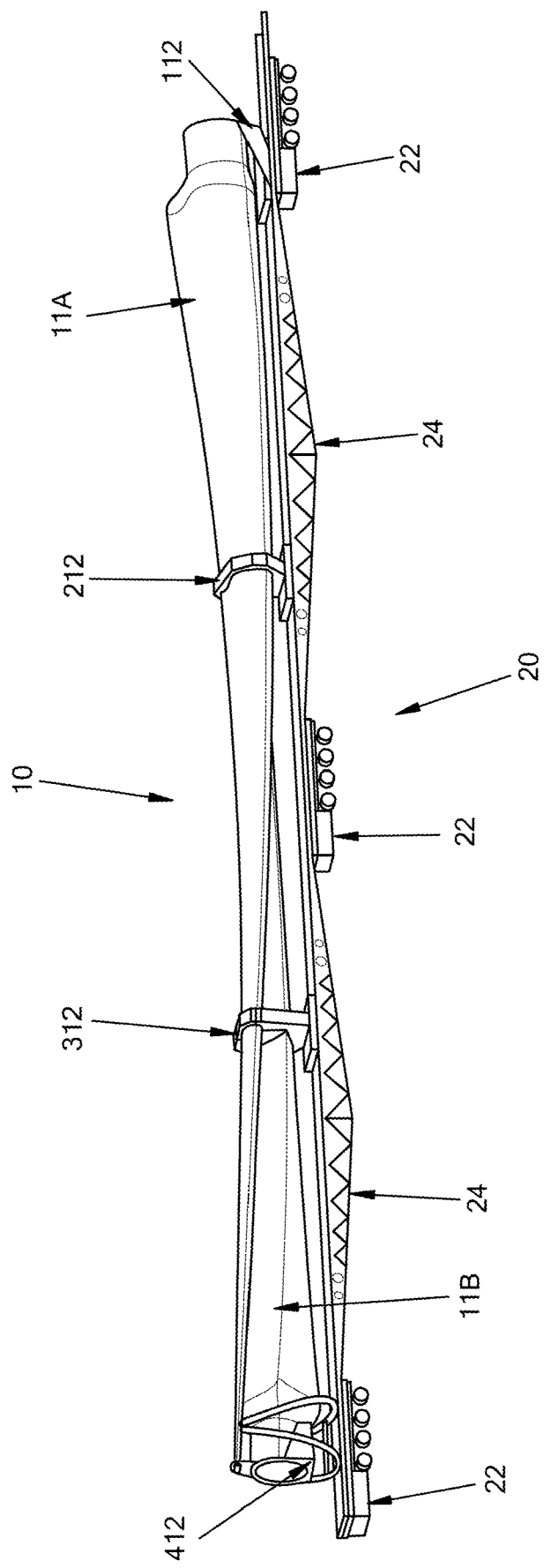
FIG. 18 is an isometric view of the payload-receiving fixtures of FIG. 7 having two wind turbine blades secured therein and being coupled to a transport system having a plurality of vehicles for transporting the payload-receiving fixtures and two wind turbine blades along a ground.

FIG. 18 illustrates the payload 10 and the transport vehicle 20 from FIG. 2B more clearly now that the various payload-receiving fixtures 112, 212, 312, 412 have been described in greater detail. As shown, the wheeled mobile transporters 22 and trusses 24 of the transport vehicle 20 support each of the fixtures 112, 212, 312, 412. Each fixture 112, 212, 312, 412 can be removably coupled to a truss of the trusses 24 using techniques known to those skilled in the art for securing a heavy payload to a truss or other structure. The fixtures 112, 212, 312, 412 can, but do not have to, be disposed above the wheeled mobile transporters 22. Fewer or more wheeled mobile transporters 22 and trusses 24 can be used as desired. Additional details about the configurations and operations of the transport vehicle 20, its components, and other embodiments of the same, are provided in a counterpart patent application entitled "SYSTEMS, METHODS, AND VEHICLES FOR LOADING AND UNLOADING A CARGO AIRCRAFT," filed concurrently herewith, the content of which is incorporated by reference herein in its entirety.

Still Further Payload-Receiving Fixtures

Figure 19A:
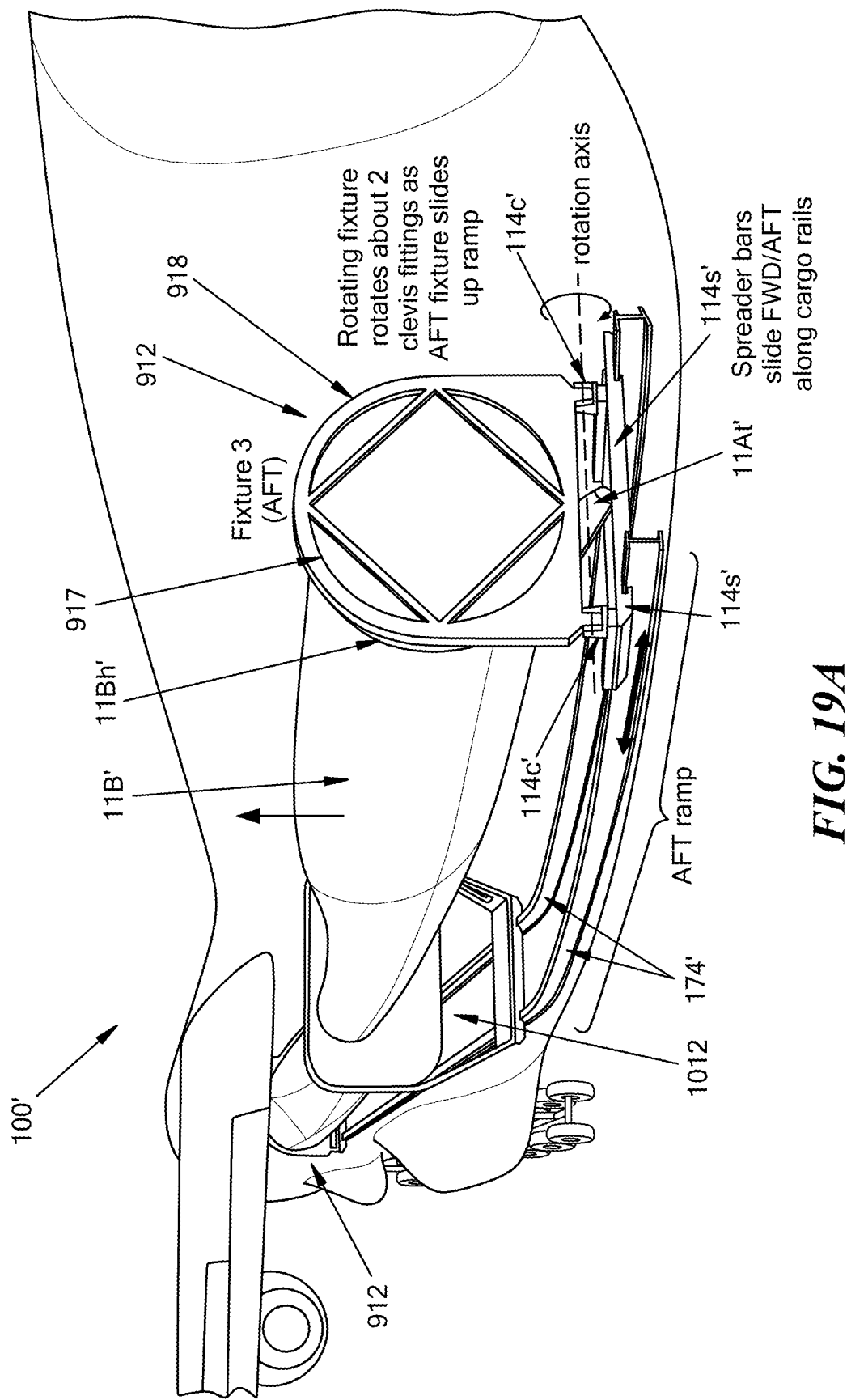
FIG. 19A is a front isometric view of another exemplary embodiment of a pair of rails disposed in an interior cargo bay of an aircraft, the rails having payload-receiving fixtures coupled thereto, the payload-receiving fixtures having two wind turbine blades secured therein.
Figure 19B:
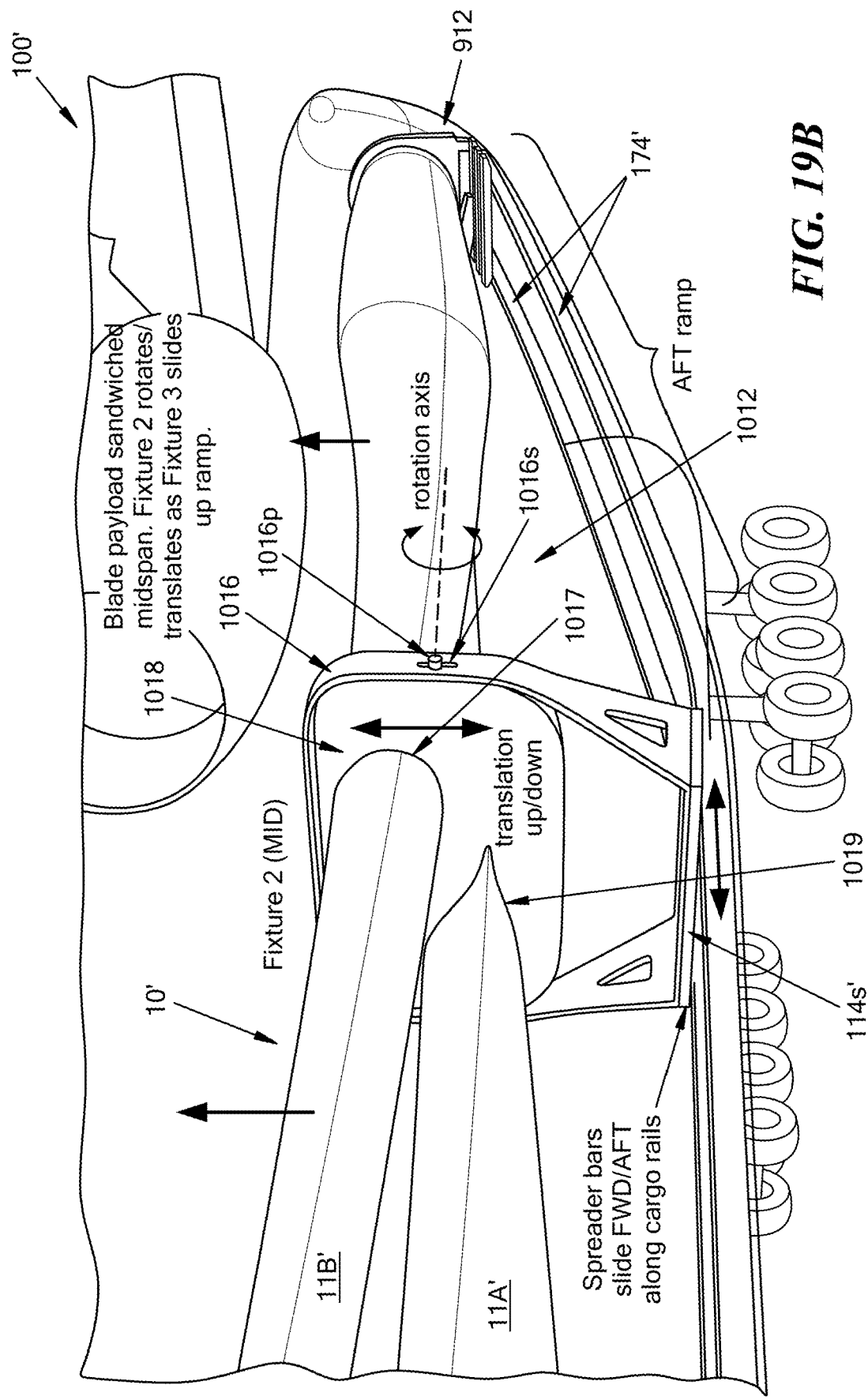
FIG. 19B is a detailed side isometric view of the pair of rails, payload-receiving fixtures, and two wind turbine blades of FIG. 19A.

FIGS. 19A-19C illustrate an alternative embodiment of a loading system for a cargo aircraft 100'. Must of the system is similar to those described above, and thus explanation of the same is unnecessary. Instead, the discussion below provides some highlights of features either not provided for in the earlier systems, or for features mentioned but not illustrated as well as they are with respect to FIGS. 19A-19C.

The system includes two rails 174' having two types of payload-receiving fixtures 912, 1012 disposed thereon. The first payload-receiving fixture 912, best illustrated in FIGS. 19A and 19C, is designed to be a terminal end receiving fixture, i.e., it is designed to receive terminal ends of large payloads (e.g., wind turbine blades 11A', 11B'). The fixture 912 includes a receiver 918 having a large opening 917 to receive a large structure, such as a root or hub 11Bh' of the wind turbine blade 11B' (FIG. 19A) or a root or hub 11Ah' of the wind turbine blade 11A' (FIG. 19C) that constitutes a payload 10'. Although not illustrated, in view of the earlier disclosures, the receiver 918 can also be adapted to receive a distal terminal end or tip of the other blade, or other terminal ends of other blades. The receiver 918 can be flexibly coupled to one or more spreader bars 114s', which serve a similar purpose as the carriages 114, 114', 114", 114''', 114'''' provided for herein. As shown, the spreader bars 114s' can slide along the rails, providing similar functionality as wheel sets 113, 113'. The rotatable coupling is provided by two clevis fittings 114c' and corresponding pins, allowing the receiver 918 to rotate about the illustrated rotation axis as shown in FIG. 19A, for example, when the receiver 918 is moving at an angle through kinked and aft portions of an interior cargo bay (e.g., the kinked and aft portions 170k, 170a of the interior cargo bay 170).

The second payload-receiving fixture 1012, best illustrated in FIG. 19B, is designed to receive an intermediate portion of a large payload (e.g., the wind turbine blades 11A', 11B'). The fixture 1012 includes a frame 1016 and a receiver 1018 having two openings 1017, 1019 adapted to receive intermediate portions of the wind turbine blades 11A', 11B'. The receiver 1018 can be mounted to the frame 1016, for example by way of a pin 1016p, thereby allowing the receiver 1018 to rotate about the illustrated rotation axis as shown in FIG. 19B. The frame 1016 can also include a slot 1016s formed therein in which the pin 1016p is disposed, thereby allowing the receiver 1018 to translate vertically as shown in FIG. 19B. The receiver 1018 can be coupled to the spreader bars 114s' using techniques known to those skilled in the art, including a fixed or rotatable coupling. FIG. 19C illustrates the payload 10' fully loaded into an interior cargo bay 170' of the aircraft 100', and again highlights the configuration of the terminal end receiving fixture 912. In FIG. 19C, the fixture 1012 is positioned in a manner such that it is positioned proximate to a center of gravity of the aircraft 100', with the fixture remaining on the flat or untangled portion of the rails 174'. The fixture 1012 can generally be positioned with respect to the blades 11A', 11B' such that it is disposed between about one-third to one-half of the length of one of the blades and about one-half to two-thirds of the length of the other blade. As illustrated in other embodiments, however, such positioning of payload-receiving fixtures relative to a payload (e.g., wind turbine blades) can vary based, at least in part, on the number of payload-receiving fixtures being used, the size of the payload, the positioning of the payload within an interior cargo bay, and/or locations of centers of gravity of the payload and aircraft.

While in the illustrated embodiments the various payload-receiving fixtures (e.g., 112, 212, 212', 312, 412, 512, 612, 712, 812, 912, 1012) and receivers (118, 218, 218', 318, 418, 518, 618, 718, 818, 918, 1018) are generally designed to hold two wind turbine blades, a person skilled in the art will recognize those payload-receiving fixtures and/or receivers, or other payload-receiving fixtures and/or receivers, can be configured to hold other numbers of wind turbine blades, including one, three, four, five, or even more. As designed, the payload-receiving fixtures and wind turbine blades can be packaged in a repetitive, repeatable manner, which can be helpful, for example, in maintaining a consistent center of gravity each time the same wind turbine blades are packaged. Such packaging can be done in a manner that provides a compact volume of the irregular payload. Still further, while the payload-receiving fixtures provided for herein are illustrated for use in conjunction with wind turbine blades, a person skilled in the art will recognize such fixtures can be used, re-designed, adapted, etc. for use with other large structures, including but not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. Additionally, the various payload-receiving fixtures, as well as other configurations of fixtures and/or components of the fixtures (e.g., carriages, frames, receivers, actuators, rails, etc.) can be provided as a packaging kit to allow for the various fixtures and/or their components to be selected for particular uses, designs, and functions in a plug-and-play manner. At least some of the fixtures and/or their components can have common interface features amongst themselves and/or with respect to the aircraft in which it is loaded to further enhance the plug-and-pay ability. The payload-receiving fixtures themselves can be pre-designated for particular structures (e.g., wind turbine blades) and/or particular locations with respect to such structures (e.g., a terminal end, an intermediate—possibly designated—position).

Loading and Unloading Large Cargo

While methods of loading and unloading cargo in conjunction with the present disclosure should be clear to a person skilled in the art in view of the above disclosures, for the sake of completeness, a method of loading a large payload onto a cargo aircraft is described below. Reference numerals are unnecessary, but the terms used are applicable to at least some, if not all, of the various embodiments provided for herein.

The cargo aircraft can be opened, such as by opening a cargo nose door, and the payload delivered by a transport vehicle. The large payload (e.g., a package of two wind turbine blades), can be displaced from the transport vehicle using a variety of techniques known to those skilled in the art, including but not limited to one or more of a combination of cables and pulleys, one or more winches, and/or one or more power drive units (in this case, the payload may not be removed from the transport vehicle as the transport vehicle may include the power drive units, which may be able to be transported on the aircraft, or alternatively, the removal can come after the power drive units move the payload at least partially into the aircraft). The payload is then passed through an opening formed by opening the cargo aircraft.

A first payload-receiving fixture, which can be referred to as distal-most payload-receiving fixture, can be coupled to one or more rails disposed on the interior bottom contact surface (e.g., a floor of the interior cargo bay) and advanced into the forward end of the cargo aircraft, towards the aft end of the cargo aircraft. The way the coupling occurs will depend, at least in part, on the coupling mechanisms associated with the payload-receiving fixture and/or the rails, but in some embodiments this can include coupling a carriage coupled to or otherwise part of the payload-receiving fixture to the rails. The carriage may include, for example wheels, or sets of wheels, such that the carriage, and thus the payload, can roll along the rails. As the advancement along the rails continues, the distal-most payload-receiving fixture will travel along the rail through the forward bay portion, through the kinked bay portion, and into the aft bay portion. In doing so, the distal-most payload-receiving fixture rises relative to a plane define by the interior bottom contact surface of the forward bay portion. Once a desired position is reached, the payload can be secured within the interior cargo bay using techniques known to those skilled in the art, including but not limited to those provided for herein or otherwise derivable from the present disclosures. Once secured, the distal-most payload-receiving fixture is secured in the aft bay portion of the interior cargo bay and a proximal-most payload-receiving fixture is secured in the forward bay portion of the interior cargo bay.

In some instances, where the payload has not already been prepackaged, the loading method can include securing the large structure(s) of the payload to the payload-receiving fixtures. For example, where wind turbine blades are involved, this can include securing any suitable number of wind turbine blades (e.g., one, two, three, four, five) with respect to the payload-receiving fixtures, using techniques described above for various payload-receiving fixtures. The wind turbine blades, or the payload more generally, can be packaged in a compact, volume-efficient manner, and in a way that is consistent across packages where the payloads are the same. The large payloads can be at least about 57 meters long, at least about 65 meters long, at least about 75 meters long, at least about 85 meters long, at least about 100 meters long, or at least about 120 meters long. Of course, as discussed herein, other lengths are possible, as are other types of cargo beyond wind turbine blades and other components of wind turbines.

As described herein, as the payload is advanced, the payload-receiving fixtures can be move actively or passively. This can include monitoring various aspects of the loading process and making active adjustments to the payload-receiving fixtures, and thus the payload, or including mechanisms in the payload-receiving fixtures that can respond to changing conditions without active management (i.e., passively respond). Such movement includes but is not limited to rotation about a pivot axis of the payload-receiving fixture and/or translational vertical movement relative to the interior bottom contact surface of the cargo bay.

Once a destination is reached, the large cargo can be unloaded from the cargo aircraft. The unloading is, for the most part, similar to and/or the reverse of the loading process. Thus, the large payload can be advanced towards and out of the forward end of the cargo aircraft, for instance through an opening formed by opening a nose cone door. Advancing the payload out of the aircraft can cause at least the distal-most payload-receiving fixture (still referring to the same fixture as the distal-most payload-receiving fixture for these purposes) to approach the aforementioned plane defined by the interior bottom contact surface of the forward bay portion as it advances from the aft bay portion, through the kinked bay portion, and into the forward bay portion of the interior cargo bay. Travel can occur along the rails, and, as discussed with the loading portion, various actuators can be used, passively and/or actively, in conjunction with the payload-receiving fixtures to adjust a position of the payload during advancements and/or while the payload is stationary.

One skilled in the art will appreciate further features and advantages of the disclosures based on the provided for descriptions and embodiments. Accordingly, the inventions are not to be limited by what has been particularly shown and described. For example, most any of the components (e.g., wheels, carriages, whiffle trees, frames, receivers, actuators, etc.) disclosed in the various embodiments of payload-receiving fixtures can be mix-and-matched with features from other embodiments. Likewise, the various components themselves can standalone on their own in at least some instances. For example, the payload-receiving fixtures do not necessarily need a carriage or spreader bars. All publications and references cited herein are expressly incorporated herein by reference in their entirety.

Examples of the above-described embodiments can include the following:

1. A method of loading a payload onto a cargo aircraft, comprising:
advancing a payload into a forward end of a cargo aircraft and towards an aft end of the cargo aircraft, the cargo aircraft including an interior cargo bay having a forward bay portion located in the forward end of the cargo aircraft, an aft bay portion located in the aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, the payload including a plurality of payload-receiving fixtures holding one or more structures of the payload in a set position with respect to at least some portion of the payload-receiving fixtures, the advancing causing at least a distal-most payload-receiving fixture of the plurality of payload-receiving fixtures to rise relative to a plane defined by an interior bottom contact surface of the forward bay portion as the distal-most payload-receiving fixture advances through the kinked bay portion and into the aft bay portion of the interior cargo bay; and
securing the payload within the interior cargo bay such that the distal-most payload-receiving fixture is secured in the aft bay portion of the interior cargo bay and a proximal-most payload-receiving fixture of the plurality of payload-receiving fixtures is secured in the forward bay portion of the interior cargo bay.

2. The method of claim 1, wherein advancing the payload into the forward end of the cargo aircraft further comprises passing the payload through an opening formed by opening a nose cargo door located in the forward end of the cargo aircraft.

3. The method of claim 1 or 2,
wherein advancing the payload into the forward end of the cargo aircraft further comprises coupling a carriage of at least one payload-receiving fixture of the plurality of payload-receiving fixtures to one or more rails of the interior cargo bay that extend from the forward bay portion, through the kinked bay portion, and into the aft bay portion, and
wherein advancing the payload towards the aft end of the cargo aircraft further comprises advancing the carriage along the one or more rails.

4. The method of claim 3, wherein at least one rail of the one or more rails includes a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion.

5. The method of claim 4, wherein the kinked portion of the at least one rail of the one or more rails is disposed in the aft bay portion such that a majority of the kinked portion forms an angle with a portion of the at least one rail disposed in the forward bay portion.

6. The method of claim 4 or 5, wherein a terminal end of the kinked portion of the at least one rail of the one or more rails is disposed in the aft bay portion located above a plane extending through a top surface of a fuselage of the cargo plane in which the interior cargo bay is disposed.

7. The method of any of claims 3 to 6, wherein at least one rail of the one or more rails extends continuously along an interior bottom contact surface of the cargo bay from the forward bay portion to the aft bay portion.

8. The method of any of claims 3 to 7, wherein at least one rail of the one or more rails further serves as a primary structural beam of the cargo aircraft.

9. The method of any of claims 3 to 8,
wherein coupling the carriage to one or more rails further comprises engaging a plurality of wheels of the carriage with the one or more rails, and
wherein advancing the carriage along the one or more rails further comprises rolling the wheels along the one or more rails.

10. The method of any of claims 1 to 9, further comprising:
coupling a first terminal end of a first structure of the one or more structures to the proximal-most payload-receiving fixture; and
coupling a second, opposite terminal end of the first structure to the distal-most payload-receiving fixture.

11. The method of claim 10, further comprising:
coupling a first terminal end of a second structure of the one or more structures to the distal-most payload-receiving fixture; and
coupling a second, opposite terminal end of the second structure to the proximal-most payload-receiving fixture, the first and second structures being similar structures such that the respective first terminal ends and respective second terminal ends are substantial equivalents of each other.

12. The method of any of claims 1 to 11, further comprising:
placing a first structure of the one or more structures on a first receiving surface of a first piece of a payload-receiving fixture of the plurality of payload receiving fixtures; and
coupling a second piece of the payload-receiving fixture to the first piece to secure a location of the first structure with respect to the first receiving surface.

13. The method of claim 12, further comprising:
placing a second structure of the one or more structures on at least one of a second receiving surface of the first piece or a first receiving surface of the second piece; and
coupling at least one of the second piece to the first piece or a third piece of the payload-receiving fixture to one or both of the first piece and the second piece to secure a location of the second structure with respect to the at least one of the second receiving surface of the first piece or the first receiving surface of the second piece.

14. The method of any of claims 10 to 13,
wherein the first structure is a first wind turbine blade,
wherein when the second structure is included, the second structure is a second wind turbine blade, and
wherein when the first terminal ends of the first and second turbine blades are coupled to the respective proximal-most or distal-most payload-receiving fixture, the first terminal ends are respective hubs of the first and second wind turbine blades, and when the second terminal ends of the first and second turbine blades are coupled to the respective proximal-most or distal-most payload-receiving fixture, the second terminal ends are respective tips of the first and second wind turbine blades.

15. The method of any of claims 1 to 14, further comprising:
operating one or more actuators coupled to one or more of the plurality of payload-receiving fixtures to adjust a position of the payload relative to the cargo aircraft.

16. The method of claim 15, further comprising:
operating the one or more actuators to adjust the position of the payload relative to the cargo aircraft in conjunction with setting a position of the payload within the cargo bay for flight.

17. The method of claim 15 or 16, further comprising:
operating the one or more actuators to adjust the position of the payload relative to the cargo aircraft occurs while advancing the payload towards the aft end of the cargo aircraft.

18. The method of any of claims 1 to 17, further comprising:
causing at least one payload-receiving fixture of the plurality of payload-receiving fixtures to both advance towards the aft end of the cargo aircraft and rotate about a pivot axis of the at least one payload-receiving fixture while advancing the payload towards the aft end.

19. The method of any of claims 1 to 18, further comprising:
causing at least one payload-receiving fixture of the plurality of payload-receiving fixtures to each of advance towards the aft end of the cargo aircraft, rotate about a pivot axis of the at least one payload-receiving fixture, and translate vertically relative to an interior bottom contact surface of the cargo bay while advancing the payload towards the aft end.

20. The method of claim 18 or 19, wherein either or both of the causing actions occurs passively.

21. The method of any of claims 18 to 20, wherein either or both of the causing actions occurs actively.

22. The method of any of claims 1 to 21, wherein the payload has a length of at least about 57 meters.

23. The method of claim 22, wherein the length of the payload is at least about 65 meters.

24. The method of claim 23, wherein the length of the payload is at least about 75 meters.

25. The method of claim 24, wherein the length of the payload is at least about 85 meters.

26. The method of claim 25, wherein the length of the payload is at least about 100 meters.

27. The method of claim 26, wherein the length of the payload is at least about 120 meters.

28. A method of unloading a payload from a cargo aircraft, comprising:
advancing a payload towards and out of a forward end of a cargo aircraft, the cargo aircraft including an interior cargo bay having a forward bay portion located in the forward end of the cargo aircraft, an aft bay portion located in the aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, the payload including a plurality of payload-receiving fixtures holding one or more structures of the payload in a set position with respect to at least some portion of the payload-receiving fixtures, the advancing causing at least a distal-most payload-receiving fixture of the plurality of payload-receiving fixtures to approach a plane defined by an interior bottom contact surface of the forward bay portion as the distal-most payload-receiving fixture advances from the aft bay portion, through the kinked bay portion, and into the forward bay portion of the interior cargo bay.

29. The method of claim 28, wherein advancing the payload towards and out of the forward end of the cargo aircraft further comprises passing the payload through an opening formed by opening a nose cargo door located in the forward end of the cargo aircraft.

30. The method of claim 28 or 29,
wherein advancing the payload towards and out of the forward end of the cargo aircraft further comprises advancing a carriage of at least one payload-receiving fixture of the plurality of payload-receiving fixtures along one or more rails of the interior cargo bay that extend from the forward bay portion, through the kinked bay portion, and into the aft bay portion.

31. The method of claim 30, wherein at least one rail of the one or more rails includes a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion.

32. The method of claim 30 or 31, wherein the kinked portion of the at least one rail of the one or more rails is disposed in the aft bay portion such that a majority of the kinked portion forms an angle with a portion of the at least one rail disposed in the forward bay portion that is substantially parallel to the longitudinal-lateral plane of the cargo aircraft.

33. The method of any of claims 30 to 32, wherein a terminal end of the kinked portion of the at least one rail of the one or more rails is disposed in the aft bay portion located above a plane extending through a top surface of a fuselage of the cargo plane in which the interior cargo bay is disposed.

34. The method of any of claims 30 to 33, wherein at least one rail of the one or more rails extends continuously along an interior bottom contact surface of the cargo bay from the forward bay portion to the aft bay portion.

35. The method of any of claims 30 to 34, wherein at least one rail of the one or more rails further serves as a primary structural beam of the cargo aircraft.

36. The method of any of claims 28 to 35, further comprising:
operating one or more actuators coupled to one or more of the plurality of payload-receiving fixtures to adjust a position of the payload relative to the cargo aircraft.

37. The method of claim 36, further comprising:
operating the one or more actuators to adjust the position of the payload relative to the cargo aircraft occurs while advancing the payload towards the forward end of the cargo aircraft.

38. The method of any of claims 28 to 37, further comprising:
causing at least one payload-receiving fixture of the plurality of payload-receiving fixtures to both advance towards the forward end of the cargo aircraft and rotate about a pivot axis of the at least one payload-receiving fixture while advancing the payload towards the forward end.

39. The method of any of claims 28 to 38, further comprising:
causing at least one payload-receiving fixture of the plurality of payload-receiving fixtures to each of advance towards the forward end of the cargo aircraft, rotate about a pivot axis of the at least one payload-receiving fixture, and translate vertically relative to an interior bottom contact surface of the cargo bay while advancing the payload towards the forward end.

40. The method of claim 38 or 39, wherein either or both of the causing actions occurs passively.

41. The method of any of claims 38 to 40, wherein either or both of the causing actions occurs actively.

42. The method of any of claims 28 to 41, wherein the payload has a length of at least about 57 meters.

43. The method of claim 42, wherein the length of the payload is at least about 65 meters.

44. The method of claim 43, wherein the length of the payload is at least about 75 meters.

45. The method of claim 44, wherein the length of the payload is at least about 85 meters.

46. The method of claim 45, wherein the length of the payload is at least about 100 meters.

47. The method of claim 46, wherein the length of the payload is at least about 120 meters.

48. The method of any of claims 28 to 47, wherein the payload comprises one or more components of a wind turbine.

49. A system for at least one of loading a payload onto a cargo aircraft or unloading a payload from a cargo aircraft, comprising:
at least one rail disposed in an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft,
wherein the at least one rail extends from the forward bay portion, through the kinked bay portion, and into the aft bay portion.

50. The system of claim 49, wherein at least one rail of the one or more rails includes a kinked portion such that a vertical distance between at least a portion of the at least one rail aft of the kinked portion and the plane defined by an interior bottom contact surface of the forward bay portion is greater than a vertical distance between at least a portion of the at least one rail forward of the kinked portion and the plane defined by the interior bottom contact surface of the forward bay portion.

51. The system of claim 49 or 50, wherein the kinked portion of at least one rail of the one or more rails is disposed in the aft bay portion such that a majority of the kinked portion forms an angle with a portion of the at least one rail disposed in the forward bay portion that is substantially parallel to the longitudinal-lateral plane of the cargo aircraft.

52. The system of any of claims 49 to 51, wherein a terminal end of the kinked portion of at least one rail of the one or more rails is disposed in the aft bay portion located above a plane extending through a top surface of a fuselage of the cargo plane in which the interior cargo bay is disposed.

53. The system of any of claims 49 to 52, wherein at least one rail of the one or more rails extends continuously along an interior bottom contact surface of the cargo bay from the forward bay portion to the aft bay portion.

54. The system of any of claims 49 to 53, wherein at least one rail of the one or more rails further serves as a primary structural beam of the cargo aircraft.

55. The system of any of claims 49 to 54, wherein the at least one rail comprises at least two rails disposed approximately parallel to each other.

56. The system of any of claims 49 to 55, further comprising:
a cargo nose door configured to open a portion of the forward end of the cargo aircraft such that a terminal end of the at least one rail disposed in the forward bay portion is accessible from an outside environment when the cargo nose door is open.

57. The system of any of claims 49 to 56, further comprising:
  a plurality of payload-receiving fixtures configured to couple to the at least one rail such that the plurality of payload-receiving fixtures are configured to translate along a length of the at least one rail.

58. The system of claim 57, wherein at least one payload-receiving fixture of the plurality of payload-receiving fixtures comprises:
  an opening configured to receive a terminal end of a first structure.

59. The system of claim 58, wherein the at least one payload-receiving fixture of the plurality of payload-receiving fixtures further comprises:
  a second opening configured to receive a terminal end of a second structure.

60. The system of claim 58 or 59, wherein the at least one payload-receiving fixture of the plurality of payload-receiving fixtures further comprises:
  a pivot axis, the pivot axis being configured to allow the at least one payload-receiving fixture of the plurality of payload-receiving fixtures to rotate thereabout.

61. The system of any of claims 57 to 60,
  wherein the first structure is a first wind turbine blade, and
  wherein when the second structure is included, the second structure is a second wind turbine blade, the terminal end of the first wind turbine blade being a hub of the first wind turbine blade and the terminal end of the second wind turbine blade being a tip of the second wind turbine blade.

62. The system of claim 57, wherein at least one payload-receiving fixture of the plurality of payload-receiving fixtures comprises a crossbar extending between opposed sides of a carriage of the at least one payload-receiving fixture, the crossbar being configured to receive a first terminal end of a wind turbine blade.

63. The system of claim 57, wherein at least one payload-receiving fixture of the plurality of payload-receiving fixtures comprises:
  a first piece having at least a first receiving surface formed therein; and
  a second piece configured to couple to the first piece, the second piece having at least a second receiving surface formed therein, the second receiving surface being complementary to the first receiving surface such that the first and second receiving surfaces are configured to secure a portion of a first structure within the at least one payload-receiving fixture when the second piece is coupled to the first piece.

64. The system of claim 63, wherein the at least one payload-receiving fixture of the plurality of payload-receiving fixtures further comprises:
  a third piece configured to couple to at least one of the first piece and the second piece, the third piece having at least a third receiving surface formed therein, the third receiving surface being complementary to at least one of a fourth receiving surface formed in the first piece or a fifth receiving surface formed in the second piece such that the third receiving surface and at least one of the fourth and fifth receiving surfaces are configured to secure a portion of a second structure within the at least one payload-receiving fixture when the third piece is coupled to at least one of the first and second pieces.

65. The system of claim 57, wherein at least one payload-receiving fixture of the plurality of payload-receiving fixtures comprises:
  a frame having a first receiving surface formed therein that is configured to receive a first structure and secure a portion of the first structure between the first receiving surface and a second receiving surface; and
  an extension coupled to the frame and having a third receiving surface formed therein that is configured to receive a second structure and secure a portion of the second structure between the third receiving surface and a fourth receiving surface,
  wherein the second receiving surface is either part of the frame or part of the extension, and
  wherein the fourth receiving surface is part of the frame.

66. The system of any of claims 63 to 65,
  wherein the first structure is a first wind turbine blade, and
  wherein when the second structure is included, the second structure is a second wind turbine blade.

67. The system of any of claims 57 to 66, at least one payload-receiving fixture of the plurality of payload-receiving fixtures comprises:
  a carriage having a frame and a plurality of wheels associated therewith, the wheels being configured to engage the at least one rail disposed in the interior cargo bay of the cargo aircraft.

68. The system of claim 67,
  wherein the carriage further comprises one or more whiffle trees having at least some wheels of the plurality of wheels associated therewith, and
  wherein the one or more whiffle trees are configured to substantially uniformly distribute vertical forces from a payload to the at least some wheels forming the one or more whiffle trees.

69. The system of claim 68, wherein the plurality of wheels comprises at least four sets of wheels, each set disposed at respective opposed corners of the frame, and each set having a whiffle tree of the one or more whiffle trees associated therewith.

70. The system of claim 68, wherein the plurality of wheels comprises:
  a first set of wheels disposed linearly and having a whiffle tree of the one or more whiffle trees associated therewith; and
  a second set of wheels disposed linearly and having a whiffle tree of the one or more whiffle trees associated therewith,
  wherein the first set of wheels is disposed on an opposite side of the frame as the second set of wheels.

71. The system of claim 67,
  wherein the carriage further comprises a vertically-disposed frame, relative to the plurality of wheels such that vertically-disposed frame extends vertically away from the wheels, the vertically-disposed frame being configured to hold the at least one payload-receiving fixture of any of claims 58 to 61 and 63 to 66.

72. The system of any of claims 57 to 71, further comprising:
  one or more actuators coupled to one or more payload-receiving fixtures of the plurality of payload-receiving fixtures to adjust a position of a payload received by the plurality of payload-receiving fixtures relative to the cargo aircraft.

73. The system of claim 72, wherein the one or more actuators are configured to adjust a height of the one or more payload-receiving fixtures relative to the cargo aircraft.

74. The system of claim 72 or 73, wherein the one or more actuators are configured to rotate the one or more payload-receiving fixtures about a rotation axis extending substantially perpendicular to a longitudinal axis of the payload.

75. The system of any of claims 72 to 74, wherein the one or more actuators further comprise: one or more hydraulic pistons configured to operate to adjust the position of the one or more payload-receiving fixtures relative to the cargo aircraft.

76. The system of any of claims 72 to 74, wherein the one or more actuators further comprise:
a plurality of pulleys; and
one or more cables disposed between the pulleys and configured to move with respect to the plurality of pulleys to adjust the position of the one or more payload-receiving fixtures relative to the cargo aircraft.

77. The system of any of claims 72 to 74, wherein the one or more actuators further comprise:
one or more air chambers configured to at least one of inflate or deflate to adjust the position of the one or more payload-receiving fixtures relative to the cargo aircraft.

78. The system of any of claims 57 to 77, wherein at least one payload-receiving fixture of the plurality of payload-receiving fixtures is configured to rotate about a pivot axis of the at least one payload-receiving fixture.

79. The system of claim 78, wherein the at least one payload-receiving fixture of the plurality of payload-receiving fixtures is further configured to translate vertically relative to the interior bottom contact surface of the cargo bay.

80. The system of claim 78 or 79, wherein the at least one payload-receiving fixture of the plurality of payload-receiving fixtures is configured to rotate about a pivot axis of the at least one payload-receiving fixture passively.

81. The system of claim 78 or 79, wherein the at least one payload-receiving fixture of the plurality of payload-receiving fixtures is configured to rotate about a pivot axis of the at least one payload-receiving fixture actively.

82. The system of any of claims 49 to 81, further comprising:
a plurality of hardpoint fittings coupled to the at least one rail and configured to receive at least one of a payload or a payload-receiving fixture that receives a payload.

83. The system of 82, further comprising:
a locking pin configured to engage a hardpoint fitting of the plurality of hardpoint fittings to couple the at least one of the payload or the payload-receiving fixture that receives a payload to the at least one rail.

84. The system of any of claims 49 to 83, further comprising:
a loading system configured to pull a payload into the cargo aircraft and along the at least one rail.

85. The system of claim 84, wherein the loading system comprises at least one of:
(1) (a) one or more pulleys; and
(b) at least one cable coupled to the one or more pulleys and configured to move relative to the pulleys to advance the payload into the cargo aircraft and along the at least one rail;
(2) one or more winches to advance the payload into the cargo aircraft and along the at least one rail; or
(3) one or more power drive units to advance the payload into the cargo aircraft and along the at least one rail.

86. The system of any of claims 49 to 85, wherein the system is configured to be used with a payload having a length of at least about 57 meters.

87. The system of claim 86, wherein the length of the payload is at least about 65 meters.

88. The system of claim 87, wherein the length of the payload is at least about 75 meters.

89. The system of claim 88, wherein the length of the payload is at least about 85 meters.

90. The system of claim 89, wherein the length of the payload is at least about 100 meters.

91. The system of claim 90, wherein the length of the payload is at least about 120 meters.

92. The system of any of claims 49 to 91, wherein the system is configured to be used with a payload that includes one or more components of a wind turbine.

What is claimed is:

1. A method of loading a payload onto a cargo aircraft, comprising:
advancing a payload into a forward end of a cargo aircraft and towards an aft end of the cargo aircraft, the cargo aircraft including an interior cargo bay having a forward bay portion located in the forward end of the cargo aircraft, an aft bay portion located in the aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, the payload including a plurality of payload-receiving fixtures holding one or more structures of the payload in a set position with respect to at least some portion of the payload-receiving fixtures, the advancing causing at least a distal-most payload-receiving fixture of the plurality of payload-receiving fixtures to rise relative to a plane defined by an interior bottom contact surface of the forward bay portion as the distal-most payload-receiving fixture advances through the kinked bay portion and into the aft bay portion of the interior cargo bay; and
securing the payload within the interior cargo bay such that the distal-most payload-receiving fixture is secured in the aft bay portion of the interior cargo bay and a proximal-most payload-receiving fixture of the plurality of payload-receiving fixtures is secured in the forward bay portion of the interior cargo bay.

2. The method of claim 1,
wherein advancing the payload into the forward end of the cargo aircraft further comprises coupling a carriage of at least one payload-receiving fixture of the plurality of payload-receiving fixtures to one or more rails of the interior cargo bay that extend from the forward bay portion, through the kinked bay portion, and into the aft bay portion, and
wherein advancing the payload towards the aft end of the cargo aircraft further comprises advancing the carriage along the one or more rails.

3. The method of claim 2, wherein at least one rail of the one or more rails includes a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion.

4. The method of claim 3, wherein the kinked portion of the at least one rail of the one or more rails is disposed in the aft bay portion such that a majority of the kinked portion forms an angle with a portion of the at least one rail disposed in the forward bay portion.

5. The method of claim 3, wherein a terminal end of the kinked portion of the at least one rail of the one or more rails is disposed in the aft bay portion located above a plane extending through a top surface of a fuselage of the cargo plane in which the interior cargo bay is disposed.

6. The method of claim 2, wherein at least one rail of the one or more rails extends continuously along an interior bottom contact surface of the cargo bay from the forward bay portion to the aft bay portion.

7. The method of claim 2, wherein at least one rail of the one or more rails further serves as a primary structural beam of the cargo aircraft.

8. The method of claim 1, further comprising:
coupling a first terminal end of a first structure of the one or more structures to the proximal-most payload-receiving fixture; and
coupling a second, opposite terminal end of the first structure to the distal-most payload-receiving fixture.

9. The method of claim 1, further comprising:
operating one or more actuators coupled to one or more of the plurality of payload-receiving fixtures to adjust a position of the payload relative to the cargo aircraft.

10. The method of claim 1, further comprising:
causing at least one payload-receiving fixture of the plurality of payload-receiving fixtures to both advance towards the aft end of the cargo aircraft and rotate about a pivot axis of the at least one payload-receiving fixture while advancing the payload towards the aft end.

11. The method of claim 1, further comprising:
causing at least one payload-receiving fixture of the plurality of payload-receiving fixtures to each of advance towards the aft end of the cargo aircraft, rotate about a pivot axis of the at least one payload-receiving fixture, and translate vertically relative to an interior bottom contact surface of the cargo bay while advancing the payload towards the aft end.

12. A method of unloading a payload from a cargo aircraft, comprising:
advancing a payload towards and out of a forward end of a cargo aircraft, the cargo aircraft including an interior cargo bay having a forward bay portion located in the forward end of the cargo aircraft, an aft bay portion located in the aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, the payload including a plurality of payload-receiving fixtures holding one or more structures of the payload in a set position with respect to at least some portion of the payload-receiving fixtures, the advancing causing at least a distal-most payload-receiving fixture of the plurality of payload-receiving fixtures to approach a plane defined by an interior bottom contact surface of the forward bay portion as the distal-most payload-receiving fixture advances from the aft bay portion, through the kinked bay portion, and into the forward bay portion of the interior cargo bay.

13. The method of claim 12,
wherein advancing the payload towards and out of the forward end of the cargo aircraft further comprises coupling a carriage of at least one payload-receiving fixture of the plurality of payload-receiving fixtures to one or more rails of the interior cargo bay that extend from the forward bay portion, through the kinked bay portion, and into the aft bay portion, and
wherein advancing the payload towards and out of the forward end of the cargo aircraft further comprises advancing the carriage along the one or more rails.

14. A system for at least one of loading a payload onto a cargo aircraft or unloading a payload from a cargo aircraft, comprising:
at least one rail disposed in an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft,
wherein the at least one rail extends from an interior bottom contact surface of the cargo bay from the forward bay portion, through the kinked bay portion, and into the aft bay portion.

15. The system of claim 14, wherein the at least one rail includes a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion.

16. The system of claim 15, wherein the kinked portion of the at least one rail is disposed in the aft bay portion such that a majority of the kinked portion forms an angle with a portion of the at least one rail disposed in the forward bay portion that is substantially parallel to the longitudinal-lateral plane of the cargo aircraft.

17. The system of claim 15, wherein a terminal end of the kinked portion of the at least one rail is disposed in the aft bay portion located above a plane extending through a top surface of a fuselage of the cargo plane in which the interior cargo bay is disposed.

18. The system of claim 14, wherein the at least one rail extends continuously along the interior bottom contact surface of the cargo bay from the forward bay portion to the aft bay portion.

19. The system of claim 14, wherein the at least one rail further serves as a primary structural beam of the cargo aircraft.

20. The system of claim 14, wherein the at least one rail comprises at least two rails disposed approximately parallel to each other.

21. The system of claim 14, further comprising:
a cargo nose door configured to open a portion of the forward end of the cargo aircraft such that a terminal end of the at least one rail disposed in the forward bay portion is accessible from an outside environment when the cargo nose door is open.

22. The system of claim 14, further comprising:
a plurality of payload-receiving fixtures configured to couple to the at least one rail such that the plurality of payload-receiving fixtures are configured to translate along a length of the at least one rail.

23. The system of claim 22,
wherein the first structure is a first wind turbine blade, and
wherein when the second structure is included, the second structure is a second wind turbine blade, the terminal end of the first wind turbine blade being a hub of the first wind turbine blade and the terminal end of the second wind turbine blade being a tip of the second wind turbine blade.

24. The system of claim 22, at least one payload-receiving fixture of the plurality of payload-receiving fixtures comprises:
   a carriage having a frame and a plurality of wheels associated therewith, the wheels being configured to engage the at least one rail disposed in the interior cargo bay of the cargo aircraft.

25. The system of claim 22, further comprising:
   one or more actuators coupled to one or more payload-receiving fixtures of the plurality of payload-receiving fixtures to adjust a position of a payload received by the plurality of payload-receiving fixtures relative to the cargo aircraft.

26. The system of claim 22, wherein at least one payload-receiving fixture of the plurality of payload-receiving fixtures is configured to rotate about a pivot axis of the at least one payload-receiving fixture.

27. The system of claim 26, wherein the at least one payload-receiving fixture of the plurality of payload-receiving fixtures is further configured to translate vertically relative to the interior bottom contact surface of the cargo bay.

28. The system of claim 14, further comprising:
   a plurality of hardpoint fittings coupled to the at least one rail and configured to receive at least one of a payload or a payload-receiving fixture that receives a payload.

29. A system for at least one of loading a payload onto a cargo aircraft or unloading a payload from a cargo aircraft, comprising:
   at least one rail disposed in an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft,
   wherein the at least one rail extends from the forward bay portion, through the kinked bay portion, and into the aft bay portion such that the at least one rail tracks a profile of an interior bottom contact surface of the interior cargo bay from the forward bay portion, through the kinked bay portion, and into the aft bay portion.

30. The system of claim 29, wherein the at least one rail includes a kinked portion such that a vertical distance between at least a portion of the at least one rail aft of the kinked portion and the plane defined by the interior bottom contact surface of the forward bay portion is greater than a vertical distance between at least a portion of the at least one rail forward of the kinked portion and the plane defined by the interior bottom contact surface of the forward bay portion.

* * * * *